(12) United States Patent
Tohme et al.

(10) Patent No.: US 10,444,009 B2
(45) Date of Patent: Oct. 15, 2019

(54) TWO-CAMERA TRIANGULATION SCANNER WITH DETACHABLE COUPLING MECHANISM

(71) Applicant: FARO Technologies, Inc., Lake Mary, FL (US)

(72) Inventors: Yazid Tohme, West Chester, PA (US); Rolf Heidemann, Stuttgart (DE); Markus Grau, Marbach (DE); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/958,658

(22) Filed: Apr. 20, 2018

(65) Prior Publication Data
US 2018/0238681 A1 Aug. 23, 2018

Related U.S. Application Data

(63) Continuation of application No. 15/134,838, filed on Apr. 21, 2016, now Pat. No. 9,964,402.
(Continued)

(51) Int. Cl.
*G01B 11/25* (2006.01)
*H04N 13/257* (2018.01)
(Continued)

(52) U.S. Cl.
CPC ........ *G01B 11/2545* (2013.01); *G01B 11/005* (2013.01); *G01B 11/245* (2013.01); *G01B 11/25* (2013.01); *G01B 11/2518* (2013.01); *G06F 3/0412* (2013.01); *H04N 13/239* (2018.05); *H04N 13/257* (2018.05)

(58) Field of Classification Search
None
See application file for complete search history.

(56) References Cited

U.S. PATENT DOCUMENTS 5,461,478 A * 10/1995 Sakakibara .......... G01B 11/245
356/623
6,542,249 B1 * 4/2003 Kofman ............. G01B 11/2513
356/601

(Continued)

FOREIGN PATENT DOCUMENTS

AT     501507 T    3/2011
AT     506110 T    5/2011
(Continued)

OTHER PUBLICATIONS

Brenneke et al: "Using 3D laser range data for slam in outsoor enviomments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
(Continued)

*Primary Examiner* — Ted W Barnes
(74) *Attorney, Agent, or Firm* — Cantor Colburn LLP

(57) ABSTRACT

A three-dimensional (3D) scanner having two cameras and a projector is detachably coupled to a device selected from the group consisting of: an articulated arm coordinate measuring machine, a camera assembly, a six degree-of-freedom (six-DOF) tracker target assembly, and a six-DOF light point target assembly.

20 Claims, 51 Drawing Sheets

Related U.S. Application Data

(60) Provisional application No. 62/152,280, filed on Apr. 24, 2015, provisional application No. 62/152,266, filed on Apr. 24, 2015, provisional application No. 62/152,286, filed on Apr. 24, 2015, provisional application No. 62/152,272, filed on Apr. 24, 2015, provisional application No. 62/152,294, filed on Apr. 24, 2015.

(51) Int. Cl.
  *G01B 11/245* (2006.01)
  *G01B 11/00* (2006.01)
  *G06F 3/041* (2006.01)
  *H04N 13/239* (2018.01)

(56) References Cited

U.S. PATENT DOCUMENTS

| | | | |
|---|---|---|---|
| 7,069,124 B1 | 6/2006 | Whittaker et al. | |
| 7,256,899 B1* | 8/2007 | Faul | G01B 11/2522 356/623 |
| 7,336,375 B1* | 2/2008 | Faul | G01B 11/2522 356/604 |
| 7,804,602 B2* | 9/2010 | Raab | G01B 21/04 356/614 |
| 8,384,914 B2* | 2/2013 | Becker | G01C 15/002 356/141.5 |
| 8,971,612 B2 | 3/2015 | Shotton et al. | |
| 9,453,717 B2 | 9/2016 | Bridges | |
| 9,482,529 B2 | 11/2016 | Becker et al. | |
| 9,602,811 B2 | 3/2017 | Hillebrand et al. | |
| 9,671,221 B2 | 6/2017 | Ruhland et al. | |
| 9,686,532 B2 | 6/2017 | Tohme | |
| 9,693,040 B2 | 6/2017 | Hillebrand et al. | |
| 2002/0136444 A1 | 9/2002 | Brown et al. | |
| 2004/0119833 A1* | 6/2004 | Duncan | G01B 11/24 348/207.99 |
| 2010/0046005 A1* | 2/2010 | Kalkowski | G01B 11/2545 356/604 |
| 2010/0207938 A1* | 8/2010 | Yau | G01B 11/2513 345/419 |
| 2010/0225746 A1* | 9/2010 | Shpunt | G01B 11/2518 348/50 |
| 2011/0043808 A1* | 2/2011 | Isozaki | G01B 11/0608 356/445 |
| 2011/0078763 A1 | 3/2011 | Kan et al. | |
| 2011/0173824 A1* | 7/2011 | Barber | G01B 5/012 33/503 |
| 2011/0173827 A1* | 7/2011 | Bailey | G01B 5/008 33/503 |
| 2011/0178763 A1* | 7/2011 | Bridges | G01B 5/012 702/152 |
| 2011/0282622 A1 | 11/2011 | Canter et al. | |
| 2011/0288684 A1* | 11/2011 | Farlow | B25J 11/009 700/264 |
| 2012/0062706 A1* | 3/2012 | Keshavmurthy | G01B 11/245 348/47 |
| 2012/0146897 A1 | 6/2012 | Yoshida et al. | |
| 2012/0194644 A1* | 8/2012 | Newcombe | G06T 7/74 348/46 |
| 2012/0260512 A1* | 10/2012 | Kretschmer | G01B 5/008 33/503 |
| 2013/0060146 A1 | 3/2013 | Yang et al. | |
| 2013/0096873 A1* | 4/2013 | Rosengaus | G01C 15/002 702/151 |
| 2013/0097882 A1* | 4/2013 | Bridges | G01B 11/005 33/503 |
| 2013/0100282 A1* | 4/2013 | Siercks | G01B 11/2513 348/135 |
| 2013/0125408 A1* | 5/2013 | Atwell | G01B 11/005 33/503 |
| 2013/0197852 A1* | 8/2013 | Grau | G01B 5/008 702/123 |
| 2013/0212889 A9* | 8/2013 | Bridges | G01B 11/005 33/503 |
| 2013/0293684 A1* | 11/2013 | Becker | G01B 11/245 348/47 |
| 2014/0028805 A1* | 1/2014 | Tohme | G01C 15/002 348/47 |
| 2014/0114461 A1* | 4/2014 | Hermary | G01B 11/25 700/163 |
| 2014/0152769 A1* | 6/2014 | Atwell | H04N 13/207 348/46 |
| 2014/0168370 A1* | 6/2014 | Heidemann | G01B 11/2513 348/46 |
| 2014/0168379 A1* | 6/2014 | Heidemann | G01B 11/2513 348/47 |
| 2014/0168380 A1* | 6/2014 | Heidemann | G01B 11/25 348/47 |
| 2014/0202016 A1* | 7/2014 | Bridges | G01B 21/047 33/503 |
| 2014/0267619 A1* | 9/2014 | Bridges | G01S 17/003 348/46 |
| 2014/0267620 A1* | 9/2014 | Bridges | G01S 17/003 348/46 |
| 2014/0267623 A1* | 9/2014 | Bridges | G01S 17/003 348/46 |
| 2014/0267629 A1* | 9/2014 | Tohme | G01S 17/003 348/47 |
| 2014/0268093 A1* | 9/2014 | Tohme | G01S 17/003 356/3.08 |
| 2014/0268108 A1* | 9/2014 | Grau | G01B 5/008 356/72 |
| 2015/0015898 A1* | 1/2015 | Atwell | G01B 5/008 356/625 |
| 2015/0042759 A1* | 2/2015 | Heidemann | G01B 11/25 348/46 |
| 2015/0075018 A1* | 3/2015 | Bridges | G01B 5/008 33/503 |
| 2015/0192406 A9* | 7/2015 | Bridges | G01S 17/003 348/46 |
| 2015/0229907 A1* | 8/2015 | Bridges | G01B 21/047 348/46 |
| 2016/0073085 A1 | 3/2016 | Hillebrand et al. | |
| 2016/0073091 A1 | 3/2016 | Hillebrand et al. | |
| 2016/0073096 A1 | 3/2016 | Hillebrand et al. | |
| 2016/0073104 A1 | 3/2016 | Hillebrand et al. | |
| 2016/0313114 A1 | 10/2016 | Tohme | |
| 2016/0364874 A1* | 12/2016 | Tohme | G01S 17/003 |
| 2017/0131085 A1 | 5/2017 | Hillebrand et al. | |
| 2017/0188015 A1 | 6/2017 | Heidemann et al. | |
| 2017/0193673 A1 | 7/2017 | Heidemann et al. | |

FOREIGN PATENT DOCUMENTS

| | | | | |
|---|---|---|---|---|
| CA | 2686904 A1 | 6/2011 | | |
| CN | 101726261 A | 6/2010 | | |
| CN | 102112845 A | 6/2011 | | |
| DE | 102004052199 A1 | 4/2006 | | |
| DE | 102006049695 A1 | 4/2008 | | |
| DE | 202008013217 U1 | 4/2009 | | |
| DE | 102009035336 B3 | 11/2010 | | |
| DE | 112009001652 T5 | 1/2012 | | |
| EP | 1211481 A1 | 6/2002 | | |
| EP | 2166303 A1 | 3/2010 | | |
| GB | 2524931 A | * | 10/2015 | G01S 17/003 |
| GB | 2524931 B | * | 1/2016 | G01S 17/003 |
| GB | 2527993 A | * | 1/2016 | G01B 21/045 |
| GB | 2524931 C | * | 2/2016 | G01S 17/003 |
| JP | H04220510 A | 8/1992 | | |
| JP | H11183136 A | 7/1999 | | |
| JP | 2008164491 A | 7/2008 | | |
| JP | 2008216199 A | 9/2008 | | |
| JP | 2010091491 A | 4/2010 | | |
| JP | 2011530071 A | 12/2011 | | |
| WO | 20060944409 A1 | 9/2006 | | |
| WO | 2008153127 A | 12/2008 | | |
| WO | 2011134083 A1 | 11/2011 | | |
| WO | 2011160962 A1 | 12/2011 | | |
| WO | 2013156530 A1 | 10/2013 | | |

(56) References Cited

FOREIGN PATENT DOCUMENTS

| WO | WO-2013156530 A1 | * | 10/2013 | ............ G01B 11/25 |
| WO | WO-2015191654 A3 | * | 2/2016 | ............ G01B 11/14 |
| WO | WO-2017030885 A1 | * | 2/2017 | ............ G01C 11/02 |

OTHER PUBLICATIONS

Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.

Granstrom, Karl, et al: "Learning to Close the Loop from 3-D Point Clouds." 2010 IEEE/RSJ International Conference on Intelligent Robots and Systems (IROS), Piscataway, NJ, Oct. 18, 2010; 7 pgs.

Hebert P., "A self-referenced hand-held range sensor", 3-D Digital Imaging and Modeling, 2001, Proceedings, Third anual International Conference on May 28-Jun. 1, 2001, Piscataway, NJ, USA, IEEE, May 28, 2001, pp. 5-12.

Henry, P., et al: "RGB-D Mapping; Using Kinnect-style Depth Cameras for Dense 3-D Modeling of Indoor Enviornments." The International Journal of Robitcs Research, vol. 31, No. 5, Feb. 10, 2012, pp. 647-663.

International Search Report and Written Opinion for Application No. PCT/US2016/028744 dated Jun. 28, 2016; 12 pages.

Lee, Wonwoo, et al.:"Panoramic Mesh Model Generation From Multiple Range Data for Indoor Screen Reconstruction." Advances in Multimedia Information Processing, PCM Lecture Notes in Computer Science, Jan. 1, 2005, Berlin, DE, pp. 1004-1014.

May, S. et al; "Robust 3-D Mapping with time-of-flight cameras." Intelligent Robots and Systems, IROS 2009. IEEE/RSJ Internation Conference. Piscataway, NJ Oct. 10, 2009; 6 pgs.

Surmann et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands; 18 pgs.

Weise, Thibaut, et al.:"Online Loop Closure for real-time interactive 3-D scanning." Computer Vision and Image Understanding, vol. 115, No. 5, May 1, 2011, pp. 635-648.

* cited by examiner

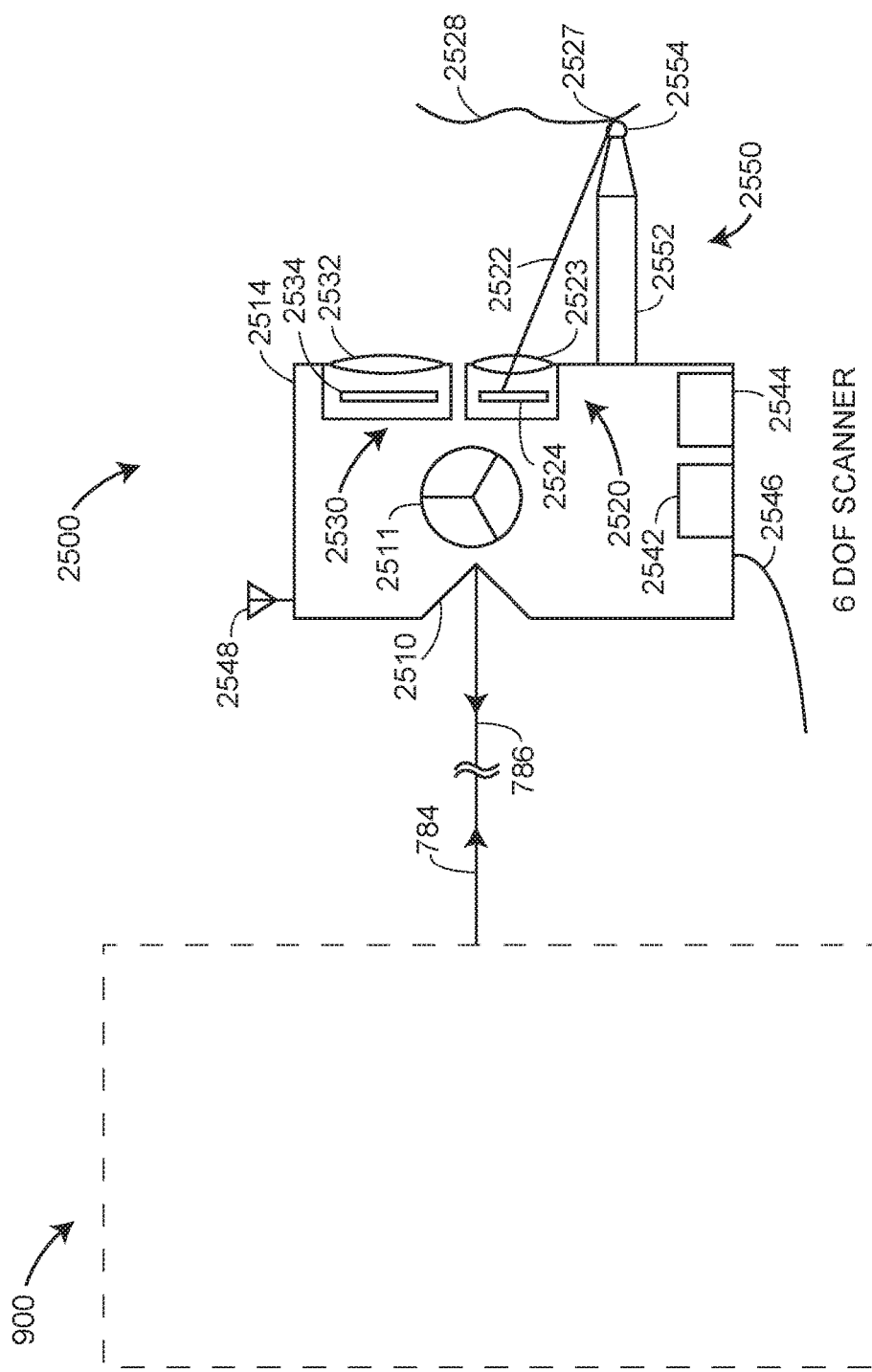

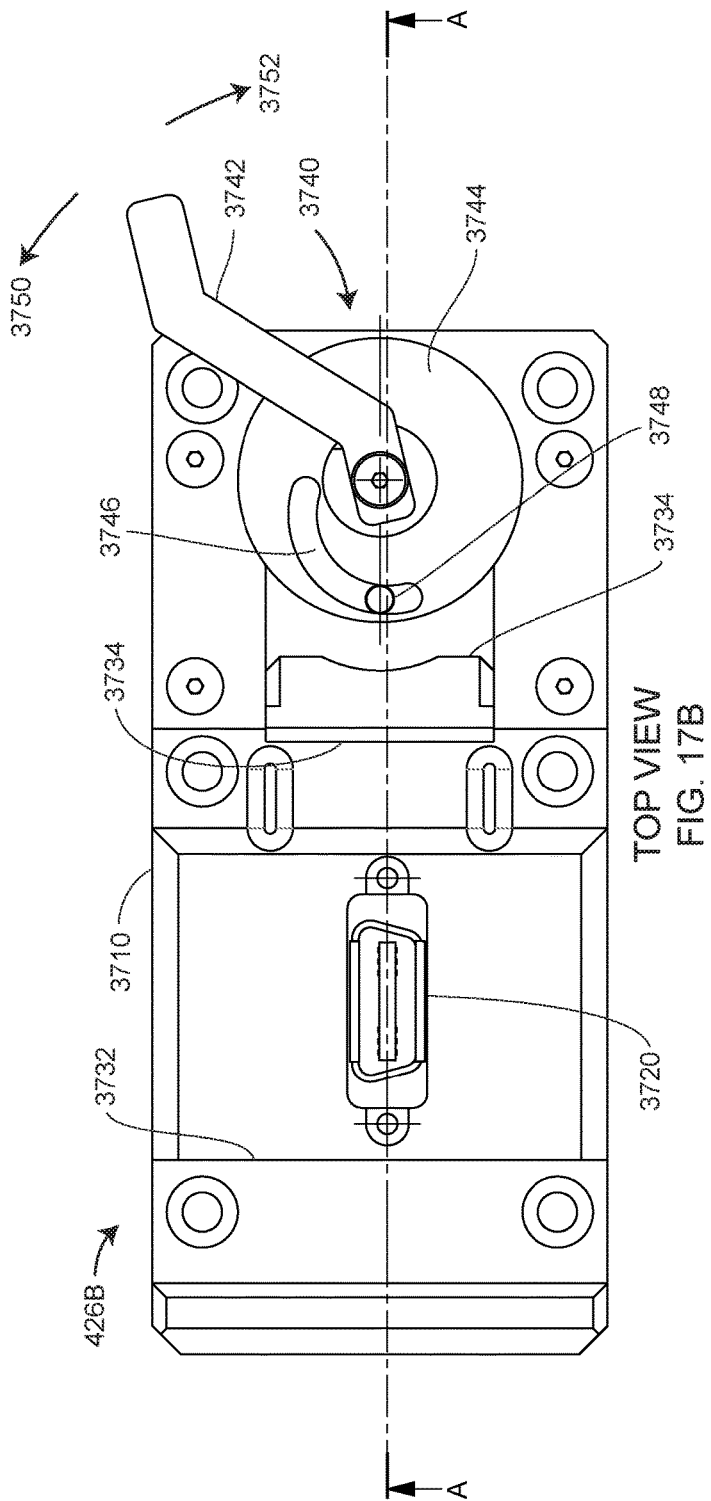
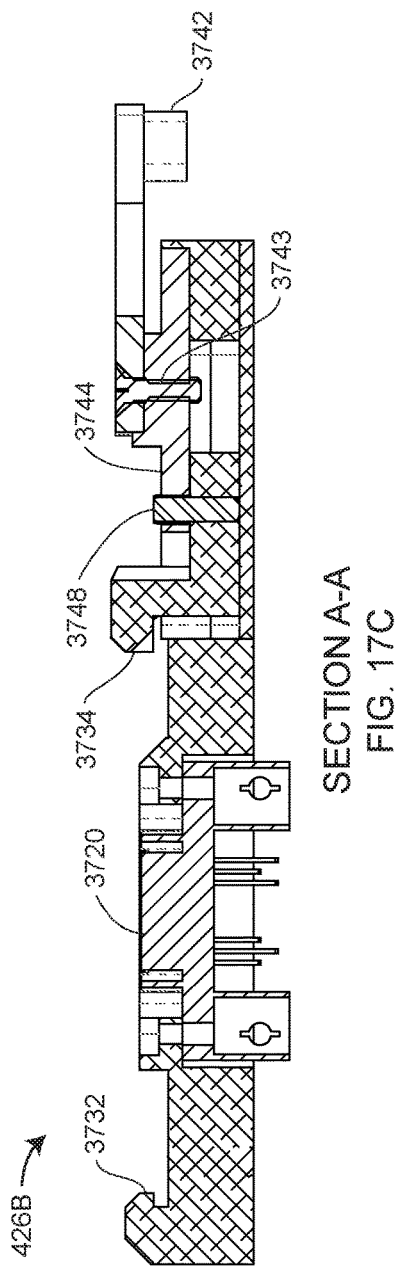
TOP VIEW
FIG. 17B
SECTION A-A
FIG. 17C

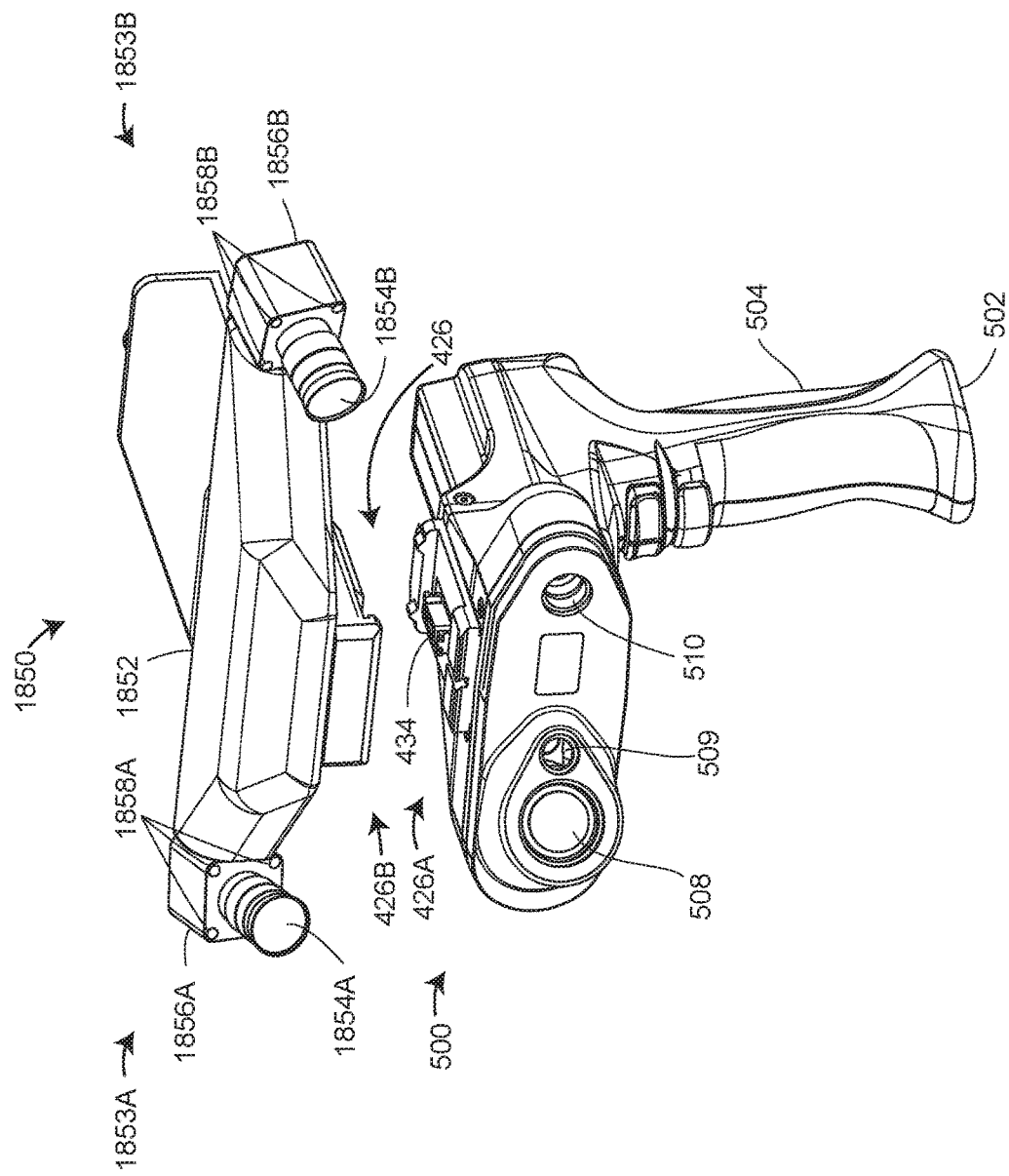

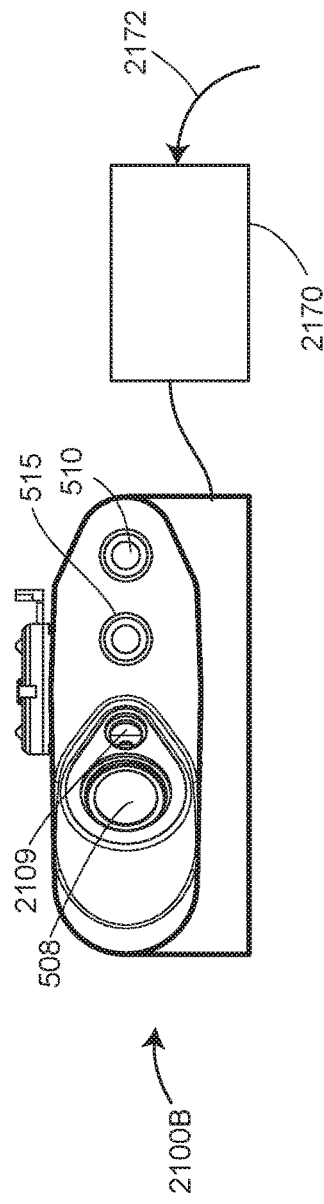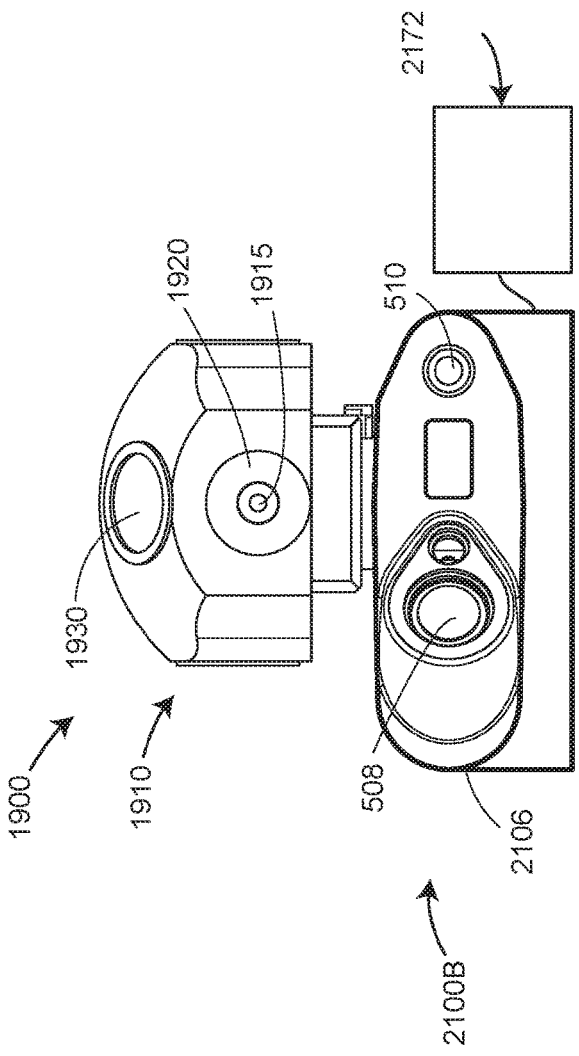
FIG. 21B
FIG. 21C

TWO-CAMERA TRIANGULATION SCANNER WITH DETACHABLE COUPLING MECHANISM

CROSS REFERENCE TO RELATED APPLICATIONS

This application is a continuation application of U.S. patent application Ser. No. 15/134,838 filed on Apr. 21, 2016, which claims the benefit of U.S. Provisional Patent Application No. 62/152,266 filed on Apr. 24, 2015, U.S. Provisional Patent Application No. 62/152,286, filed on Apr. 24, 2015, U.S. Provisional Patent Application No. 62/152,280, filed on Apr. 24, 2015, U.S. Provisional Patent Application No. 62/152,272, filed on Apr. 24, 2015, and U.S. Provisional Patent Application No. 62/152,294, filed on Apr. 24, 2015, the entire contents all of which are incorporated herein by reference.

FIELD OF THE INVENTION

The present disclosure relates to a coordinate measuring machine, and more particularly to a portable articulated arm coordinate measuring machine (AACMM) having a detachable accessory device.

BACKGROUND

AACMMs have found widespread use in the manufacturing of parts where there is a need to rapidly and accurately verify the dimensions of the part during various stages of the manufacturing (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

Measurements by an AACMM of the three-dimensional (3D) physical characteristics of surfaces of objects may be carried out with contact and non-contact probes for a variety of reasons, including part inspection, rapid prototyping, comparison of the actual part to a CAD model of the part, reverse engineering, 3D modeling, etc. Most often, non-contact devices use triangulation-based techniques to process the raw captured data to obtain 3D coordinates of surface points.

One type of triangulation-based, non-contact device is a laser line probe (LLP), which includes a projector and a camera. The projector includes a light source that emits a light, typically as a line. Thus, the LLP is also known as a line scanner. The emitted light may be laser light, partially coherent light, or incoherent light. The camera includes a camera-type imaging device, such as a charge-coupled device (CCD) or CMOS photosensitive array. The camera captures the pattern of light on the object surface, which is processed to determine 3D coordinates of an object surface.

Another type of triangulation-based, non-contact device that includes a projector and a camera is an area scanner, also known as a structured-light scanner. In such a scanner, the projector projects onto a surface a two-dimensional pattern that is captured by the camera and processed to determine 3D coordinates.

An example of a prior art portable AACMM is disclosed in commonly assigned U.S. Pat. No. 5,402,582 ('582), which is incorporated herein by reference in its entirety. The '582 patent discloses a 3D measuring system comprised of a manually-operated AACMM having a support base on one end and a "hard" measurement probe at the other end. Commonly assigned U.S. Pat. No. 5,611,147 ('147), which is incorporated herein by reference in its entirety, discloses a similar AACMM. In the '147 patent, the articulated arm CMM includes a number of features including an additional rotational axis at the probe end, thereby providing for an arm with either a two-two-two or a two-two-three axis configuration (the latter case being a seven axis arm).

It is generally known to attach an LLP to the probe end of an AACMM. The result is a fully integrated, portable, contact/non-contact measurement device. That is, the AACMM having an LLP attached thereto provides for both contact measurements of an object through use of the hard probe of the AACMM and for non-contact measurements of the object through use of the LLP's laser and imaging device. More specifically, the combination AACMM and LLP allows users to quickly inspect or reverse engineer complex and organic shapes via laser scanning, as well as to capture prismatic elements with the relatively high accuracy that contact metrology provides.

When combined as such, the AACMM and LLP may have the LLP carry out some or all of the processing of the 3D captured point cloud data using the signal processing electronics (e.g., computer or processor) within or associated with (e.g., located apart from) the AACMM. However, the LLP may have its own signal processing electronics located within the LLP or associated with the LLP (e.g., a stand-alone computer) to perform signal processing. In this case, the LLP may connect with a display device to view the captured data representing the object.

It is known to disconnect an area scanner from an AACMM for handheld operation. Usually, such handheld operation is limited to capturing a line of light or pattern of light in a single shot. In such handheld operation, 3D coordinates of surface points over large areas are obtained by registering together multiple 3D images, usually by matching common image features such as edges or holes. With this method, a relatively large object measured in several scans may provide a single large collection of 3D surface coordinates.

A difficulty with this registration method may arise when an object being scanned has relatively few features. In such a case, a flat surface may be registered in a warped shape. In addition, although it is possible to use an area scanner removed from an AACMM in a handheld mode, it has not generally been possible to use an LLP in a handheld mode as a collection of single lines. A potential difficulty is that the collecting of multiple lines may not provide enough information to permit multiple line-scans to be fit together over a two-dimension surface area. Consequently, improvements are desired for methods of using a handheld LLP or area scanner to obtain a relatively accurate 3D representation over a relatively large area.

While existing line scanners and area scanners are suitable for their intended purposes, what is needed is a handheld scanner having improved registration over relatively large regions. What is further needed is for such a handheld scanner to be further useable with an AACMM.

SUMMARY

According to one aspect of the invention, a device for measuring three-dimensional (3D) coordinates of an object surface includes: a processor; and a triangulation scanner including a projector, a first scanner camera, a second scanner camera, and a scanner connector, the scanner connector configured to detachably couple to an arm connector of an articulated arm coordinate measurement machine (AACMM), the projector configured to project a scanner pattern onto the object surface, the projector having a projector perspective center and a projector optical axis, the first scanner camera configured to form a first image of the scanner pattern and to send a first electrical scanner signal to the processor in response, the first scanner camera having a first-camera perspective center and a first-camera optical axis, the second scanner camera configured to form a second image of the scanner pattern and to send a second electrical scanner signal to the processor in response, the second camera having a second-camera perspective center and a second-camera optical axis, the projector perspective center, the first-camera perspective center, and the second-camera perspective center being arranged in a triangular pattern on a first plane, the first plane not including the projector optical axis, the first-camera optical axis, or the second-camera optical axis, wherein the processor is configured to determine the 3D coordinates of the object surface whether the triangulation scanner is coupled to or uncoupled from the AACMM, the determining based at least in part on the scanner pattern, the first electrical scanner signal, and the second electrical scanner signal.

According to a further aspect of the invention, a device for measuring three-dimensional (3D) coordinates of an object surface includes: a processor; and a triangulation scanner including a projector, a scanner camera, a detachable handle, and a scanner connector, the projector configured to project a scanner pattern onto the object surface, the scanner camera configured to form an image of the scanner pattern and to send an electrical scanner signal to the processor in response, the scanner connector configured to detachably couple to a connector of an articulated arm coordinate measurement machine (AACMM), the processor being configured to determine the 3D coordinates of the object surface whether the triangulation scanner is coupled to on uncoupled from the AACMM, the determining based at least in part on the scanner pattern and on the electrical scanner signal, wherein the triangulation scanner is configured to sit flat on its bottom after removal of the detachable handle.

These and other advantages and features will become more apparent from the following description taken in conjunction with the drawings.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 14A is a schematic representation of elements of a six-DOF scanner according to an embodiment;

FIGS. 17A, 17B, and 17C are orthographic, top, and sectional views of a connector assembly mechanism according to an embodiment;

FIG. 18A is an isometric view of a detachable camera assembly configured for coupling to a handheld triangulation scanner according to an embodiment;

FIGS. 21A, 21B, 21C show a triangulation scanner having a removable handle and an optional attachable accessory, the attachable accessory configured to help determine position and orientation of the triangulation scanner in relation to an object;

The detailed description explains embodiments of the invention, together with advantages and features, by way of example with reference to the drawings.

DETAILED DESCRIPTION

Figure 1A:
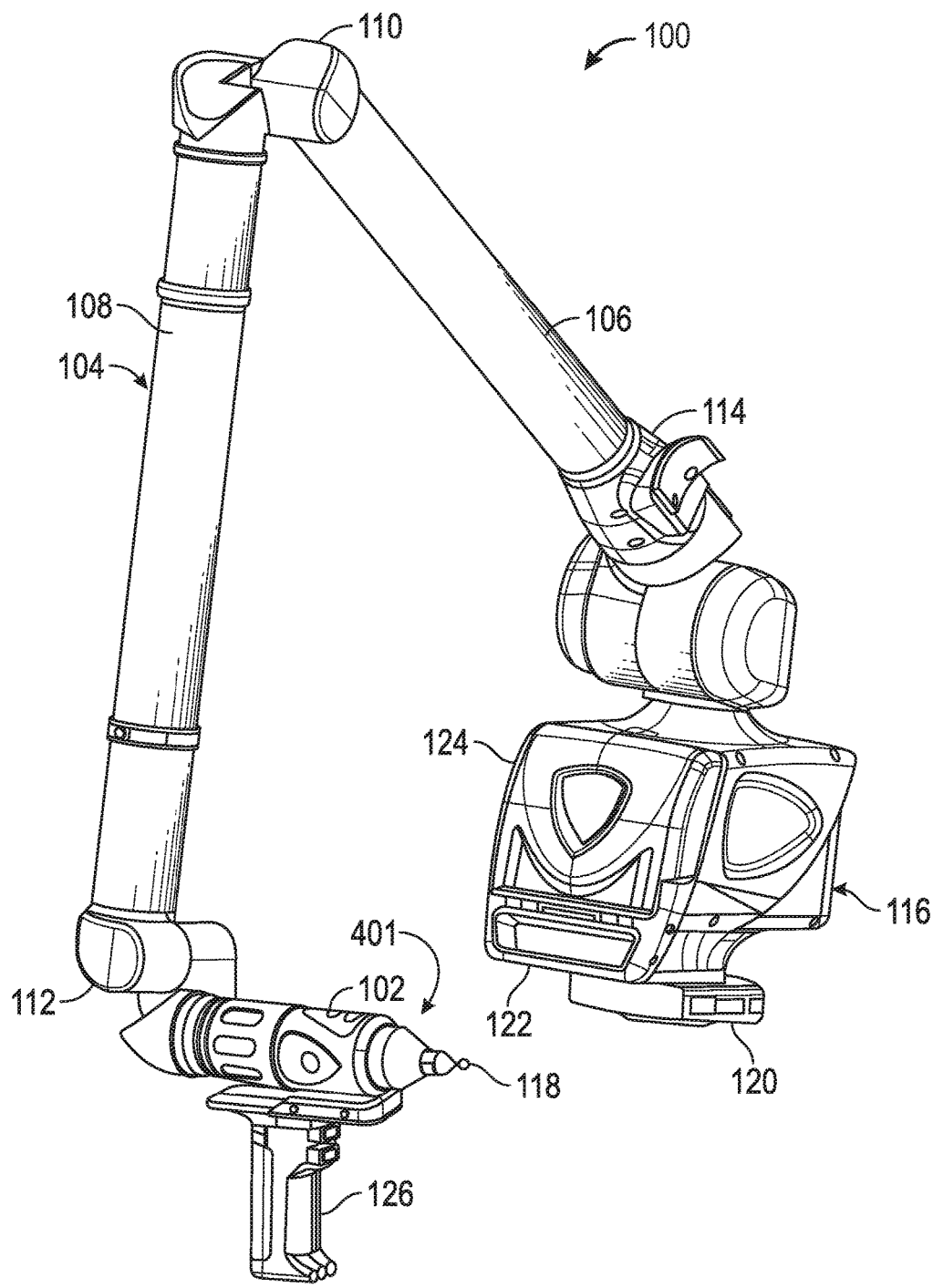
FIGS. 1A and 1B are perspective views of a portable articulated arm coordinate measuring machine (AACMM) having embodiments of various aspects of the present invention.
Figure 1B:
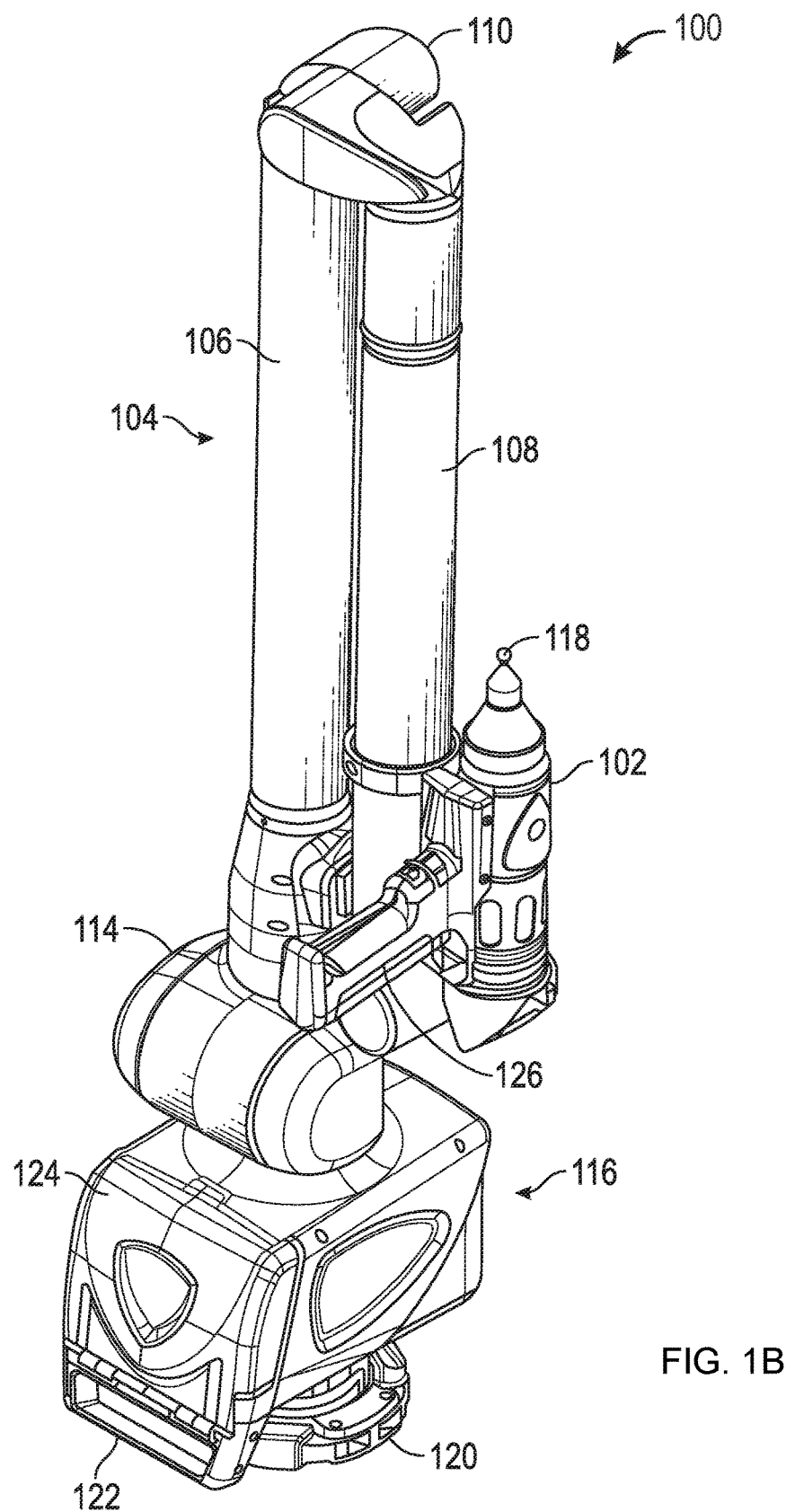

FIGS. 1A and 1B illustrate, in perspective, an articulated arm coordinate measuring machine 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As discussed in more detail hereinafter with reference to FIG. 10 et seq., the handle 126 may be replaced or interchanged with another device such as an LLP, which is configured to emit a line of laser light to an object and to capture or image the laser light on a surface of the object with an imaging device (e.g., a camera) that is part of the LLP, to thereby provide for non-contact measurement of the dimensions of three-dimensional objects. This interchangeable feature and use of an LLP has the advantage in allowing the operator to make both contact and non-contact measurements with the same AACMM 100. However, it should be understood that the LLP may be a standalone device, as described in more detail hereinafter. That is, the LLP may be fully functional and operable by itself without any type of connection to the AACMM 100 or similar device.

In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as the LLP. In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail hereinafter. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor, for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional positional calculations; and a user interface processing system that includes an on-board operating system, a touch screen display, and resident application software that allows for relatively complete metrology functions to be implemented within the AACMM 100 without the need for connection to an external computer. It should be appreciated that in other embodiments, the AACMM 100 may be configured with the user interface processing system arranged remote or distant from the device, such as on a laptop, a remote computer or a portable/mobile computing device (e.g. a cellular phone or a tablet computer).

The electronic data processing system in the base 116 may communicate with the encoder systems, sensors, and other peripheral hardware located away from the base 116 (e.g., a laser line probe that can be mounted in place of the removable handle 126 on the AACMM 100). The electronics that support these peripheral hardware devices or features may be located in each of the bearing cartridge groupings 110, 112, 114 located within the portable AACMM 100.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
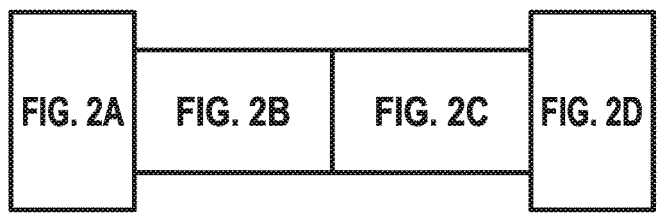
FIG. 2, including FIGS. 2A-2D taken together, is a block diagram of electronics used as part of the AACMM of FIG. 1 in accordance with an embodiment.
Figure 2A:
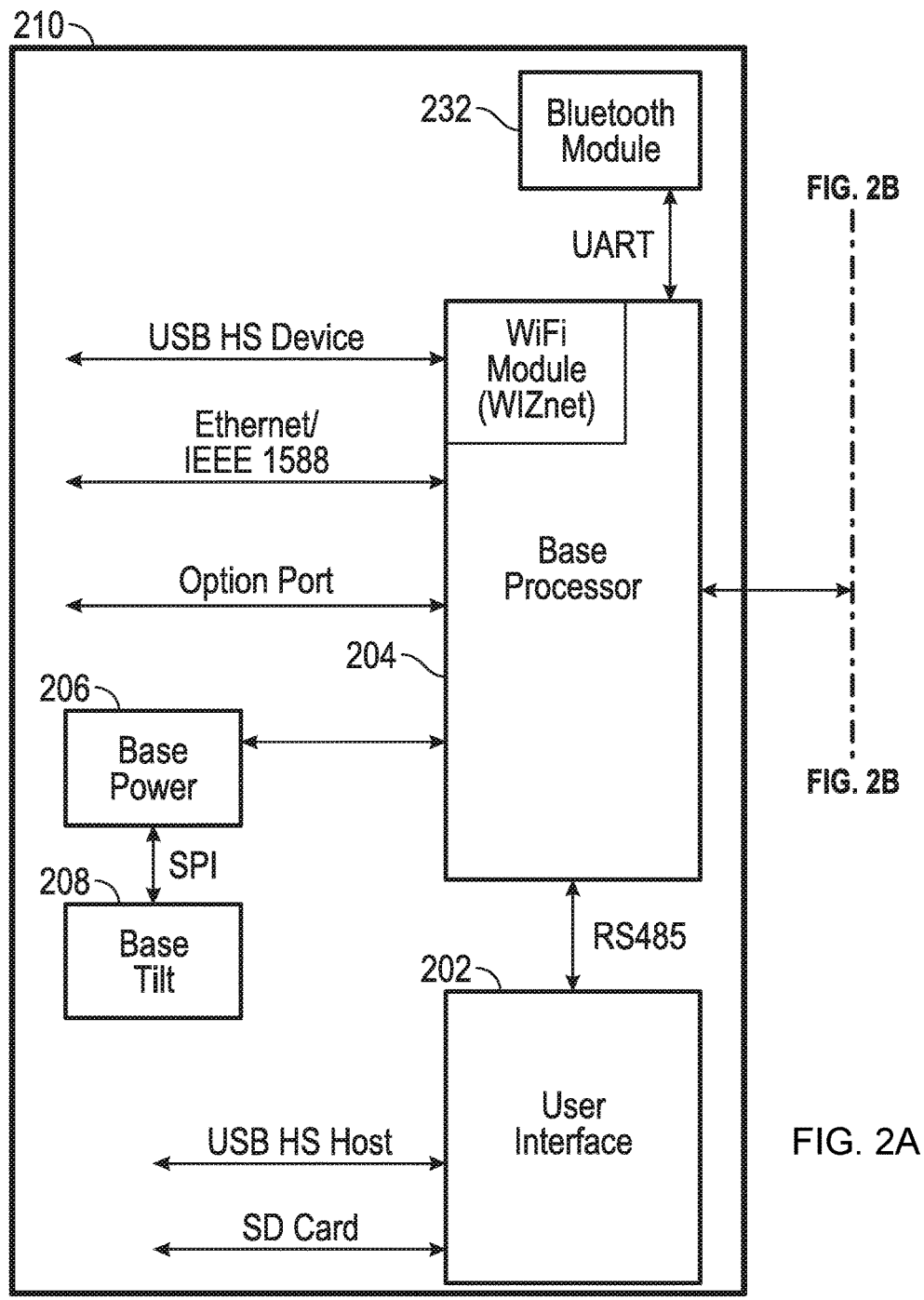
Figure 2B:
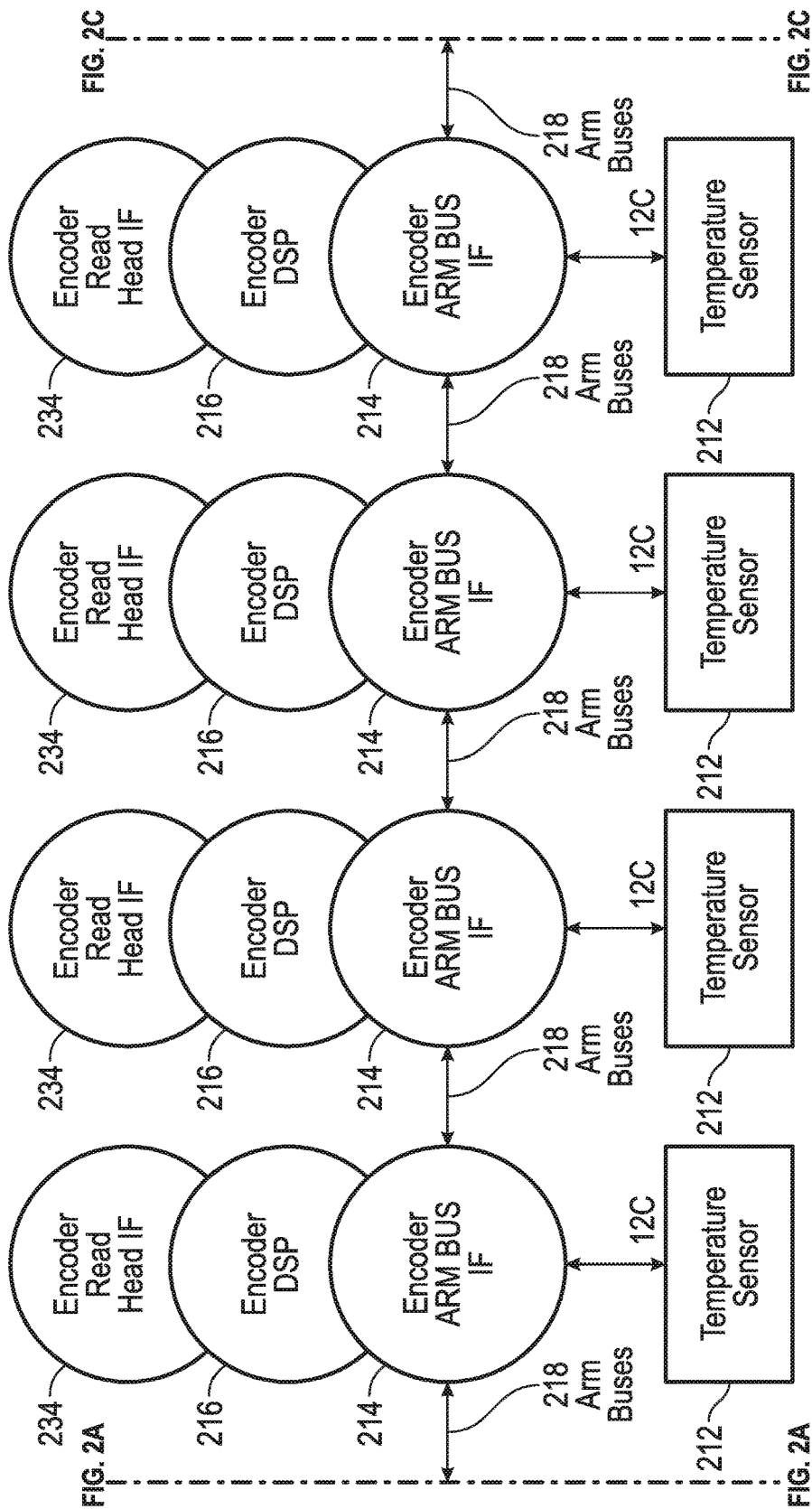
Figure 2C:
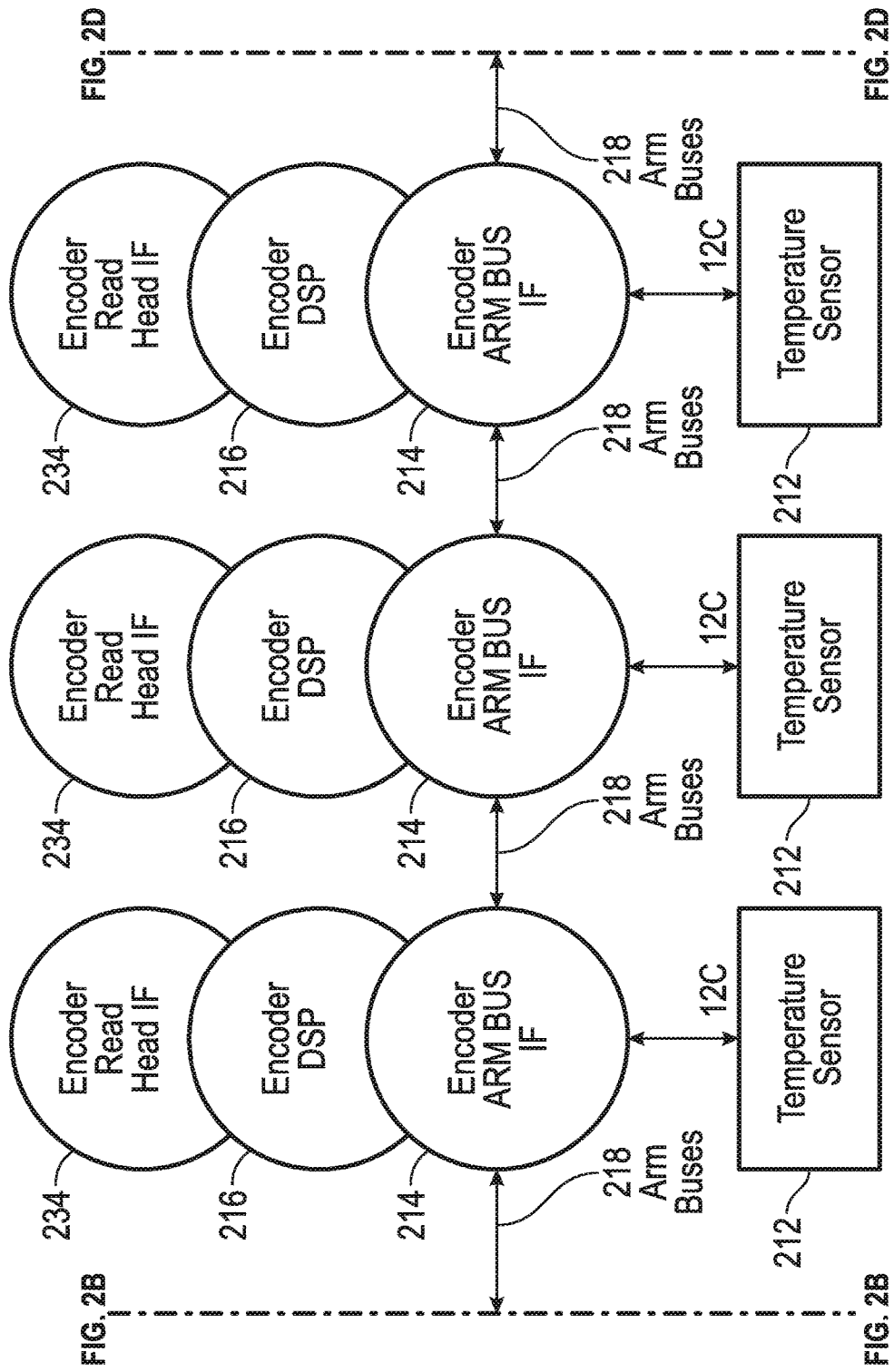

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Figure 2D:
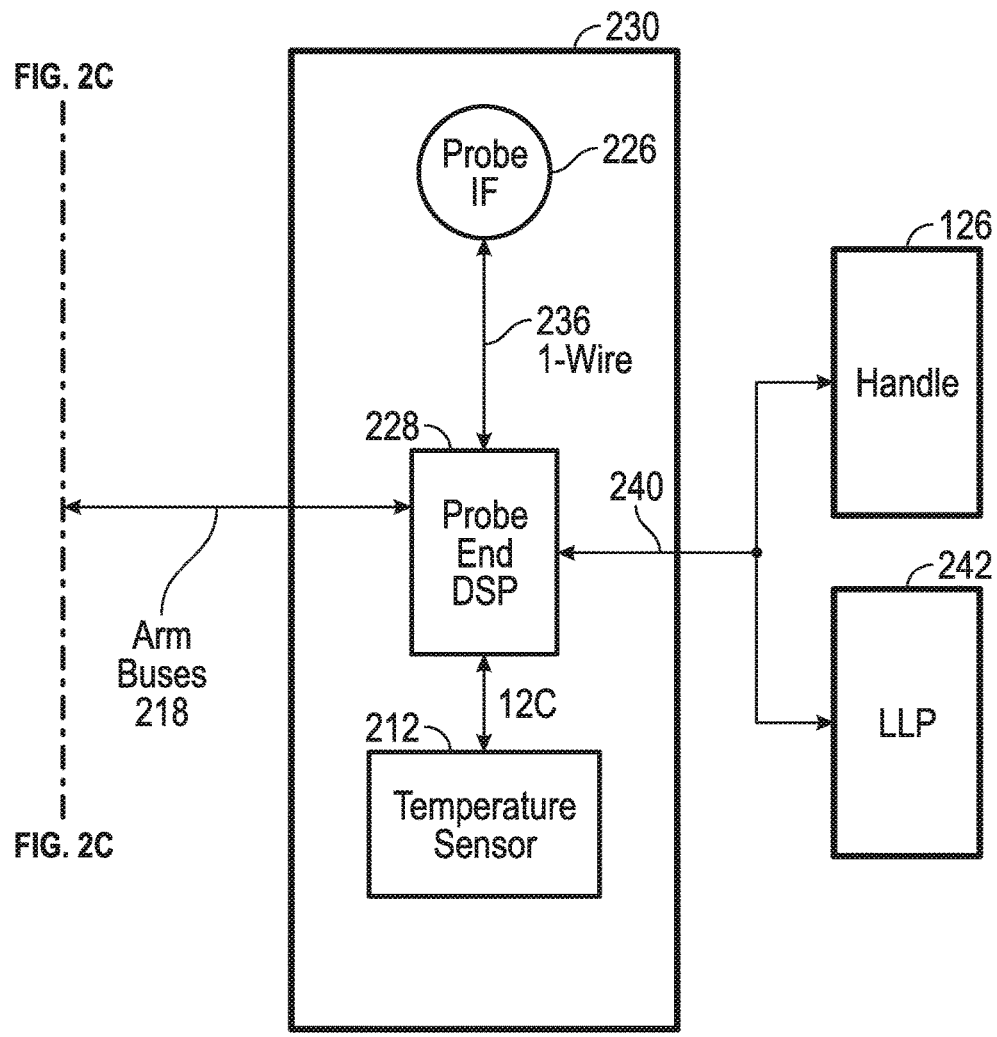

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the LLP 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

Figure 3A:
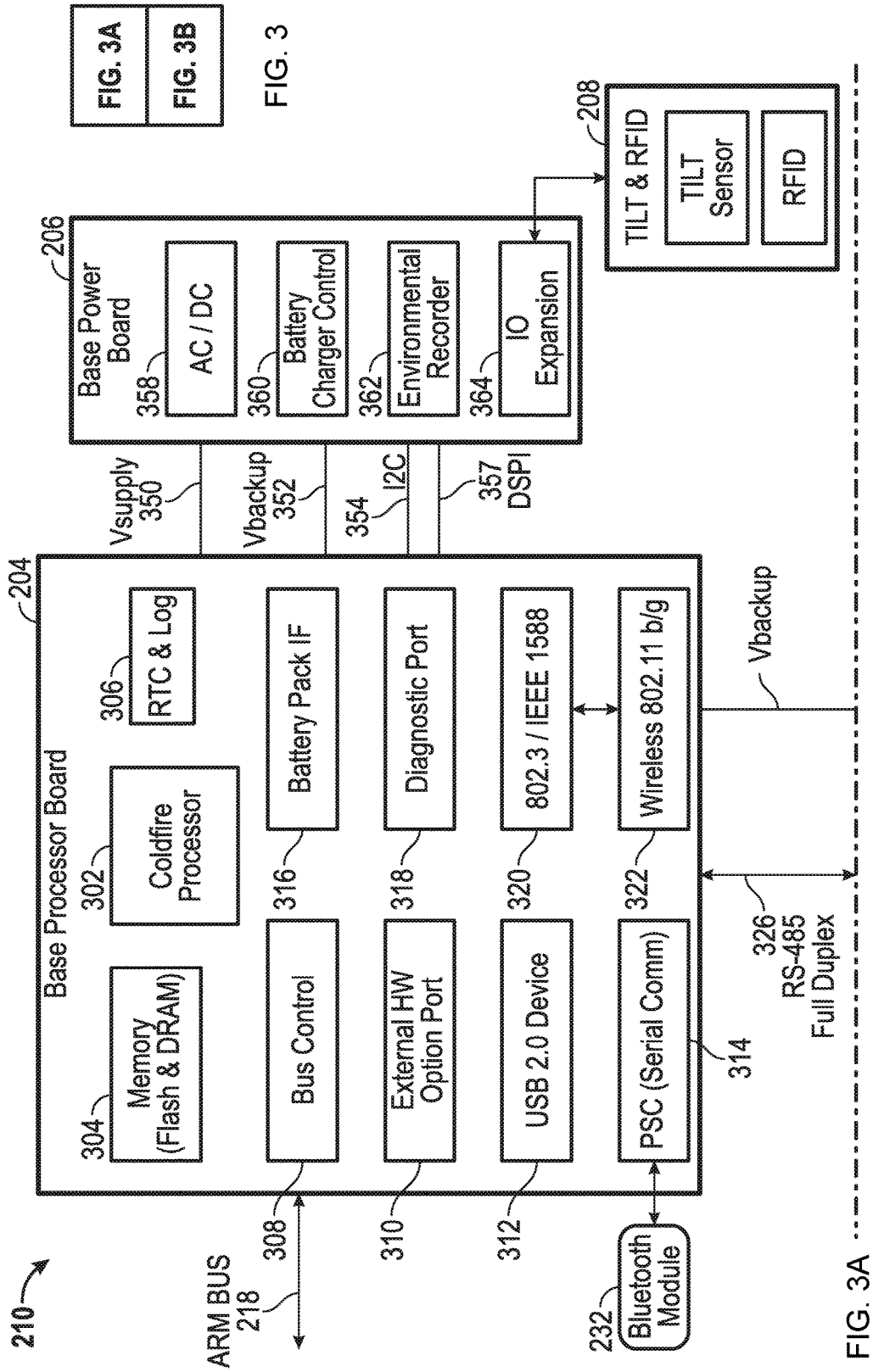
FIG. 3, including FIGS. 3A and 3B taken together, is a block diagram describing detailed features of the electronic data processing system of FIG. 2 in accordance with an embodiment.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as the LLP 242. A real time clock (RTC) and log 306, a battery pack interface (IF) 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers ("IEEE") 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Figure 3B:
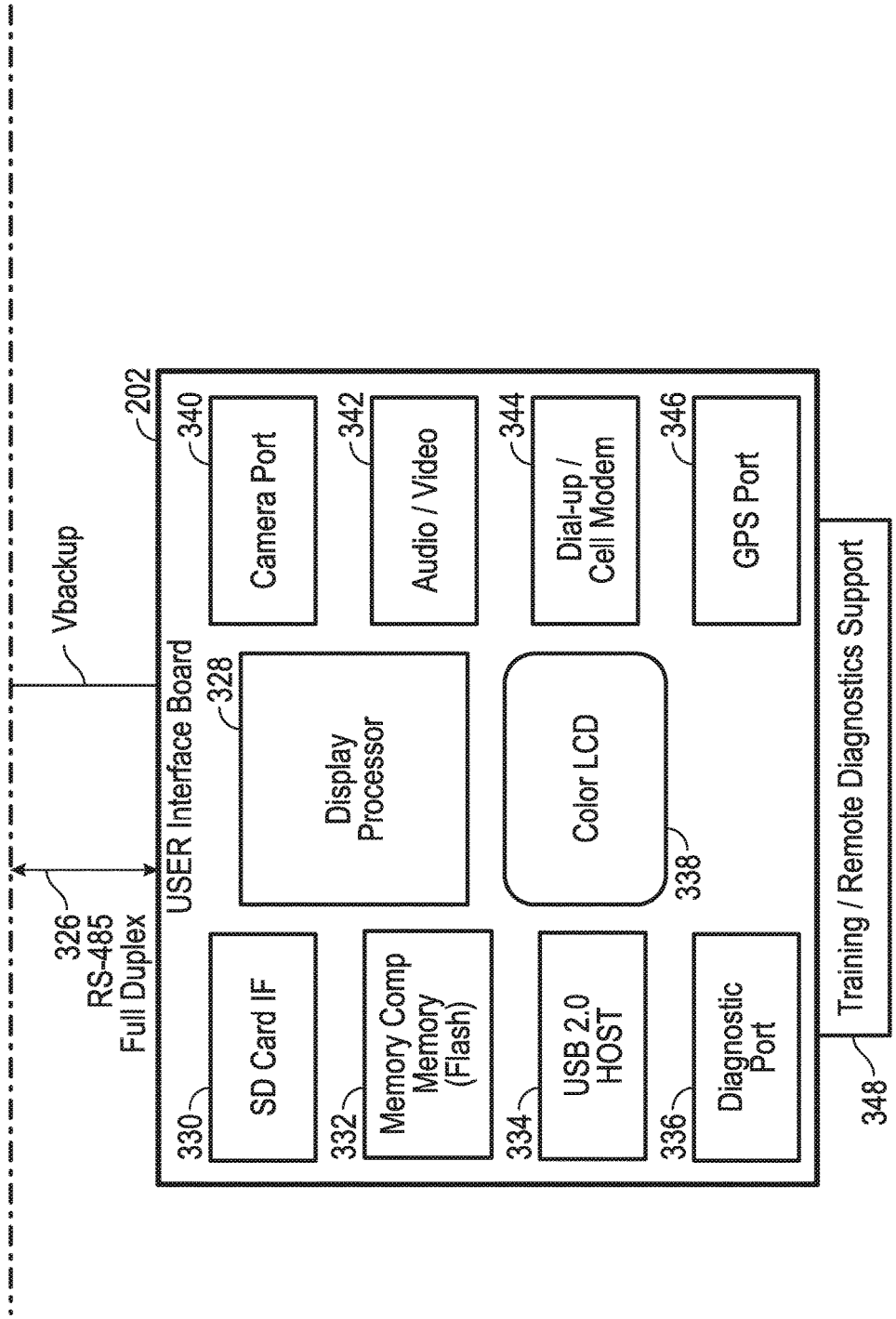
Figure 4:
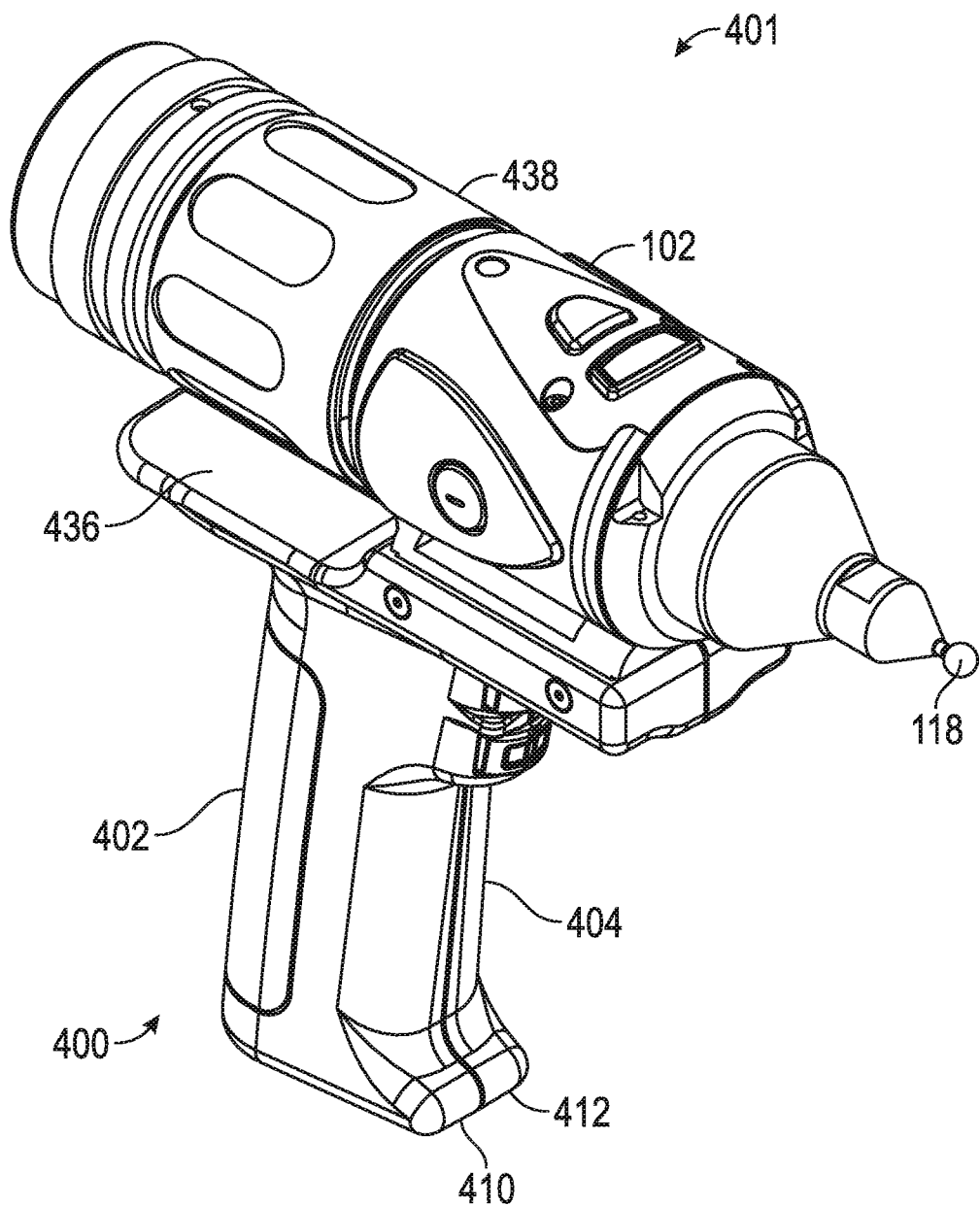
FIG. 4 is an isometric view of the probe end of the AACMM of FIG. 1.

Turning now to the user interface board 202 shown in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A may also include a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
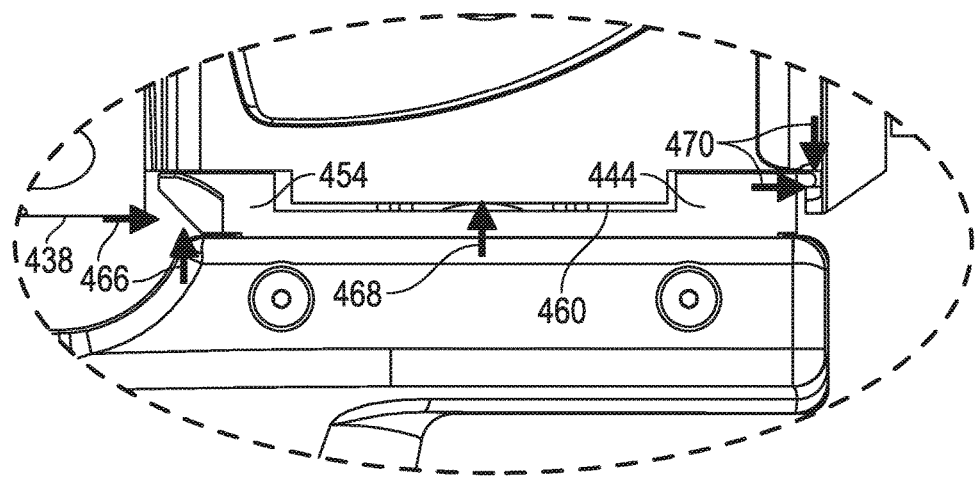
FIG. 7 is an enlarged partial side view of the interface portion of the probe end of FIG. 6.
Figure 8:
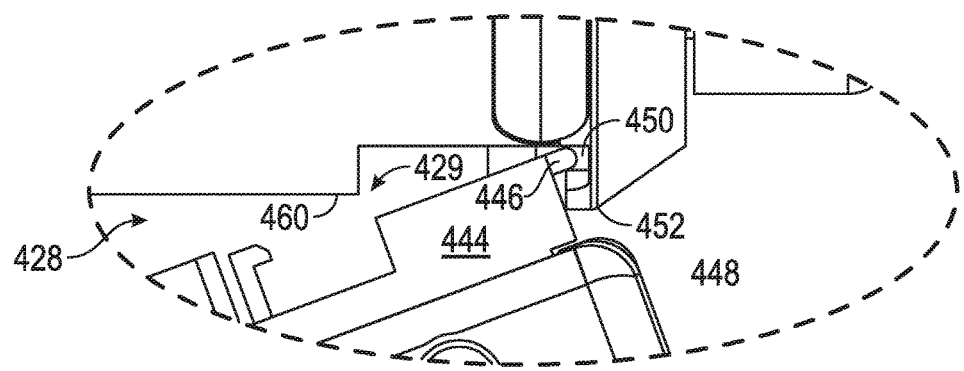
FIG. 8 is another enlarged partial side view of the interface portion of the probe end of FIG. 5.
Figure 9:
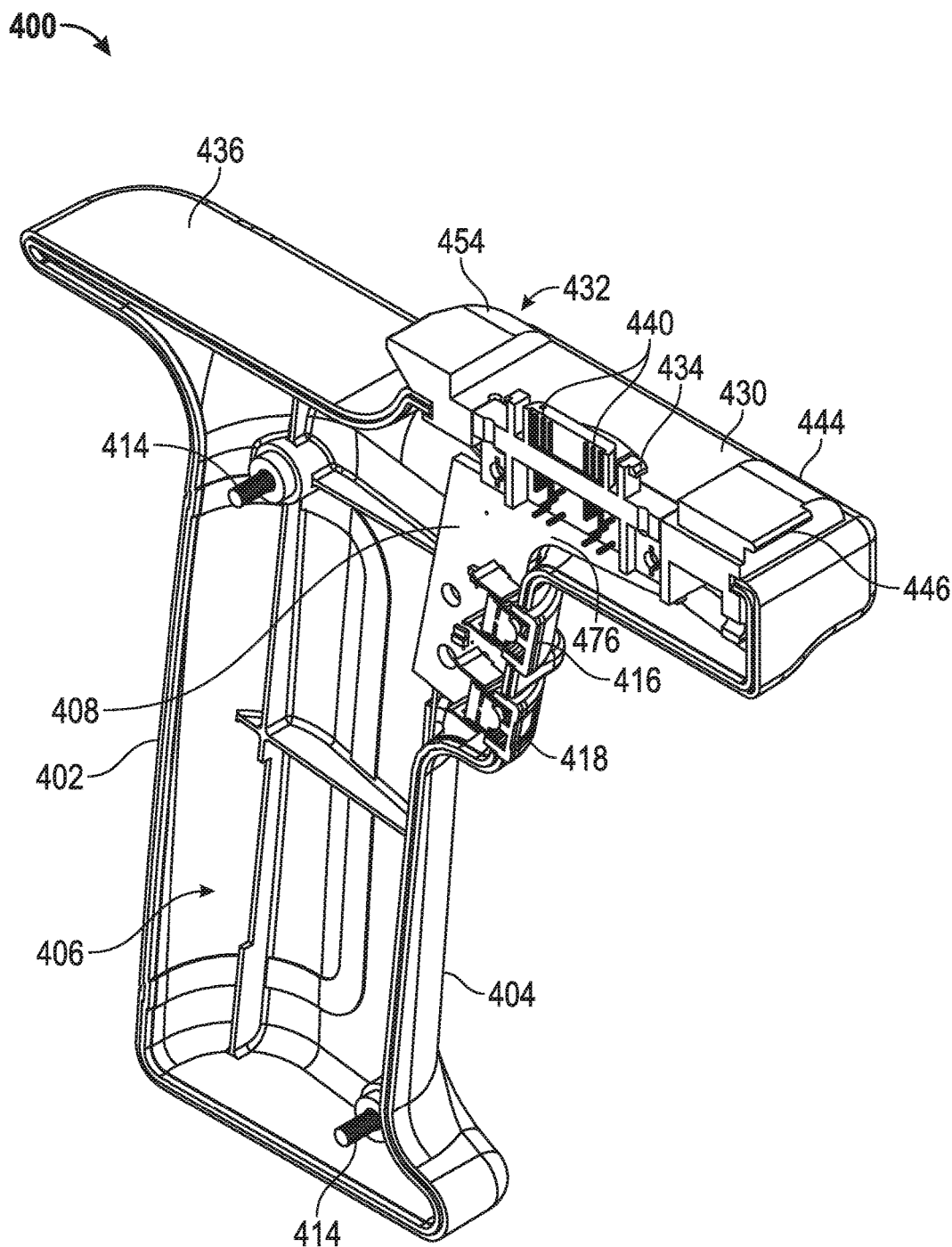
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. It should be appreciated that the illustrated embodiment shows a particular configuration of a mechanical and electrical interface between the probe housing and the device 400, other interfaces may also be used. In the exemplary embodiment, the device 400 includes an enclosure 402 having a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g., Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as LEDs, sound generators, meters, displays or gauges for example. In one embodiment, the device 400 may include a digital voice recorder that allows for synchronization of verbal comments with a measured point. In yet another embodiment, the device 400 includes a microphone that allows the operator to record comments or transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
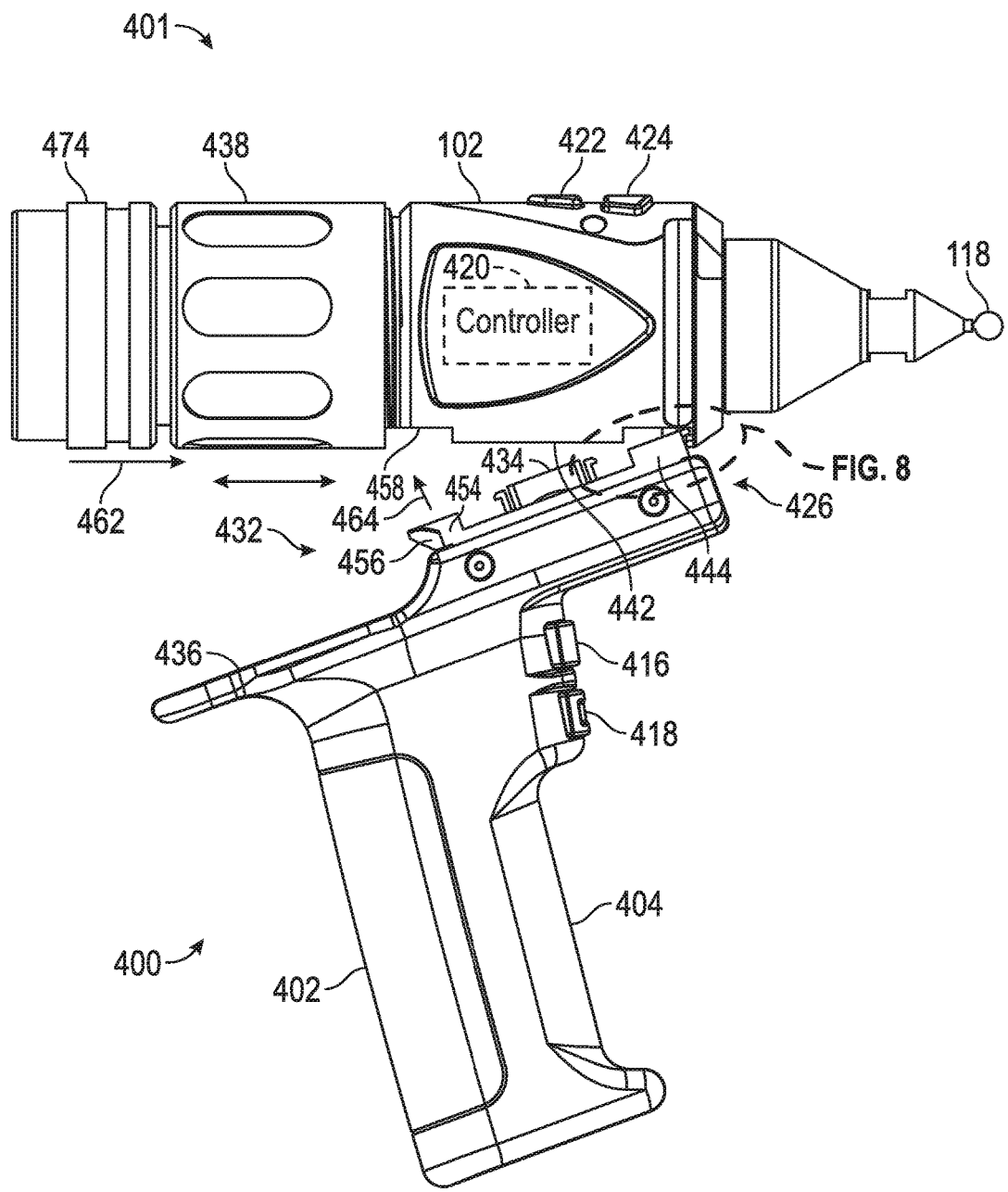
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that is adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
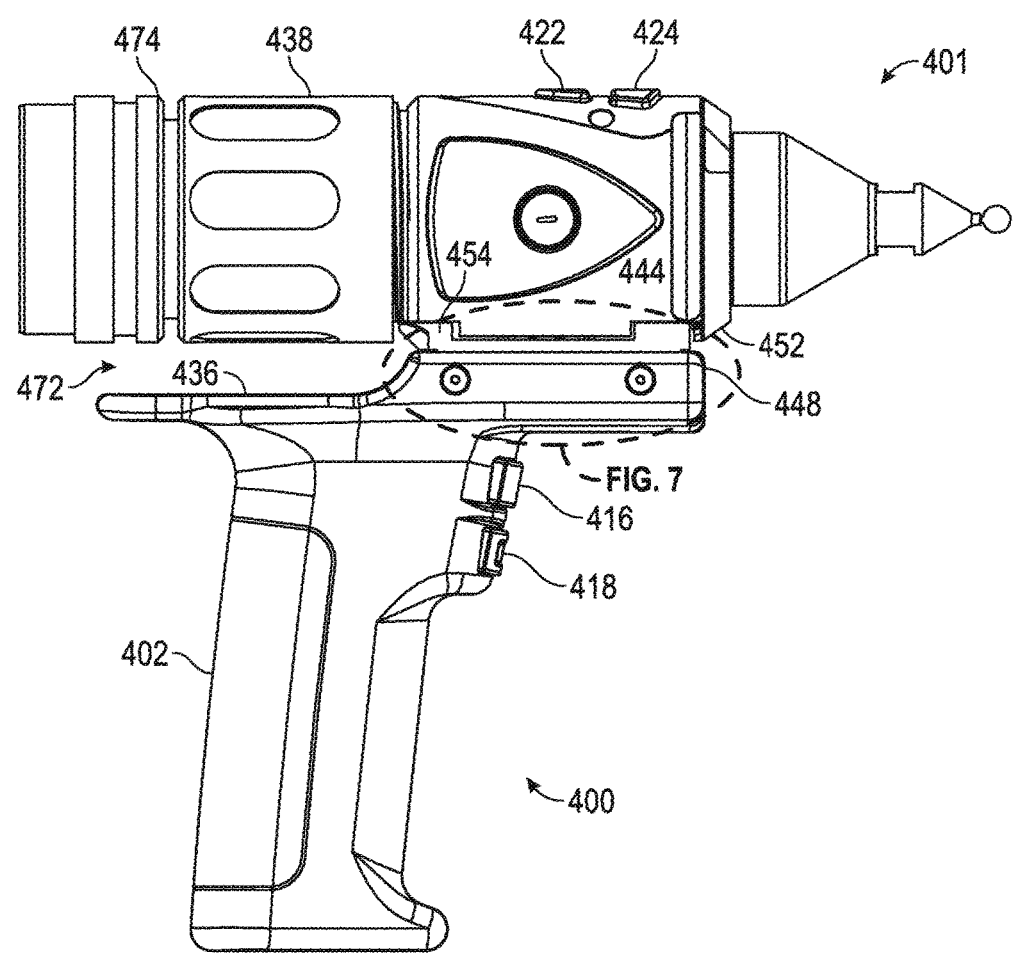
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the LLP 242. This provides advantages in simplifying the requirements of controller 420 and allows for upgraded or increased functionality through the addition of accessory devices.

Figure 10A:
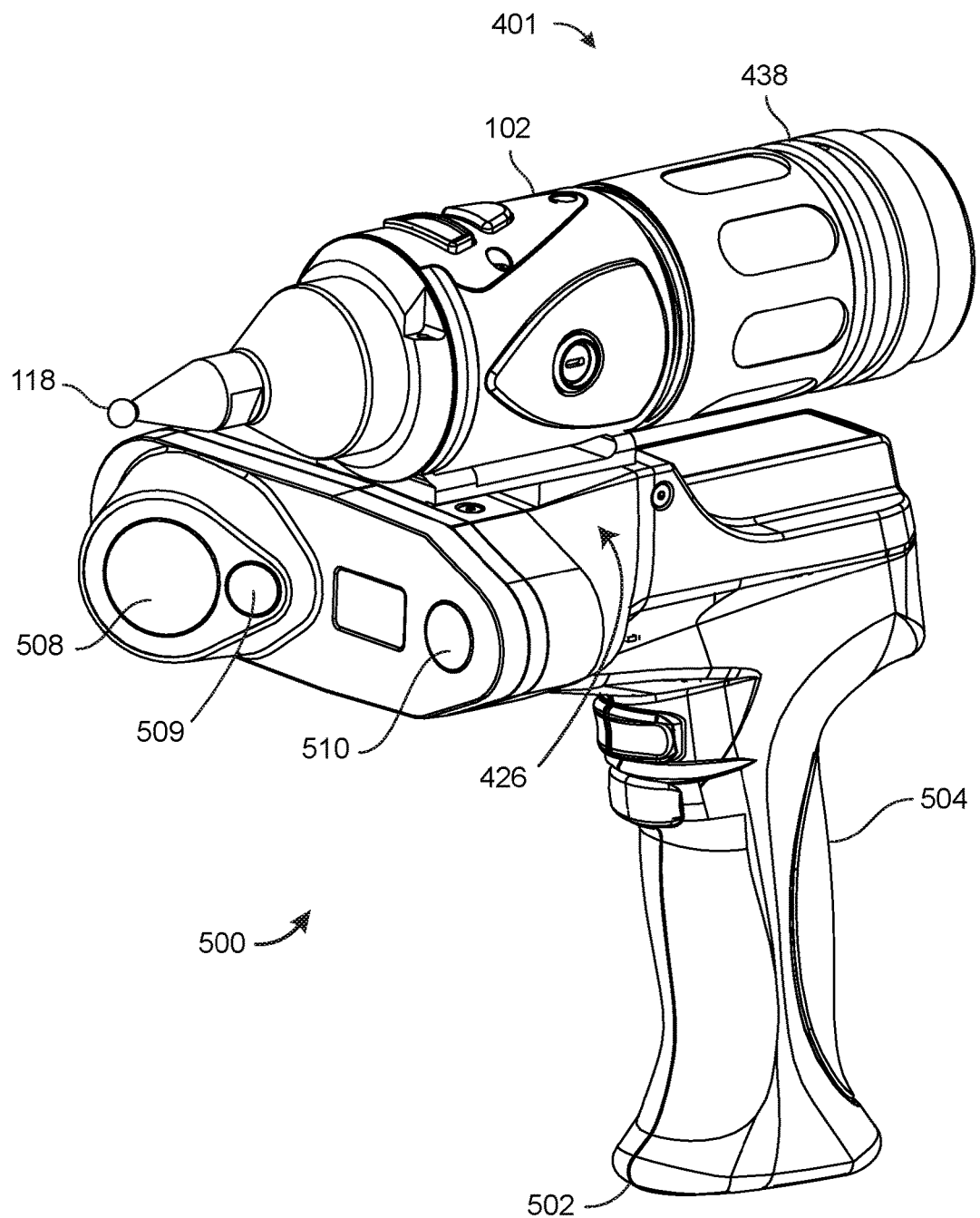
FIG. 10A is an isometric view of the probe end of the AACMM of FIG. 1 with an LLP attached.

Referring to FIGS. 10-11, embodiments of the present invention provide advantages for camera, signal processing, control, and indicator interfaces for an scanner 500, which is part of a measurement unit 490. The scanner 500 may refer to the electrical elements LLP 242 as referenced hereinabove with respect to FIGS. 1-9. The scanner may be an LLP or it may be an area scanner, as explained in more detail herein below. The LLP 500 provides for non-contact measurements of an object, typically in the same frame of reference as that of the hard probe 118 of the AACMM 100, as discussed herein above. Further, the calculated three-dimensional coordinates of surface points provided by the scanner 500 are based on the known principles of triangulation, as explained in more detail herein below. The scanner 500 may include an enclosure 502 with a handle portion 504. The LLP 500 further includes an interface 426 on one end that mechanically and electrically couples the scanner 500 to the probe housing 102 as described hereinabove. The interface 426 allows the scanner 500 to be coupled and removed from the AACMM 100 quickly and easily without requiring additional tools.

Adjacent the interface 426, the enclosure 502 has a portion 506 (FIG. 11A) that includes a camera 508 and a projector 510. In the exemplary embodiment, the projector 510 uses a light source that generates a straight line projected onto an object surface. The light source may be a laser, a superluminescent diode (SLD), an incandescent light, a light emitting diode (LED), for example. The projected light may be visible or invisible, but visible light may be more convenient for an operator in some cases. The camera 508 includes a lens and an imaging sensor. The imaging sensor is a photosensitive array that may be a charge-coupled device (CCD) two-dimensional (2D) area sensor or a complementary metal-oxide-semiconductor (CMOS) 2D area sensor, for example, or it may be some other type of device. Each imaging sensor may comprise a 2D array (i.e., rows, columns) of a plurality of light sensing picture elements (pixels). Each pixel typically contains at least one photodetector that converts light into an electric charge stored within the pixel wells, and read out as a voltage value. Voltage values are converted into digital values by an analog-to-digital converter (ADC). Typically for a CMOS sensor chip, the ADC is contained within the sensor chip. Typically for a CCD sensor chip, the ADC is included outside the sensor chip on a circuit board.

In an exemplary embodiment, the projector 510 and camera 508 are oriented to enable reflected light to be imaged by the photosensitive array. In one embodiment, the scanner 500 is offset from the probe tip 118 to enable the scanner 500 to be operated without interference from the probe tip 118. In other words, the scanner 500 may be operated with the probe tip 118 in place. Further, it should be appreciated that the scanner 500 is substantially fixed relative to the probe tip 118 so that forces on the handle portion 504 do not influence the alignment of the scanner 500 relative to the probe tip 118. In one embodiment, the scanner 500 may have an additional actuator (not shown) that allows the operator to switch between acquiring data from the scanner 500 and the probe tip 118.

The projector 510 and camera 508 are electrically coupled to a controller 512 disposed within the enclosure 502. The controller 512 may include one or more microprocessors, digital signal processors, memory, and other types of signal conditioning and/or storage circuits. In an embodiment, due to the large data volume generated by the scanner 500, the controller 512 may be arranged within the handle portion 504. The controller 512 is electrically coupled to the arm buses 218 via electrical connector 434. The scanner 500 further includes actuators 514, 516 which may be manually activated by the operator to initiate operation and data capture by the scanner 500.

The marker light source 509 emits a beam of light that intersects the beam of light from the projector 510. The position at which the two beams intersect provides an indication to the user of the optimum distance from the scanner 500 to the object under test. The scanner 500 will make good measurements for some distance on either side of the optimum distance, but the position of intersection of the beams of light from marker light source 509 and the projector 510 provides the user with a convenient indication of the proper stand-off distance for the scanner 500.

Figure 10B:
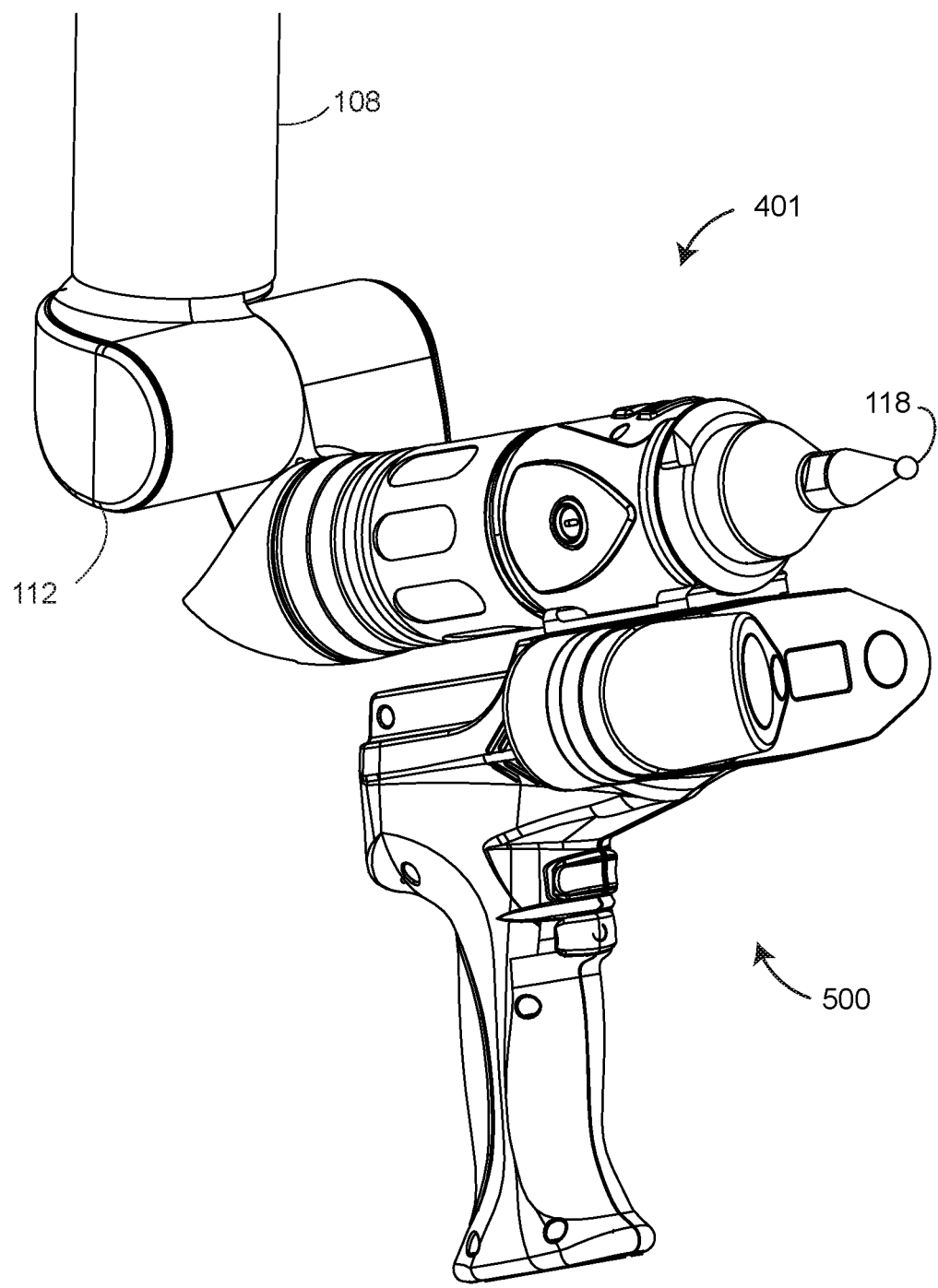
FIG. 10B is an isometric view of an end of the AACMM that includes the probe tip 118 and scanner 500.

FIG. 10B shows the probe end 401 and scanner 500 attached to the second grouping of bearing cartridges 112. This grouping is attached to the second arm segment 108, which is a part of the AACMM 100.

Figure 10C:
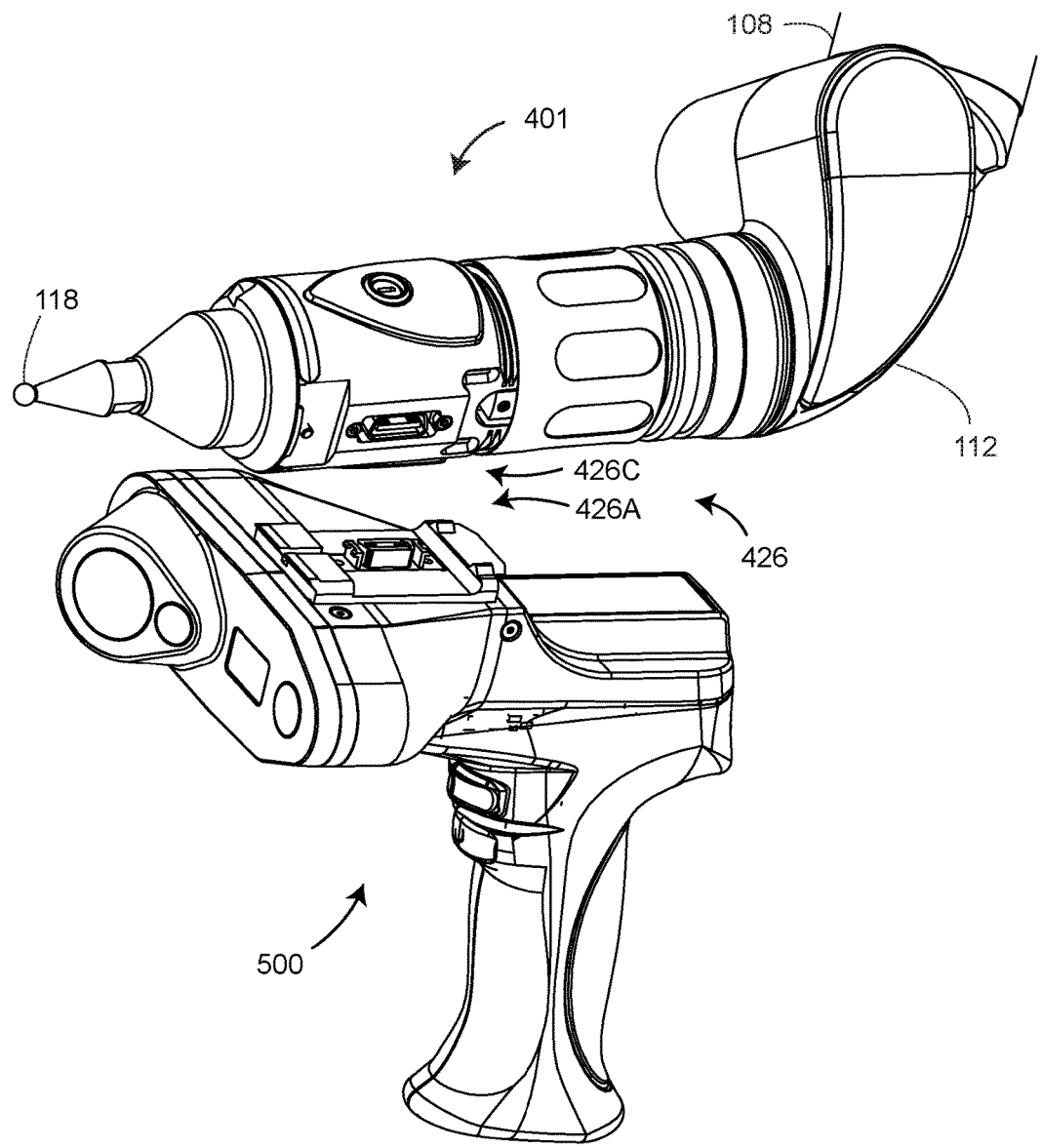
FIG. 10C is an isometric view of an end of the AACMM in a partially disassembled and rotated position.

FIG. 10C shows the probe end 401 and the scanner 500 in an exploded and rotated view that shows the interface 426 that includes scanner connector 426A and the probe end connector 426C.

Figure 11A:
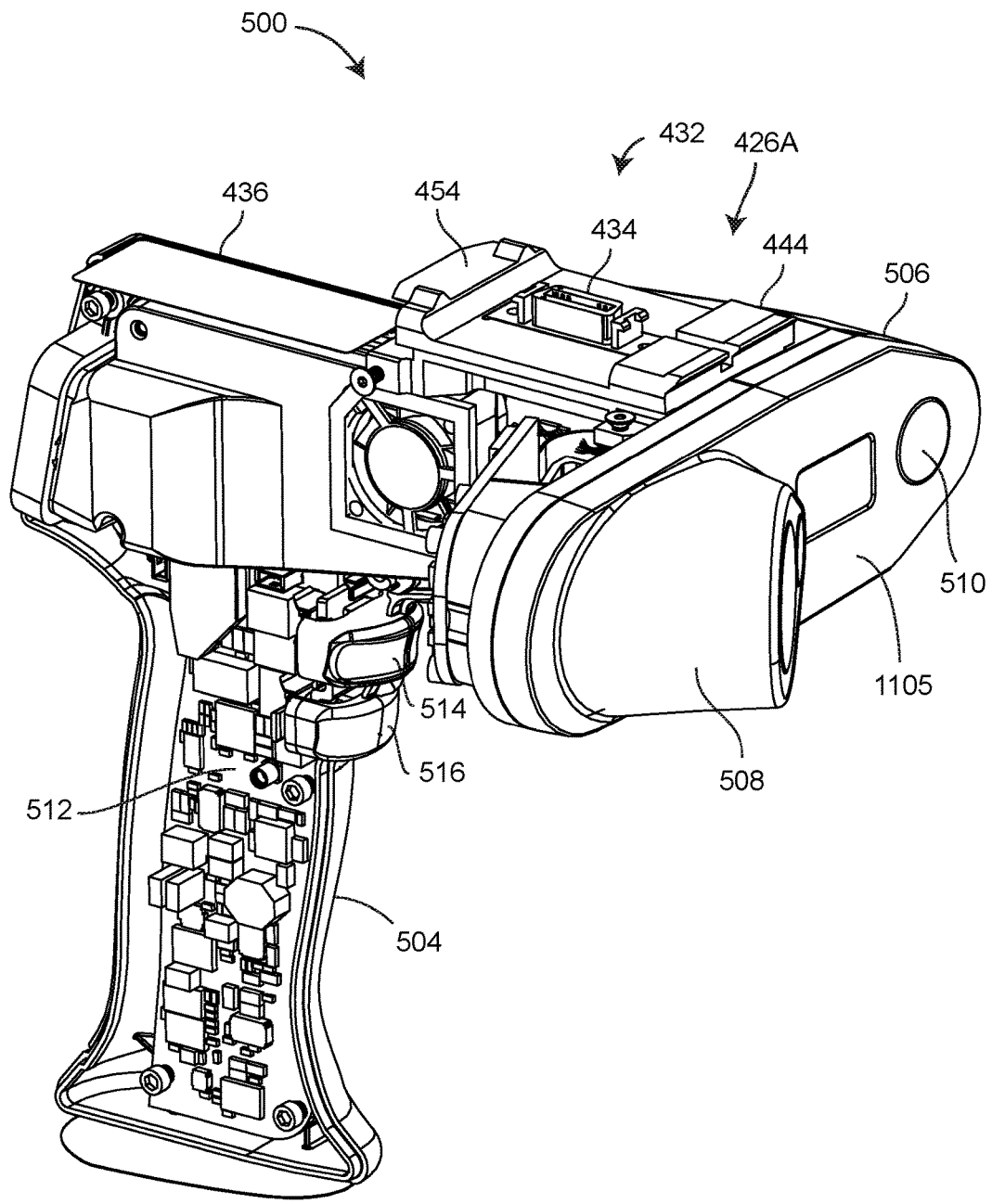
FIG. 11A is an isometric view partially in section of the LLP of FIG. 10A.
Figure 11B:
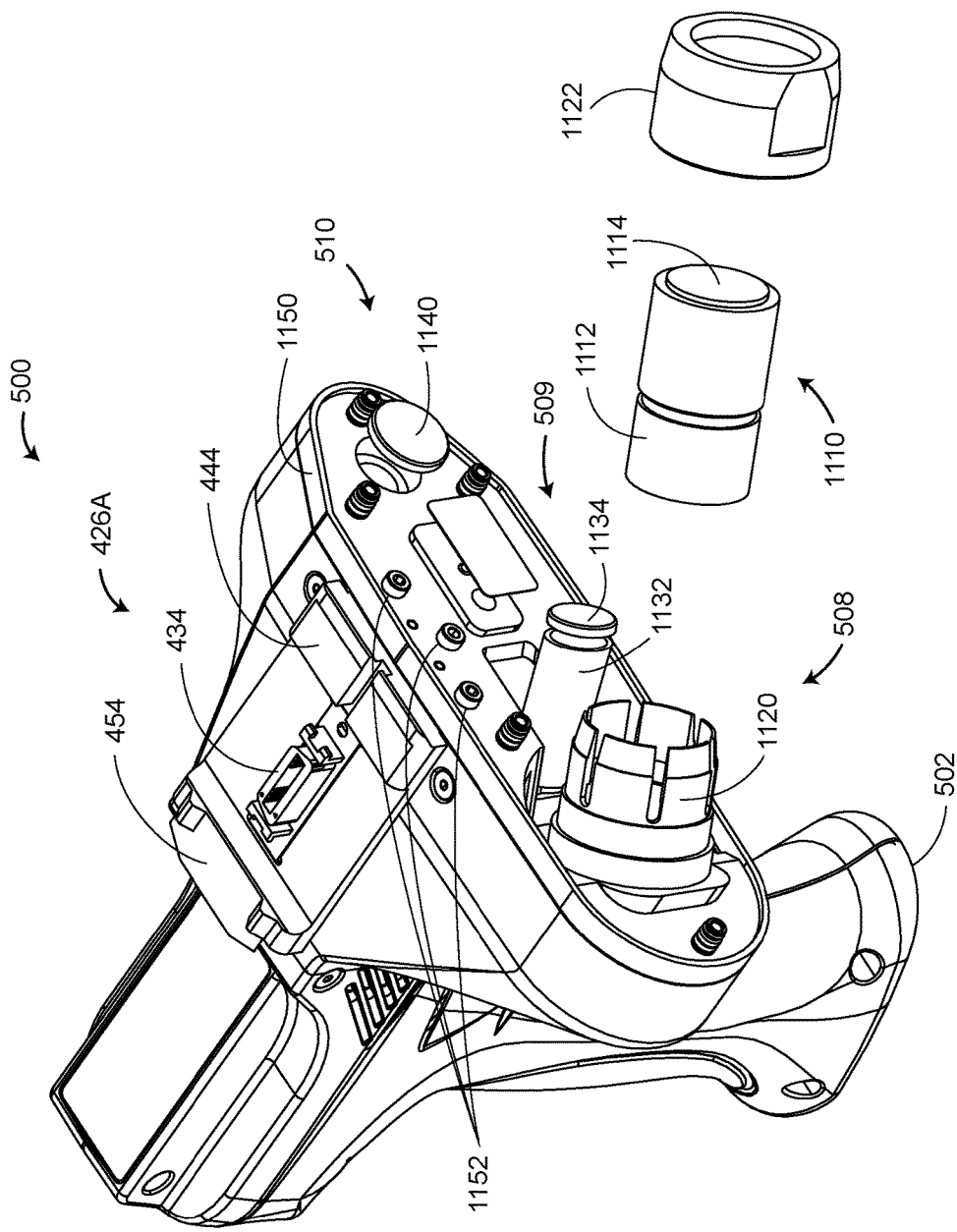
FIG. 11B is an isometric view, partially disassembled, of the LLP of FIG. 10A.

FIGS. 11A and 11B show internal elements of the scanner 500 according to an embodiment. FIG. 11A is a partial sectional view that reveals some electrical components within the handle 504. The electrical components include connections to actuators (e.g., pushbuttons) 514, 516. Additional electrical components are located above the handle 504 in the enclosure of the scanner 500. In an embodiment, an outer shell 1105, which in an embodiment is made of plastic, is provided for cosmetic appearance and protection.

FIG. 11B is a partial disassembled view of the scanner 500. In an embodiment, elements of camera 508 include a camera assembly 1110 that includes a housing 1112, multiple lens elements (not shown) within the housing 112, and a protective cover window 1114. The camera assembly 1110 is held in place by tabs or fingers 1120, which are held tightly against the fingers by the clamp 1122. In an embodiment, the marker light source 509 includes a housing 1132 and a cover window 1134. The projector includes a cover window 1140. The windows 1114, 1134, and 1140 lie substantially flush with the exterior surface of the outer shell 1105 to facilitate cleaning of the window surfaces. The scanner 500 includes a rigid structure having elements that include a front metal panel 1150, the camera 508, the marker light source 509, the projector 510, and the mechanical and electrical interface 426. These elements are held in together in a rigid and stable assembly. The front metal panel 1150 is attached to the interface 426 with screws 1152.

Figure 12:
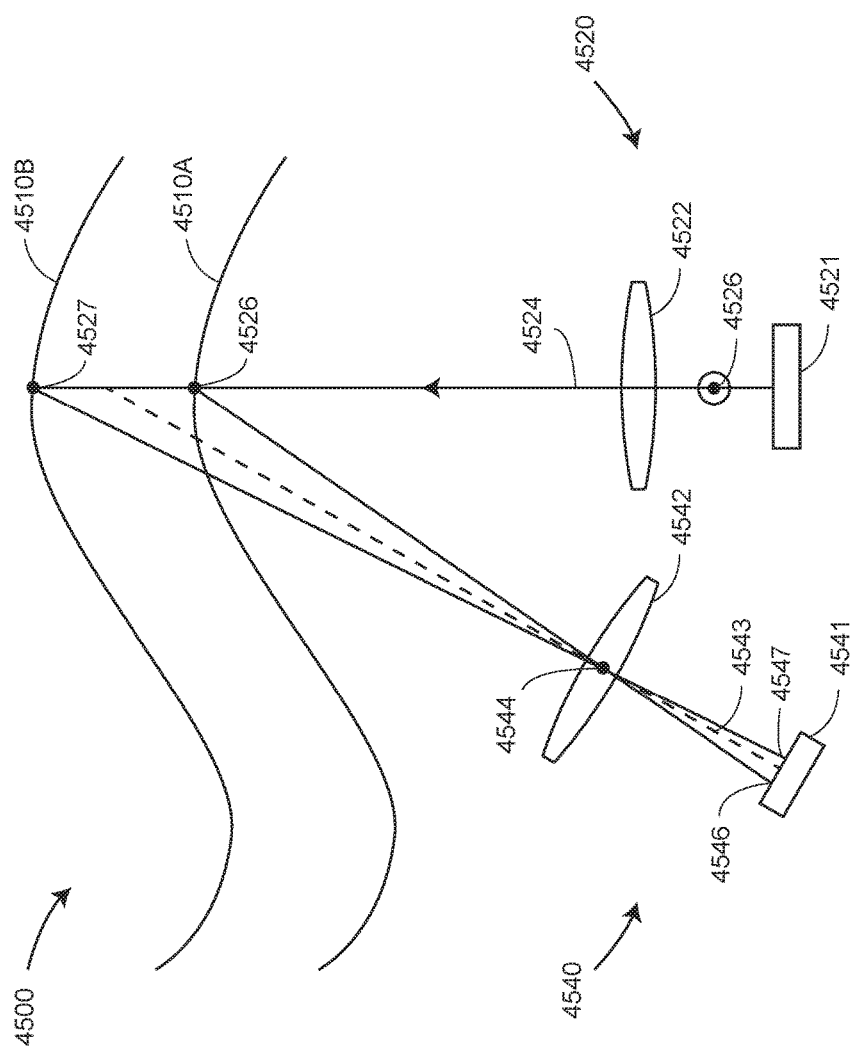
FIG. 12 is a schematic illustration of the principle of operation of an LLP according to an embodiment.

FIG. 12 shows elements of an LLP 4500 that includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 12, a central ray of the beam of light 4524 is aligned with the projector optical axis. The camera 4540 includes a camera lens 4542 and a photosensitive array 4541. The lens has a camera optical axis 4543 that passes through a camera lens perspective center 4544. In the exemplary system 4500, the projector optical axis, which is aligned to the beam of light 4524 and the camera lens optical axis 4544, are perpendicular to the line of light 4523 projected by the source pattern of light 4521. In other words, the line 4523 is in the direction perpendicular to the paper in FIG. 12. The line strikes an object surface, which at a first distance from the projector is object surface 4510A and at a second distance from the projector is object surface 4510B. It is understood that at different heights above or below the plane of the paper of FIG. 12, the object surface may be at a different distance from the projector. The line of light intersects surface 4510A (in the plane of the paper) in a point 4526, and it intersects the surface 4510B (in the plane of the paper) in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined using the principles of triangulation. The distance from the projector to other points on the line of light 4526, that is points on the line of light that do not lie in the plane of the paper of FIG. 12, may similarly be found.

In an embodiment, the photosensitive array 4541 is aligned to place either the array rows or columns in the direction of the reflected laser stripe. In this case, the position of a spot of light along one direction of the array provides information to determine a distance to the object, as indicated by the difference in the positions of the spots 4546 and 4547 of FIG. 12. The position of the spot of light in the orthogonal direction on the array provides information to determine where, along the length of the laser line, the plane of light intersects the object.

As used herein, it is understood that the terms column and row refer simply to a first direction along the photosensitive array and a second direction perpendicular to the first direction. As such, the terms row and column as used herein do not necessarily refer to row and columns according to documentation provided by a manufacturer of the photosensitive array 4541. In the discussion that follows, the rows are taken to be in the plane of the paper on the surface of the photosensitive array. The columns are taken to be on the surface of the photosensitive array and orthogonal to the rows. However it should be appreciated that other arrangements are possible.

Figure 13A:
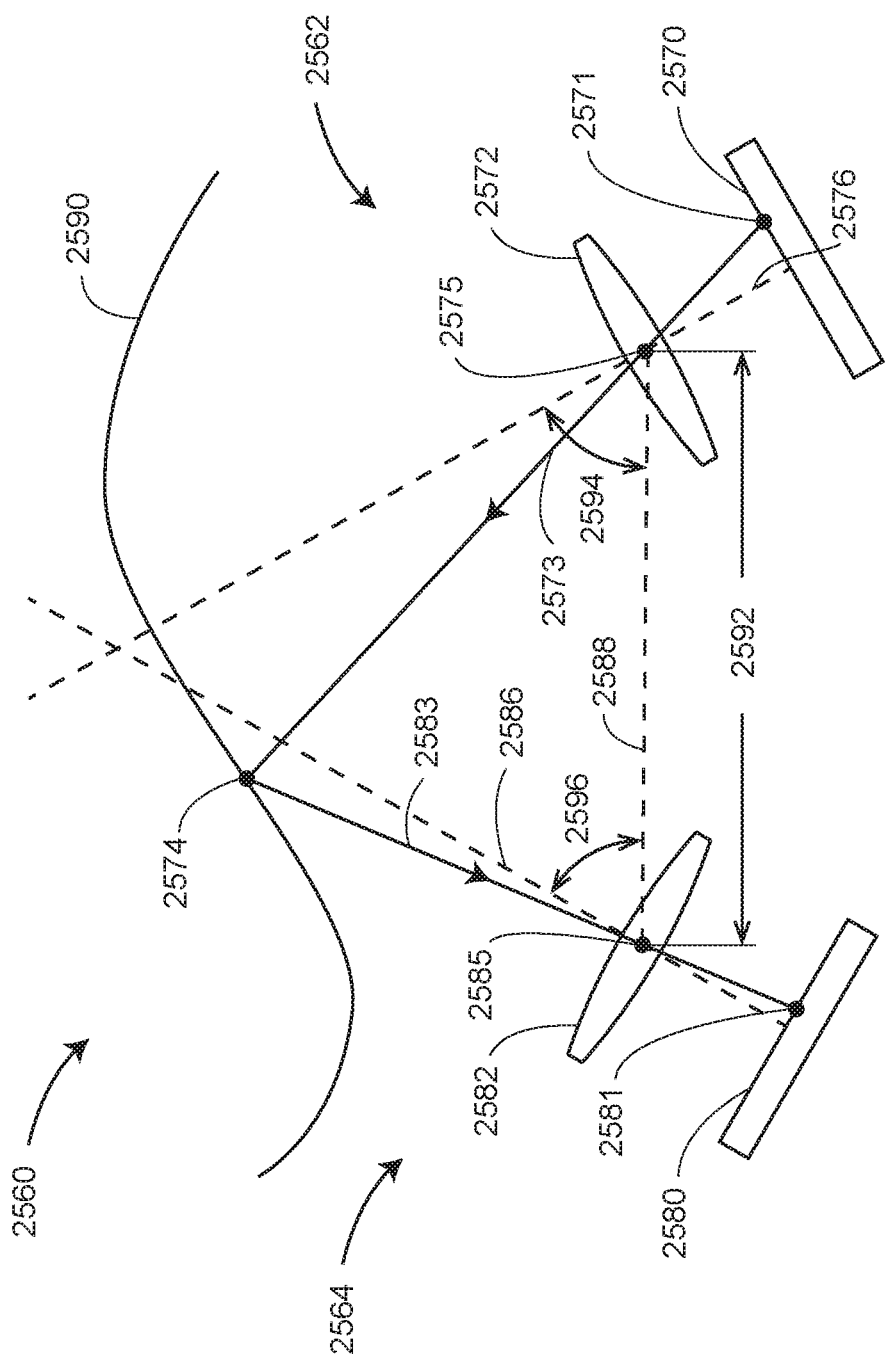
FIGS. 13A and 13B are schematic illustrations of the principle of triangulation for a structured light scanner according to two embodiments.

As explained herein above, light from a scanner may be projected in a line pattern to collect 3D coordinates over a line. Alternatively, light from a scanner may be projected to cover an area, thereby obtaining 3D coordinates over an area on an object surface. In an embodiment, the projector 508 in FIGS. 10-11 is an area projector rather than a line projector. An explanation of triangulation principles for the case of area projection is now given with reference to the system 2560 of FIG. 13A and the system 4760 of FIG. 13B. Referring first to FIG. 13A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

Figure 13B:
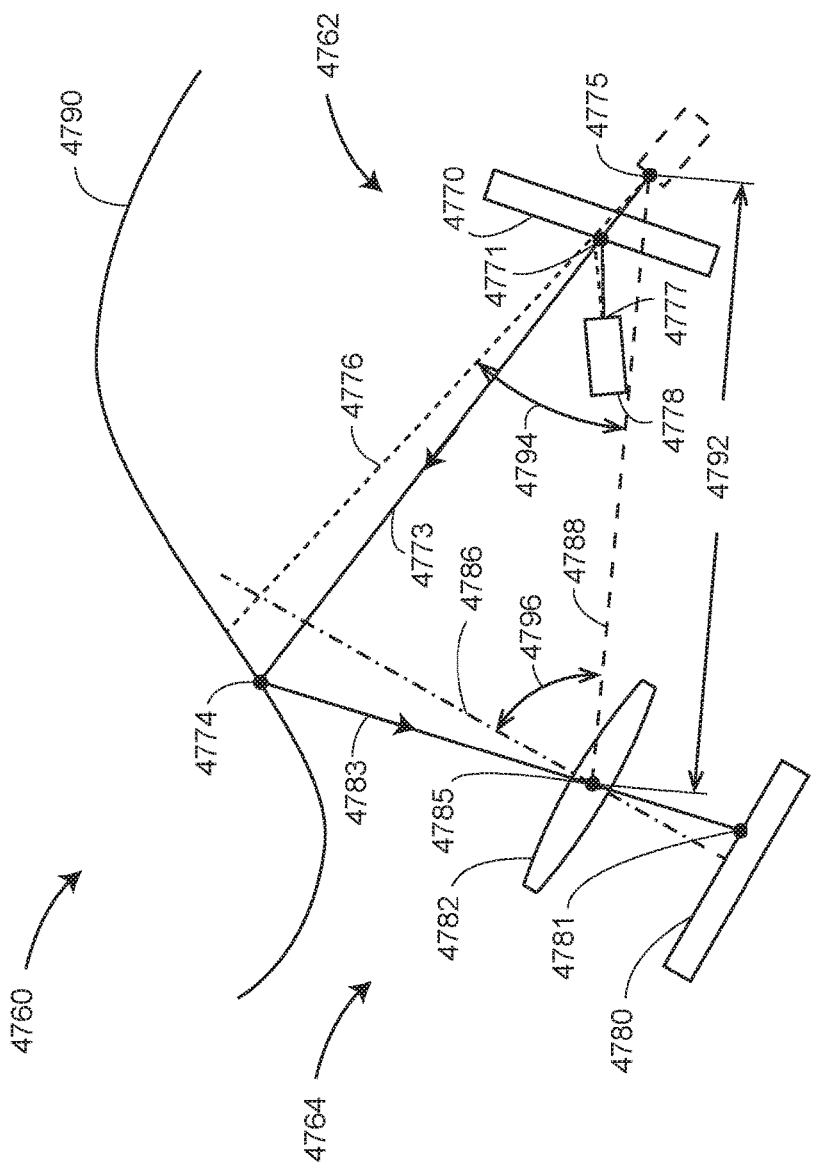

The line segment that connects the perspective centers is the baseline 2588 in FIG. 13A and the baseline 4788 in FIG. 13B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 13B, the system 4760 is similar to the system 2560 of FIG. 13A except that the system 4760 does not include a lens. The system may include a projector 4762 and a camera 4764. In the embodiment illustrated in FIG. 13B, the projector includes a light source 4778 and a light modulator 4770. The light source 4778 may be a laser light source since such a light source may remain in focus for a long distance using the geometry of FIG. 13B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. One method for doing this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation methods are known to those skilled in the art, some additional technical information is given herein below for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple model shown in FIG. 13A is obtained. It should be understood that this description provides a good first order approximation of the behavior of the light but that additional fine corrections can be made to account for lens aberrations that can cause the rays to be slightly displaced relative to positions calculated using the model of FIG. 13A. Although the baseline length, the baseline projector angle, and the baseline camera angle are generally used, it does not exclude the possibility that other similar but slightly different formulations of the model may be applied without loss of generality in the description given herein.

In some cases, a scanner system may include two cameras in addition to a projector. In other cases, a triangulation system may be constructed using two cameras alone, wherein the cameras are configured to image points of light on an object or in an environment. For the case in which two cameras are used, whether with or without a projector, a triangulation may be performed between the camera images using a baseline between the two cameras. In this case, the triangulation may be understood with reference to FIG. 13A, with the projector 2562 replaced by a camera.

In some cases, different types of scan patterns may be advantageously combined to obtain better performance in less time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581. A coded feature on the source pattern of light 2570 may be identified on the photosensitive array 2580.

An advantage of using coded patterns is that three-dimensional coordinates for object surface points can be quickly obtained using a single image of an area. However, a sequential structured light approach, such as the sinusoidal phase-shift approach discussed above, may give more accurate results. Therefore, the user may advantageously choose to measure certain objects or certain object areas or features using different projection methods according to the accuracy desired. By using a selectable source pattern of light, such a selection may be changed as desired by the operator to provide the desired result.

A line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width, and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

It should be noted that although the descriptions given above distinguish between line scanners and area (structured light) scanners based on whether three or more pattern elements are collinear, it should be noted that the intent of this criterion is to distinguish patterns projected as areas and as lines. Consequently patterns projected in a linear fashion having information only along a single path are still line patterns even though the one-dimensional pattern may be curved.

As explained herein above, an LLP or area scanner may be used with an AACMM to obtain the position and orientation of the LLP or area scanner. Another method of measuring with an LLP is to remove the LLP from the AACMM and hold it by hand. The position and orientation of the LLP or area scanner relative to an object may be determined by registering multiple scans together based on commonly observed features.

It is also known to use scanner 2500, which might be a line scanner or area scanner, with a six-DOF (degree-of-freedom) laser tracker 900 as shown in FIG. 14A. The scanner 2505 includes a projector 2520 that in an embodiment projects a two dimensional pattern of light (structured light). Such light emerges from the projector lens perspective center and travels in an expanding pattern outward until it intersects the object 2528. Examples of this type of pattern are the coded pattern and the periodic pattern, as explained herein above. In another embodiment, the projector 2520 may project a one-dimensional pattern of light, thereby performing as an LLP or line scanner.

Figure 14B:
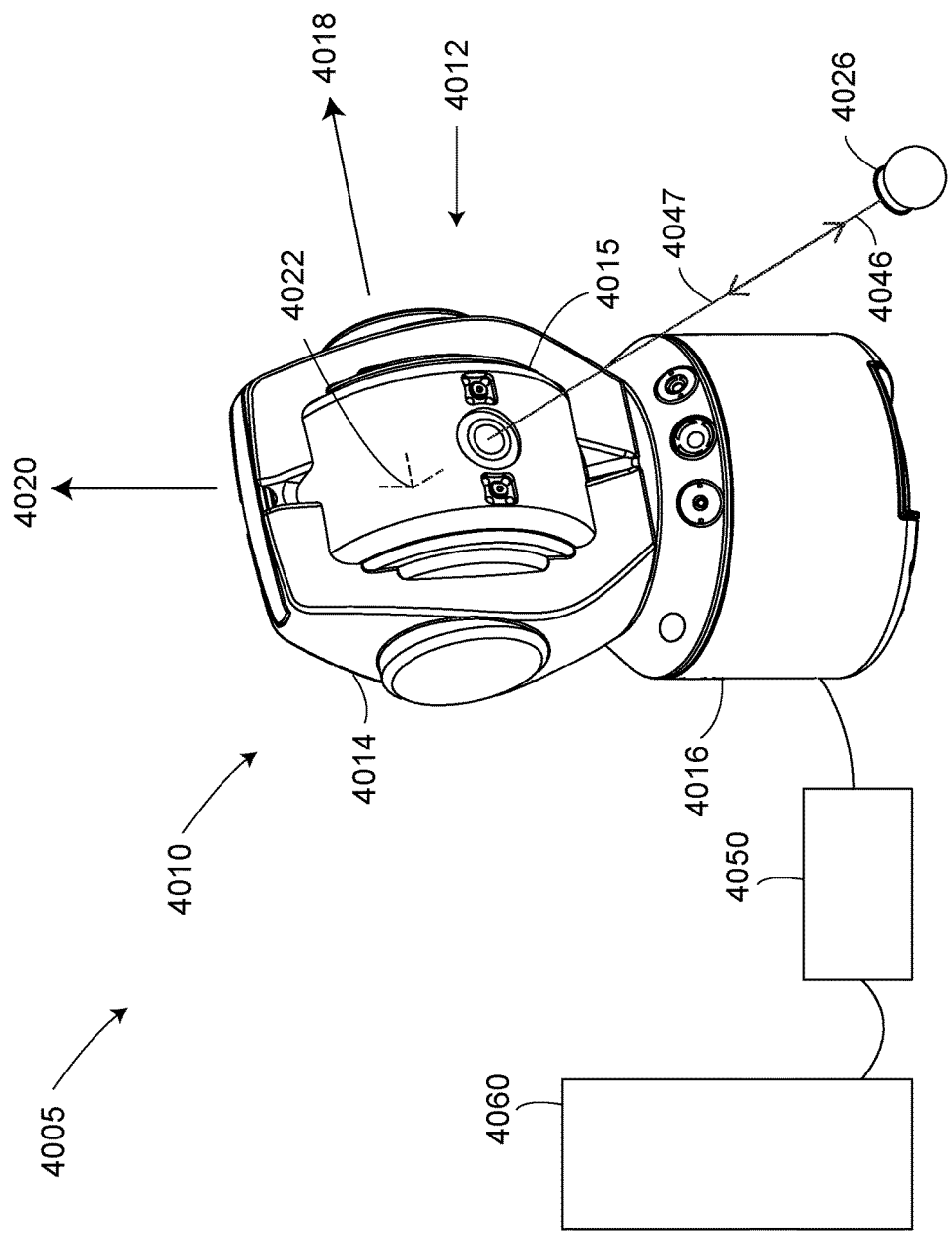
FIG. 14B is an isometric drawing of a laser tracker according to an embodiment.

An exemplary laser tracker system 4005 illustrated in FIG. 14B includes a laser tracker 4010, a retroreflector target 4026, an optional auxiliary unit processor 4050, and an optional auxiliary computer 4060. An exemplary gimbaled beam-steering mechanism 4012 of laser tracker 4010 comprises a zenith carriage 4014 mounted on an azimuth base 4016 and rotated about an azimuth axis 4020. A payload 4015 is mounted on the zenith carriage 4014 and rotated about a zenith axis 4018. Zenith axis 4018 and azimuth axis 4020 intersect orthogonally, internally to tracker 4010, at gimbal point 4022, which is typically the origin for distance measurements. A laser beam 4046 virtually passes through the gimbal point 4022 and is pointed orthogonal to zenith axis 4018. In other words, laser beam 4046 lies in a plane approximately perpendicular to the zenith axis 4018 and that passes through the azimuth axis 4020. Outgoing laser beam 4046 is pointed in the desired direction by rotation of payload 4015 about zenith axis 4018 and by rotation of zenith carriage 4014 about azimuth axis 4020. A zenith angular encoder, internal to the tracker, is attached to a zenith mechanical axis aligned to the zenith axis 4018. An azimuth angular encoder, internal to the tracker, is attached to an azimuth mechanical axis aligned to the azimuth axis 4020. The zenith and azimuth angular encoders measure the zenith and azimuth angles of rotation to relatively high accuracy. Outgoing laser beam 4046 travels to the retroreflector target 4026, which might be, for example, a spherically mounted retroreflector (SMR) as described above. By measuring the radial distance between gimbal point 4022 and retroreflector 4026, the rotation angle about the zenith axis 4018, and the rotation angle about the azimuth axis 4020, the position of retroreflector 4026 is found within the spherical coordinate system of the tracker.

Outgoing laser beam 4046 may include one or more laser wavelengths, as described hereinafter. For the sake of clarity and simplicity, a steering mechanism of the sort shown in FIG. 14B is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Several laser trackers are available or have been proposed for measuring six, rather than the ordinary three, degrees of freedom. Exemplary six degree-of-freedom (six-DOF) systems are described by U.S. Pat. No. 7,800,758 ('758) to Bridges et al., U.S. Pat. No. 8,525,983 ('983) to Bridges et al., U.S. Pat. No. 6,166,809 ('809) to Pettersen et al., and U.S. Patent Application No. 2010/0149525 ('525) to Lau, the contents all of which are incorporated by reference. Six-DOF systems provide measurements of three orientational degrees-of-freedom as well as three positional degrees-of-freedom (i.e., x, y, z).

FIG. 14A shows an embodiment of a six-DOF scanner 2500 used in conjunction with a six-DOF laser tracker 900. The six-DOF laser tracker 900 sends a beam of light 784 to a retroreflector 2510, 2511 on the six-DOF scanner 2500. The six-DOF tracker 900 measures the distance from the tracker 900 to scanner 2500 with a distance meter (not shown) in the tracker, and it measures two angles from the tracker 900 to the six-DOF scanner 2500 using two angle transducers such as angular encoders (not shown). The six-DOF scanner 2500 includes a body 2514, one or more retroreflectors 2510, 2511 a scanner camera 2530, a scanner light projector 2520, an optional electrical cable 2546, an optional battery 2444, an antenna 2548, and electronics circuit board 2542. The antenna 2548 if present provides wireless communication between the six-DOF scanner 2500 and other computing devices such as the laser tracker 900 and external computers. The scanner projector 2520 and the scanner camera 2530 together are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, an liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the six-DOF scanner from a variety of directions, thereby giving greater flexibility in the directions to which light may be projected by the six-DOF projector 2500.

The six-DOF scanner 2500 may be held by hand or mounted, for example, on a tripod, an instrument stand, a motorized carriage, or a robot end effector. The three dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the six-DOF scanner 2500.

The six degrees of freedom of the six-DOF scanner are known by the six-DOF laser tracker using the methods described in patent '758. From the six degrees of freedom, the three dimensional coordinates of the scanned line of light may be found in the tracker frame of reference, which in turn may be converted into the frame of reference of the workpiece 2528 through the measurement by the laser tracker of three points on the workpiece, for example.

If the six-DOF scanner 2500 is held by hand, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. In an embodiment, when using a scanner 2500 that emits a structured pattern of light, more accurate measurements may be made by mounting the six-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the six-DOF scanner 2500 is moved by hand at a reasonable speed.

In some cases, it is advantageous to measure the features such as edges or holes using an optional tactile probe 2550 attached to the six-DOF scanner 2500. The tactile probe 2550 in FIG. 14A includes such as a probe tip 2554, which is part of a probe extension assembly 2550. In an embodiment, the projector 2520 sends a laser beam to illuminate the region to be measured.

As explained herein above, the laser tracker 900 measures a distance and two angles to determine three positional degrees-of-freedom (x, y, z) of the six-DOF scanner 2500. There are many possible methods of determining the three orientational degrees-of-freedom of the six-DOF scanner 2500. These methods are described in more detail herein below.

As explained herein above, a measurement device such as a tactile probe, LLP, or area scanner may be attached to an AACMM. Alternatively, the measurement device may be held by hand with registration provided by matching of registration targets or by measuring of a six-DOF target with a laser tracker. In another alternative, illuminated markers are attached to a measurement device, which might for example be a tactile probe, line scanner, or area scanner. The illuminated markers are measured with a camera bar having two or more cameras. With this method, the position and orientation of the measurement device can be found within a desired frame of reference.

Figure 15A:
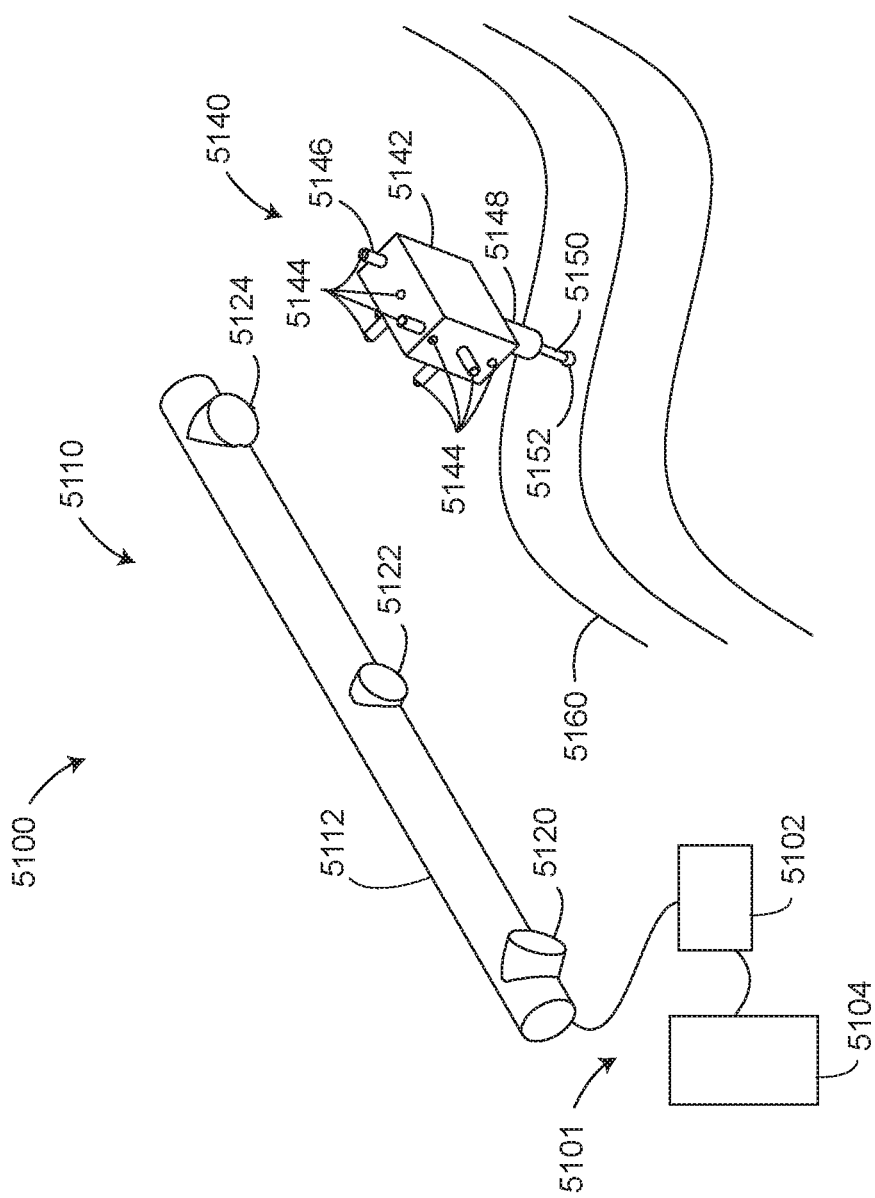
FIG. 15A shows a camera bar used to measure a tactile probe having targets viewable by the camera bar according to an embodiment.

FIG. 15A is a perspective view of a three-dimensional tactile probing system 5100 that includes a camera bar 5110 and a probe assembly 5140. The camera bar includes a mounting structure 5112 and at least two triangulation cameras 5120, 5124. It may also include an optional camera 5122. The cameras each include a lens and a photosensitive array, for example, as shown in the lens 2564 of FIG. 13A. The optional camera 5122 may be similar to the cameras 5120, 5124 or it may be a color camera. The probe assembly 5140 includes a housing 5142, a collection of lights 5144, optional pedestals 5146, shaft 5148, stylus 5150, and probe tip 5152. The position of the lights 5144 are known relative to the probe tip 5152. The lights may be light sources such as light emitting diodes or they might be reflective spots that may be illuminated by an external source of light. Factory or on-site compensation procedures may be used to find these positions. The shaft may be used to provide a handle for the operator, or another handle may be provided.

Triangulation of the image data collected by the cameras 5120, 5124 of the camera bar 5110 are used to find the three-dimensional coordinates of each point of light 5144 within the frame of reference of the camera bar. Throughout this document, and in the claims, the term "frame of reference" is taken to be synonymous with the term "coordinate system." Mathematical calculations, which are well known in the art, are used to find the position of the probe tip within the frame of reference of the camera bar. By bringing the probe tip 5152 into contact with an object 5160, surface points on the object can be measured.

An electrical system 5101 may include an electrical circuit board 5102 and an external computer 5104. The external computer 5104 may comprise a network of computers. The electrical system 5101 may include wired and wireless portions, either internal or external to the components of FIG. 15A that carry out the measurements and calculations to obtain three-dimensional coordinates of points on the surface. In general, the electrical system 5101 will include one or more processors, which may be computers, microprocessors, field programmable gate arrays (FPGAs), or digital signal processing (DSP) units, for example.

Figure 15B:
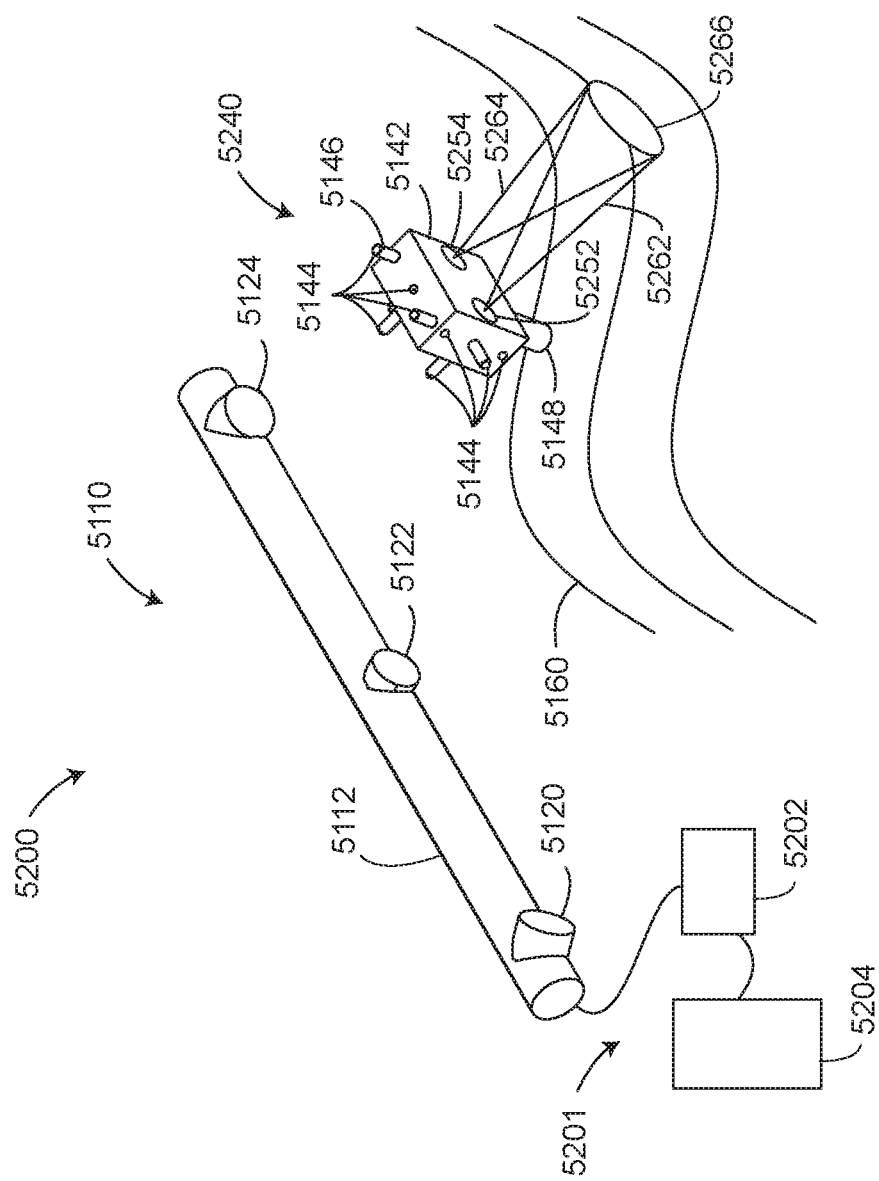
FIG. 15B shows a camera bar used to measure a triangulation area scanner having targets viewable by the camera bar according to an embodiment.

FIG. 15B is a perspective view of a three-dimensional area scanning system 5200 that includes a camera bar 5110 and a scanner assembly 5240. The camera bar was described herein above in reference to FIG. 15A. The scanner assembly 5240 includes a housing 5142, a collection of lights 5144, optional pedestals 5146, shaft 5148, projector 5252, and camera 5254. The characteristics of the housing 5142, lights 5144, optional pedestals 5146, and shaft 5148 were described hereinabove in reference to FIG. 15A. The projector 5252 projects light onto the object 5160. The projector 5252 may be a variety of types, for example, LED, laser, or other light source reflected off a digital micromirror device (DMD) such as a digital light projector (DLP) from Texas Instruments, a liquid crystal device (LCD) or liquid crystal on silicon (LCOS) device. The projected light might come from light sent through a slide pattern, for example, a chrome-on-glass slide, which might have a single pattern or multiple patterns, the slides moved in and out of position as needed. The projector 5252 projects light 5262 into an area 5266 on the object 5160. A portion of the illuminated area 5266 is imaged by the camera 5254 to obtain digital data.

The digital data may be partially processed using electrical circuitry within the scanner assembly 5240. The partially processed data may be provided to a system 5201 that includes an electrical circuit board 5202 and an external computer 5204. It should be appreciated that the external computer 5204 may comprise a network of computers. The electrical system 5201 may include wired and wireless portions, either internal or external to the components of FIG. 15B, that carry out the measurements and calculations to obtain three-dimensional coordinates of points on the surface 5160. In general, the system 5201 may include one or more processors, which may be computers, microprocessors, field programmable gate arrays (FPGAs), or digital signal processing (DSP) units, for example. The result of the calculations is a set of coordinates in the camera bar frame of reference, which may in turn be converted into another frame of reference, if desired.

Figure 15C:
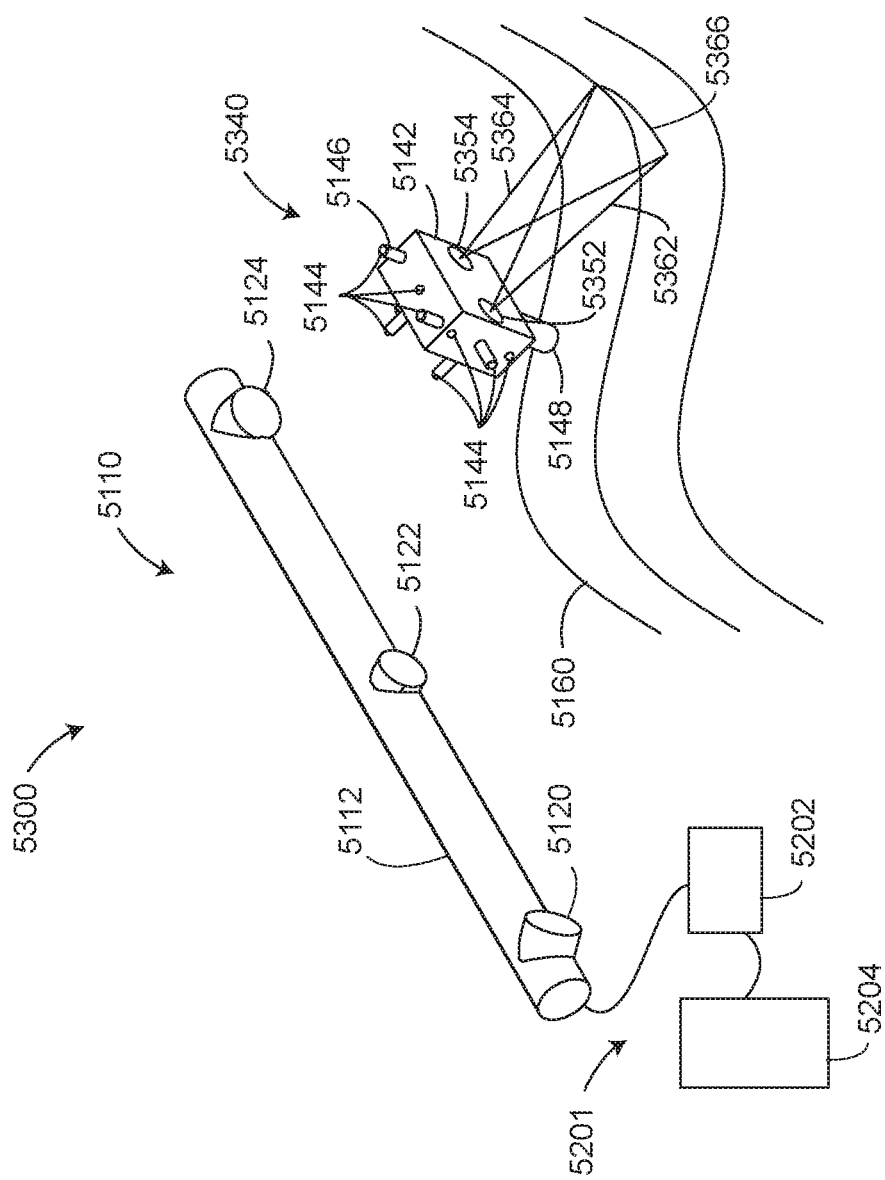
FIG. 15C shows a camera bar used to measure a triangulation line scanner having targets viewable by the camera bar according to an embodiment.

FIG. 15C is a perspective view of a three-dimensional line scanning system 5300 that includes a camera bar 5110 and a scanner assembly 5340. The camera bar was described hereinabove in reference to FIG. 15A. The scanner assembly 5340 includes a housing 5142, a collection of lights 5144, optional pedestals 5146, shaft 5148, projector 5352, and camera 5354. The characteristics of the housing 5142, lights 5144, optional pedestals 5146, and shaft 5148 were described hereinabove in reference to FIG. 15A. The projector 5352 projects light onto the object 5160. The projector 5352 may be a source of light that produces a stripe of light, for example, a laser that is sent through a cylinder lens or a Powell lens, or it may be a DLP or similar device also having the ability to project 2D patterns, as discussed hereinabove in reference to FIG. 15B. The projector 5352 projects light 5362 in a stripe 5366 onto the object 5160. A portion of the stripe pattern on the object is imaged by the camera 5354 to obtain digital data. The digital data may be processed in a manner similar to that described in reference to FIG. 15B using for example electrical components 5201. The result of the calculations is a set of three-dimensional coordinates of the object surface in the camera-bar frame of reference, which may in turn be converted into another frame of reference, if desired.

Figure 16:
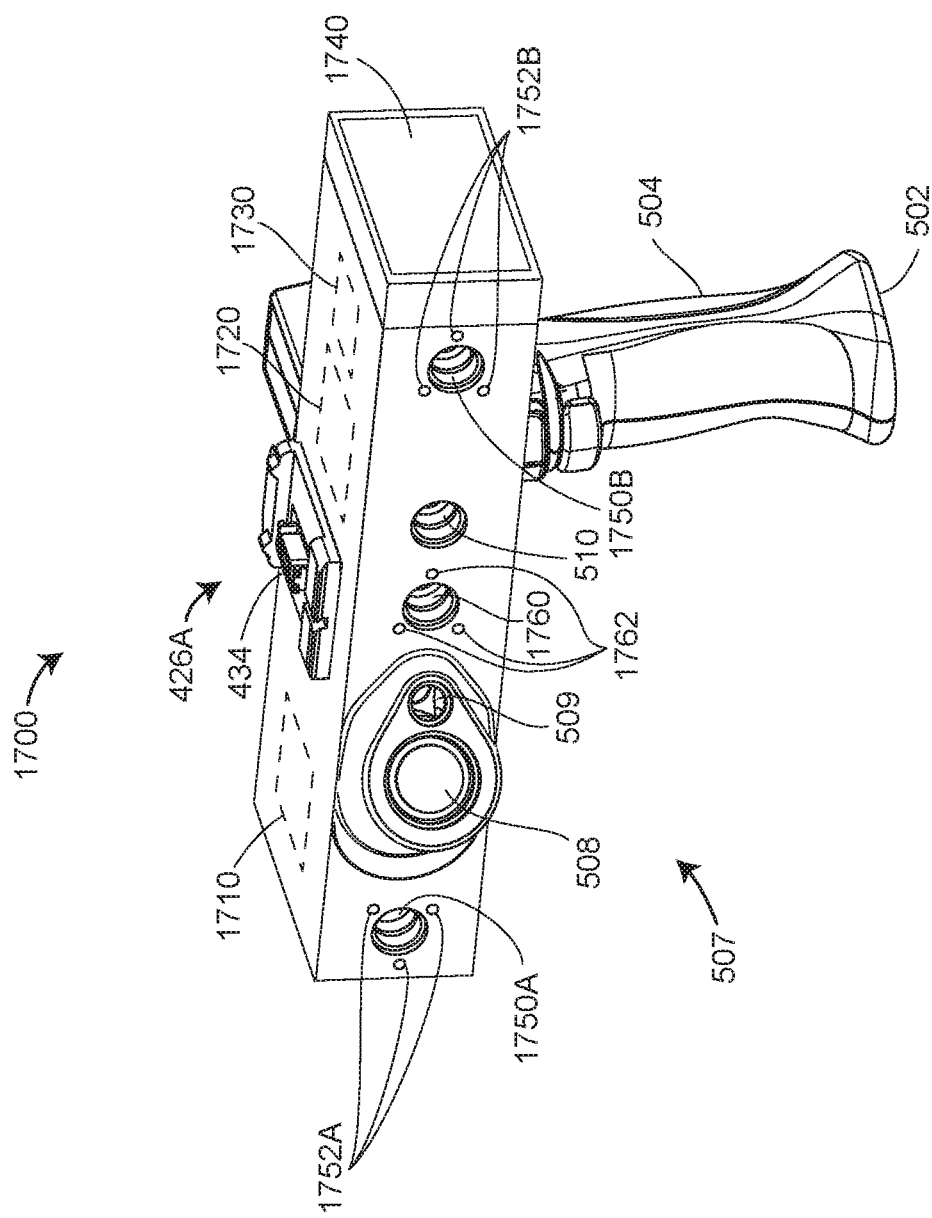
FIG. 16 is an isometric view of a scanner assembly having an integrated collection of cameras, the assembly configured to be attached to an articulated arm CMM or used separately as a handheld scanner according to an embodiment.

FIG. 16 is an isometric view of a 3D measuring device 1700 configured for attachment to an articulated arm CMM 100 through a mechanical and electrical interface 426, which in this case includes the connector 426A. Electrical signals are passed between the 3D measuring device 1700 and any device attached to the electrical connector 434. For example, the attachment may be to an articulated arm CMM through the connector 426C, or it may be to a different connector when the 3D measuring device 1700 is used in a handheld mode or a production line mode.

In an embodiment, measuring device 1700 includes a scanner 507 having a projector 510 and a camera 508. The projector 510 may project a point of light, a line of light, or a pattern of light that covers an area. The principles of operation of a line scanner and an area scanner are discussed herein above. In some cases, two or more cameras may be used with either type of scanner. In an embodiment, the projector 510 may include a digital micromirror device (DMD) capable of projecting any type of pattern. For example, a DMD can project any desired structured pattern of light over an area. It may project a line of light at any angle, and it may sweep the line of light. The DMD may alternatively sweep a spot of light. Sweeping a line or a spot of light is a useful technique for reducing or eliminating multipath interference, which such interference is observed to have occurred or is expected to have occurred based on geometry of the object being scanned.

In an embodiment, the cameras 1750A, 1750B form a stereo camera pair. In an embodiment, the cameras 1750A, 1750B determine 3D coordinates of targets within a frame of reference of the 3D measuring device 1700. In an embodiment, the cameras 1752A, 1752B determine the 3D coordinates of reflective targets within a field-of-view (FOV) of the cameras 1750A, 1750B. The targets may be located on or proximate an object under test. In an embodiment, the reflective targets are illuminated by light from light sources 1752A, 1752B. In an embodiment, the light sources 1752A, 1752B are light-emitting diodes (LEDs). In another embodiment, the cameras 1752A, 1752B determine the 3D coordinates of light sources such as LEDs on or proximate an object under test. In another embodiment, the cameras 1752A, 1752B determine the 3D coordinates of light marks, such as spots of light, projected onto the object by an external projector fixed with respect to the object. In the exemplary embodiment, the light sources 1752A, 1752B are disposed about the periphery of the cameras 1750A, 1750B.

In an embodiment, the light sources 1752A, 1752B are configured to project light at a wavelength different than to which the scanner camera 508 is sensitive. For example, the camera 508 may be configured to respond to blue light at 450 nm, with the optics coated to block light outside a band of blue wavelengths. In this case, the light sources 1752A, 1752B may be configured to emit a different wavelength, for example, a near infrared wavelength of 800 nm. In this case, the cameras 1750A, 1750B may be coated to reduce or eliminate light from the blue wavelengths emitted by the scanner projector. This arrangement of wavelengths may be advantageous if the scanner 507 operates synchronously with the stereo camera pair 1750A, 1750B. In other cases, the cameras 1750A, 1750B may be configured to respond to the wavelengths emitted by the projector 510. This might be advantageous, for example, to enable the stereo camera pair to independently determine the 3D coordinates of a line or pattern of light emitted by the projector 510.

In an embodiment, the 3D coordinates of widely distributed markers on or proximate an object are determined in a global frame of reference using a photogrammetry. In an embodiment, the photogrammetry system includes a camera and a calibrated scale bar, with the camera used to measure the markers and the calibrated scale bar in a plurality of digital 2D images. By processing the multiple 2D images, the 3D coordinates of the collection of markers may be determined in a common (global) frame of reference. Such a method may be advantageous when measuring a large object, especially when using relatively few markers.

In another embodiment, a single camera 1750A or 1750B is used to captures 2D images of markers. If the camera 1750A or 1750B has a relatively wide FOV, the markers in the plurality of captured images may provide continuity to the scanner system in registering the plurality of 3D scanner coordinates collected in successive frames.

In an embodiment, the 3D measuring device 1700 further includes a color camera 1760. The colors captured by the color camera 1760 may be used to add color to a 3D image captured by the scanner 507. Such coloration is sometimes referred to as adding texture to a 3D image because it may reveal such aspects of surface roughness, surface reflectance properties (such as shininess or transparency), and shadows. In an embodiment, light sources 1762 may be used to increase the light applied to an object or to apply particular wavelengths of light. For example, infrared light may be projected from the lights 1762 to enable a map of object temperature to be overlaid on the captured 3D image. In other embodiments, the lights 1762 may project over a broad spectrum to provide a more desirable lighting than would be provided by artificial light such as that provided by fluorescent lights, which may produce a green hue. In the exemplary embodiment, the light sources 1762 are disposes about the periphery of the color camera 1760.

In an embodiment, power is provided to the 3D measuring device 1700 by a battery 1710, which may be located in the camera/scanner portion of the assembly 1700, in the handle 504, beneath the handle, or attached as a separate assembly. In an embodiment, the battery is conveniently removable and replaceable. In an embodiment, the 3D measuring assembly 1700 may be removed from the AACMM 100 without first turning off the power of either the AACMM 100 or the 3D measuring assembly 1700.

In an embodiment, a wireless communication system 1730 includes an antenna and wireless electronics, which might for example be based on IEEE 802.3 (Ethernet), IEEE 802.11 (Wi-Fi) or IEEE 802.15 (Bluetooth). In an embodiment, the 3D measuring device 1700 includes a processor 1720 capable of performing calculations such as image capture, triangulation, and registration of multiple 3D images. In an embodiment, the processor further includes a real-time bus, which might be EtherCAT, SERCOS III, PROFINET, POWERLINK, or EtherNet/IP, for example. It should be appreciated that the processor 1720 may include into or coupled to associated circuitry, such as analog-to-digital converters, network interfaces, display or video processors, input/output controllers, non-volatile memory and read-only memory circuits for example.

In an embodiment, the 3D measuring assembly 1700 includes a display 1740. In an embodiment, the display is a touch-screen display. In an embodiment, the display 1740 shows the results of 3D measurements during operation of the measurement device 1700. In an embodiment, the display further includes a user interface that offers the user choices in how the measurement is performed or data is processed or transferred.

Figure 17A:
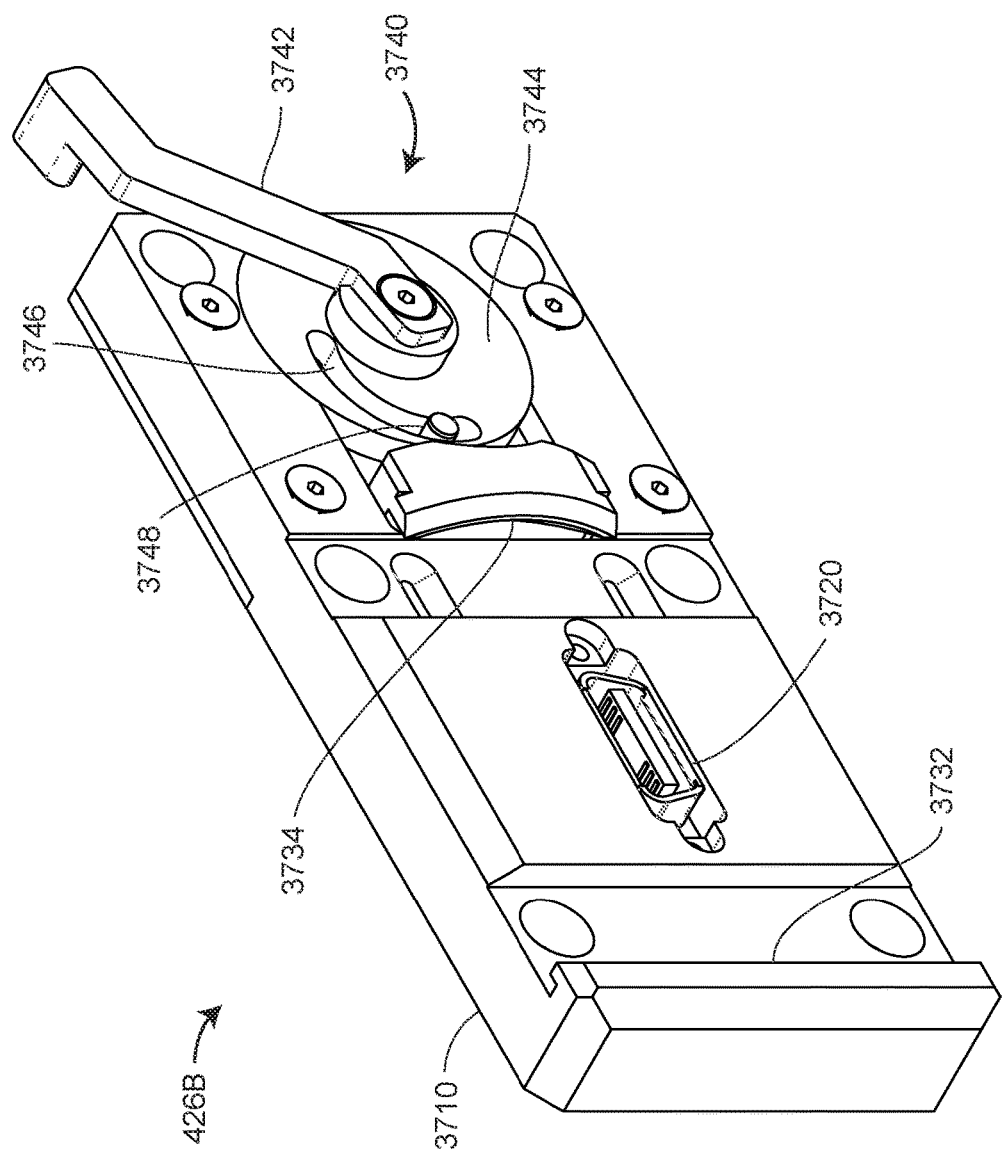

FIGS. 17A, 17B, and 17C show perspective, top, and sectional views of a connector assembly 426B according to an embodiment. As will be discussed in more detail below, the connector assembly 426B may be incorporated into another device to allow the device to couple with the connector assembly 426A shown in FIGS. 10C, 11A, 11B, 16. The connector 426A is further configured to couple to a connector assembly 426C of the AACMM 100. In an embodiment illustrated in FIG. 10C and FIG. 5, an end probe 401 is coupled to a connector assembly 426C to a connector assembly 426A by the tightening of a collar 438, as explained herein above. In an embodiment, the connector assembly 426B is configured to attach directly to a connector 426A on a handheld device such as the scanner 500 or a 3D measuring device 1700.

In an embodiment, the connector assembly 426B includes a body 3710, a 3710, an electrical connector 3720, a front lip 3732, a rear lip 3734, and a locking assembly 3740. In an embodiment, the locking assembly 3740 includes a rotating handle 3742, a handle pin 3743, a rotating plate 3744, a curved CAM slot 3746, and a translator pin 3748. In an embodiment, the translator pin 3748 is fixed relative to the lip 3734 and is further located along a center line of the handle pin 3743. As the handle is rotated in a direction 3750, there is a decrease in the distance from the handle pin 3743 to the curved CAM slot 3746 at the position of the translator pin 3748. The handle pin 3743 remains fixed relative to the body 3710 because the rotating plate 3744 is constrained to rotate within a cylinder cut into the body 3710. Hence, as the handle 3742 is rotated in a direction 3750, the translator pin 3748 and the lip 3734 are moved toward the back of the connector assembly 426B, in the direction of the handle pin 3743.

With the handle 3742 rotated in the direction 3750, the front lip 3732 is slid underneath the lip 444 shown in FIGS. 11A, 11B. The electrical connectors 3720 and 434 are pressed together, and the handle 3742 is moved in the 3742 is moved in the direction 3752 to lock the rear lip 3734 to the lip 454. In this manner, an accessory unit having a connector 426B may be quickly and securely locked to a connector 426A of a dimensional measuring device. It should be appreciated that other types of interlocking connector assemblies may be used in the embodiments described herein to couple the connector 426A with another device and the illustrated embodiment is not intended to be limiting.

FIGS. 18A, 18B, 18C, and 18D show a scanner 500 configured for attachment to a camera assembly 1850 through a mechanical and electrical interface 426, which in this case includes the connectors 426A and 426B. The connector may 426B differ from the connector 426C in FIG. 10C, as described herein above, but both connectors (such as 426B, 426C) are compatible with the connector 426A. Electrical signals are passed between the scanner 500 and the camera assembly 1850 through an electrical connector 434. The electrical interface 426 includes two parts, a first part 426A, which in this case is a scanner connector 426A, and a second part 426B, which in this case is a camera assembly connector 426B. The first part and the second part couple together to hold the scanner 500 is fixed position and orientation relative to the camera assembly 1350.

In an embodiment, the camera assembly 1850 includes at least one camera. In another embodiment, the camera assembly 1850 includes two cameras 1853A, 1853B. The camera 1853A includes a lens assembly 1854A and an electronics housing 1856A that includes a photosensitive array (not shown). The camera 1853B includes a lens assembly 1854B and an electronics housing 1856B that includes a photosensitive array, together with support electronics, which may include a processor 1885. In an embodiment, the processor 1885 may process 2D image data obtained from the photosensitive array, and the processor 1885 may further cooperate with a controller 512 within the scanner 500 to register the multiple sets of 3D coordinates provided ty scanner 500. In an embodiment, the cameras 1853A, 1853B have fields-of-view (FOVs) that partially overlap, thereby providing stereo imaging. Such imaging enables determination of 3D coordinates of targets using triangulation methods as described herein above. In some embodiments, the cameras together provide a FOV larger than the camera 508. In other embodiments, the cameras together provide a smaller FOV than the camera 508. In some embodiments, a single wide FOV camera is provided on the assembly 1850. In other cases, several wide FOV, but non-overlapping, cameras are provided on the camera assembly 1850. In an embodiment, computing actions may further be provided by a processor 1886.

In an embodiment, power is provided to the scanner 500 and camera assembly 1850 by a battery 1882 (FIG. 18C), which may be located in the camera assembly, in the scanner assembly, attached beneath the handle, or attached as a separate assembly. In an embodiment, the battery is rechargeable. In an embodiment, the battery is conveniently removed and replaced. In an embodiment, the battery may be hot-swapped, that is, removed while the unit is operational.

In an embodiment, a wireless system 1884 that includes an antenna communicates with devices external to the scanner 500 and camera assembly 1850. In an embodiment, the wireless system 1884 exchanges data with a computer network. The wireless system 1884 if present may be located in the camera assembly 1850, the scanner 500, external to these components, or in a combination of these components.

In an embodiment, the camera assembly 1850 (FIGS. 18B, 18C) further includes a display 1883. In an embodiment, the display includes a touchscreen. In an embodiment, the display may show results of measurements in real time, display messages, or enable interface by a user through the touchscreen.

Figure 18B:
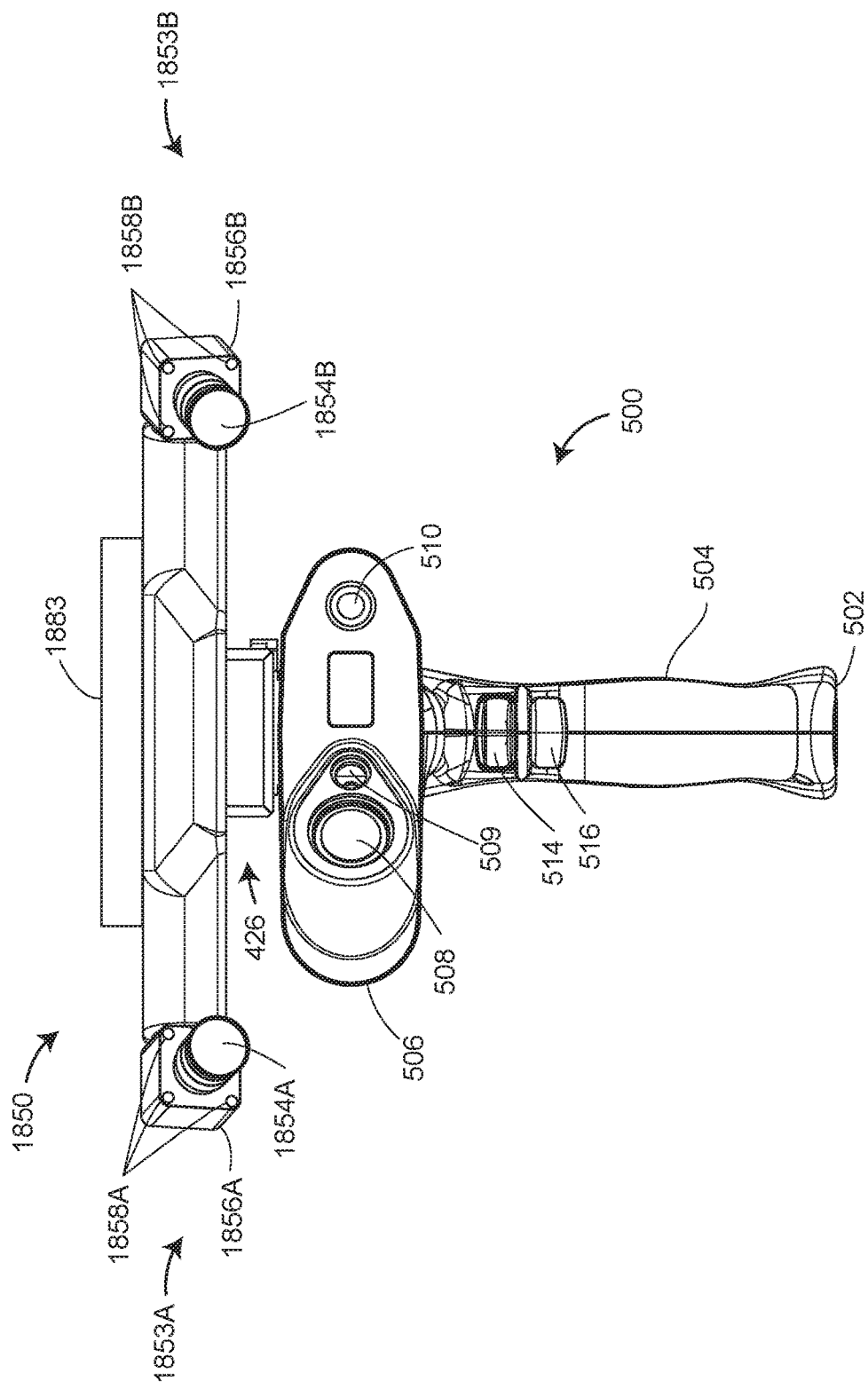
FIGS. 18B, 18C, 18D are front, side, and side views, respectively, of a detachable camera assembly attached to a handheld triangulation scanner according to an embodiment.
Figure 18C:
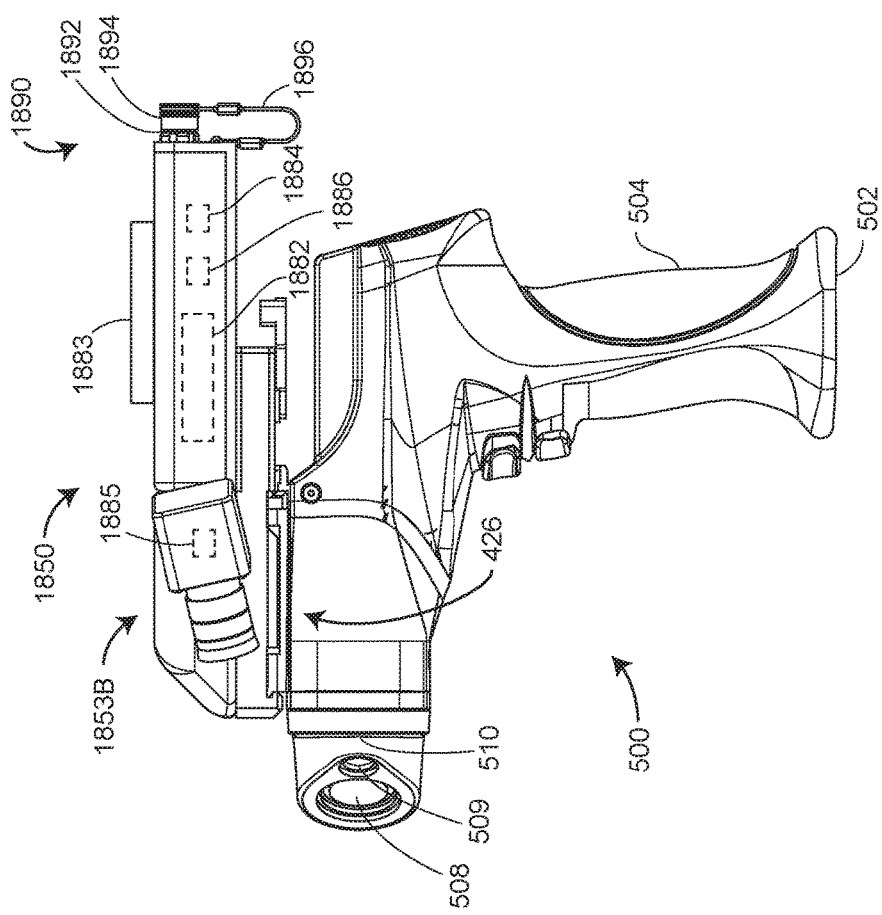
Figure 18D:
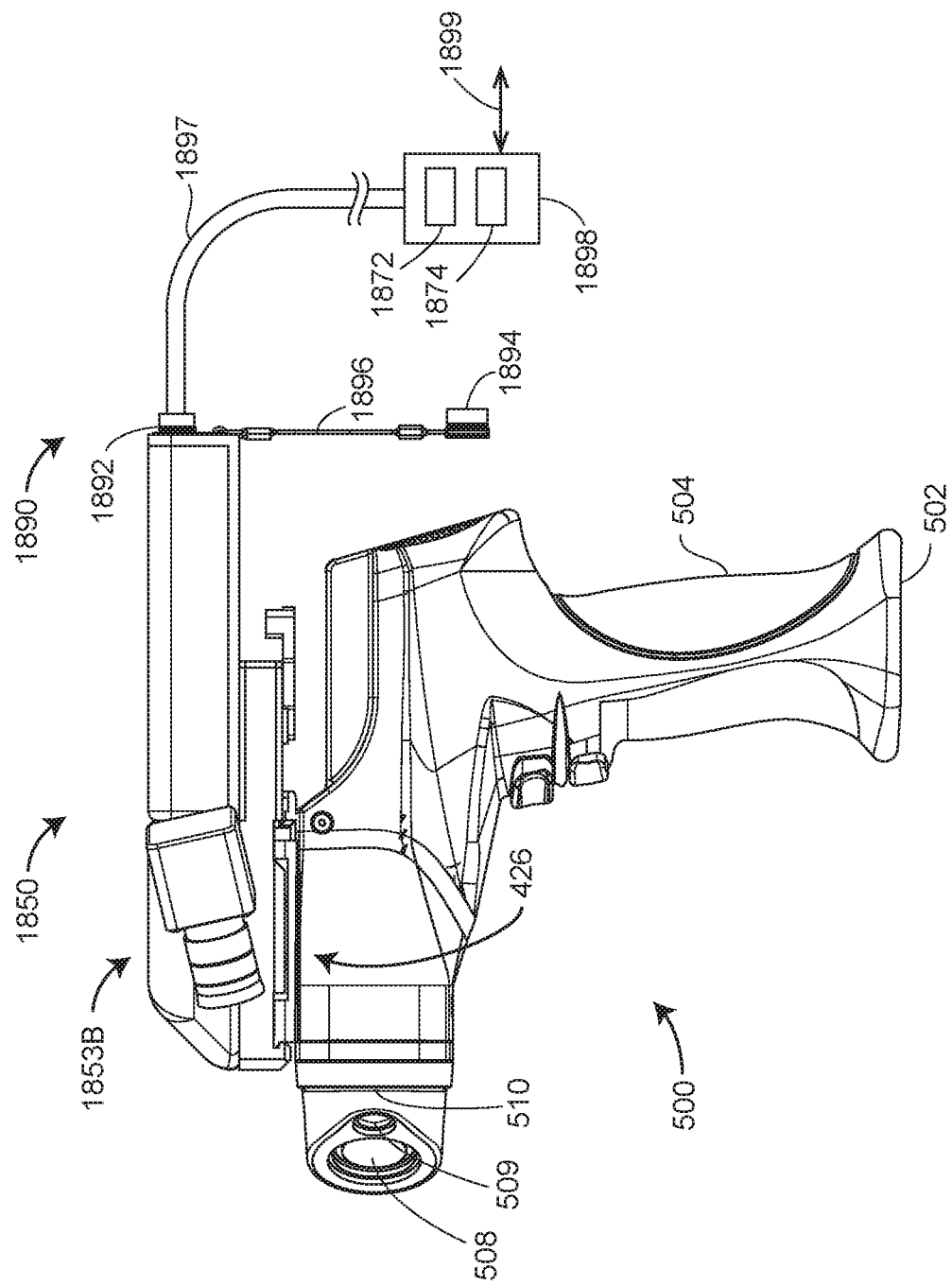

Referring now to FIGS. 18C, 18D, in an embodiment, the combined scanner 500 and camera assembly 1850 may include an electrical connector assembly 1890 having a connector 1892, protective cap 1894, and tether 1896. In an embodiment, the connector 1892 connects to a cable 1897 that attaches to an electronics unit 1898 having a power supply 1872 and a processor 1874. In an embodiment, the electronics unit 1898 may connect to other components through an electrical cable 1899. In an embodiment, the electrical cable 1899 is an industrial real-time bus connected to and synchronized with other devices in an industrial automation network. In an embodiment, electronics in the electronics unit 1899 includes electronics to provide a time-stamp according to IEEE 1588. In an embodiment, the electrical line 1899 is a real-time bus, which might be EtherCAT, SERCOS III, PROFINET, POWERLINK, or EtherNet/IP, for example. Such a real-time bus may attach to dozens or hundreds of other devices in an automation network.

In an embodiment where the scanner 500 is an LLP, then the 3D coordinates are projected on a line, which is to say that the 3D coordinates are found in the line of light sent from the projector 510 onto an object. In an embodiment where the scanner 500 is an area scanner, then the 3D coordinates are projected in a 2D area on the surface of the object. If the scanner 500 is removed from the AACMM 100 and moved by hand to determine 3D coordinates of an object surface, it is desirable to register the multiple collections of 3D coordinates obtained from individual scans by the scanner 500. In the case of an LLP scanner 500, the individual scans to be registered are line scans. In the case of an area scanner 500, the individual scans to be registered are area scans.

It is known from prior art to attach an LLP or an area scanner to an AACMM, as shown for example in FIG. 10B. In the case of an area scanner, it is also known to use the area scanner in a handheld mode after removing the scanner from the AACMM, as disclosed in U.S. Pat. No. 8,832,954 ('954) to Atwell et al., the contents of which are incorporated by reference. Multiple scans obtained from the handheld area scanner are registered together using features of the scanned object, where the features are obtained from the 3D coordinates obtained using methods of triangulation described herein above with reference to FIGS. 13A and 13B. It is not generally possible to use an LLP in a handheld mode, on its own, after removing the LLP from the AACMM because individual LLP scans, each along a single plane, do not provide feature information in two dimensions on which to obtain registration based on features.

In an embodiment, the projector of a scanner may include a digital micromirror device (DMD) capable of projecting any type of pattern. For example, a DMD can project any desired structured pattern of light over an area. It may project a line of light at any angle, and it may sweep the line of light. In another embodiment, the DMD may sweep a spot of light. Sweeping a line or a spot of light is an advantageous technique for reducing or eliminating multipath interference, which such interference is observed to have occurred or is expected to have occurred based on geometry of the object being scanned.

Methods are now described for using the camera assembly 1350 in combination with the scanner 500 to register multiple scans obtained by the scanner 500, thereby enabling scans to be taken in a handheld mode, with an operator holding the scanner 500 by the handle 504 and moving the scanner 500 over the surface of an object to be measured.

For all of the methods described herein below, a preliminary step is to obtain a common frame of reference for the scanner 500 and camera assembly 1850. Such a preliminary step may be carried out at the manufacturer's factory or by the operator by performing predetermined procedures. The common frame of reference can be obtained, for example, by viewing common features with the scanner 500 and camera assembly 1850, and then performing a least-squares optimization procedure to match the observed features. Such methods are known in the art and are not discussed further.

Figure 18E:
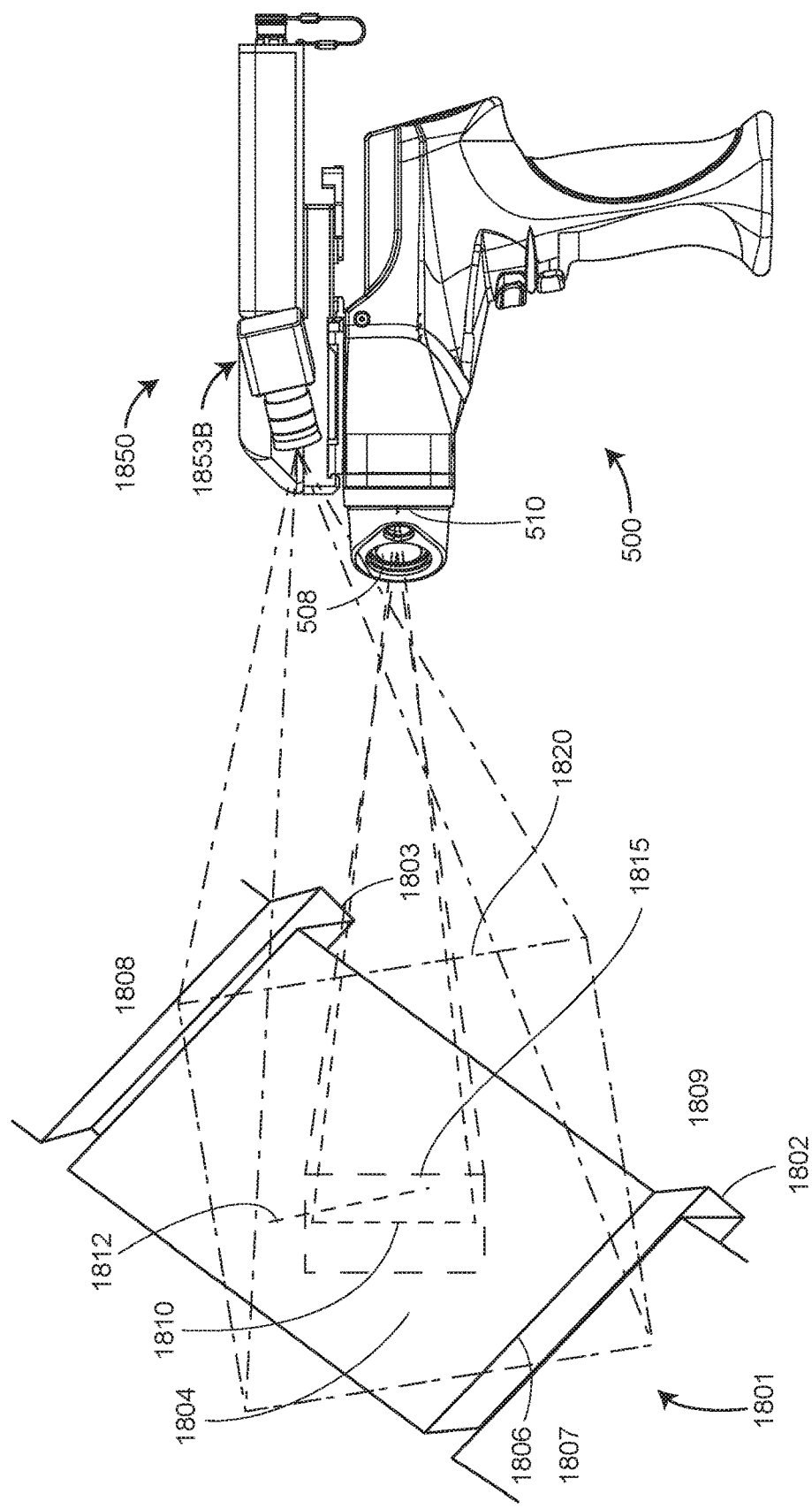
FIG. 18E-18K illustrate methods of measuring 3D coordinates according to an embodiment.

FIG. 18E illustrates a first method for using the cameras 1853A, 1853B to register multiple 3D coordinates obtained from line scans taken by an LLP scanner 500, wherein the registration is based on the matching of natural features. In a first instance, a first line of light 1810 is projected by the projector 510 onto an object 1801. In some regions, the object 1801 may include some fine details, as in the features 1802 and 1803, and in other regions, the object 1801 may include large regions 1804 that have few features. The first line of light 1810 is viewed by the 2D image sensor (e.g., photosensitive array) of the camera 508 in a region 1815 of the object imaged by the camera 508. As explained herein above with reference to FIG. 12, the appearance of the first line of light 1810 on the 2D image sensor of the camera 508 provides the information for a processor in the system to determine the 3D coordinates of the first line of light on the object 1801, where the 3D coordinates are given in the frame of reference of the scanner 500.

In a second instance, a second line of light 1812 is projected by the projector 510 onto the object 1801. The appearance of the second line of light 1812 on the 2D image sensor of the camera 508 provides the information for the processor in the scanner 500 to determine the 3D coordinates of the second line of light, again in the frame of reference of the scanner 500. It is desired to register scans in the first instance and the second instance so that the 3D coordinates of the first line of light and the second line of light are put into a common frame of reference.

In a first method of registration natural features of the object are used. The cameras 1853A, 1853B image a region 1820 of the object. In the illustrated example, features 1806, 1807, and 1808 are imaged by the cameras 1853A, 1853B. Using triangulation, a processor in the system use the images of the cameras 1853A, 1853B find the 3D coordinates of these detailed features in the frame of reference of the scanner 500. As explained herein above, such triangulation requires a baseline distance between the camera 1853A and 1853B and the relative orientation of these cameras relative to the baseline. Because the 3D coordinates of the features captured by the cameras 1853A, 1853B cover an area of the object 1801, rather than just a line, it may be possible to match the features in 2D, thereby determining the coordinate transformation to place the first line of light 1810 and the second line of light 1812 in the same frame of reference. Some natural features such as the point of intersection of three planes 1809 in FIG. 18E have an unambiguous position in 3D space. Such features may be matched in multiple camera images and hence are particularly useful in registering images based on natural targets.

Figure 18F:
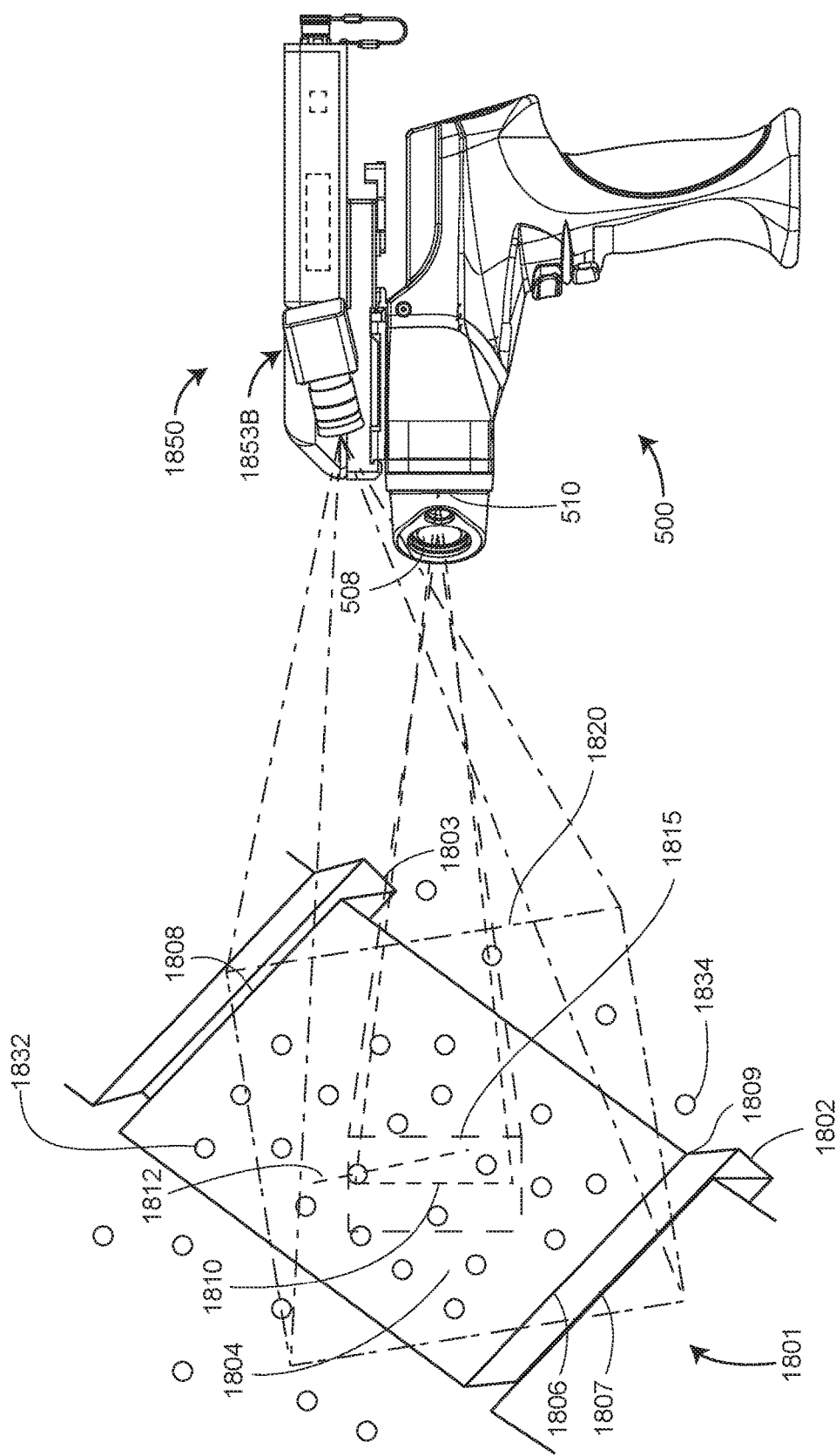

FIG. 18F illustrates a second method for using the cameras 1853A, 1853B to register multiple 3D coordinates obtained from line scans taken by an LLP scanner 500, wherein the registration is based on the matching of physical targets rather than natural targets. FIG. 18F is the same as FIG. 18E except that FIG. 18F further includes markers 1832 on the object 1801 and/or markers 1834 in the vicinity of the object but not on the object. In an embodiment, the targets are reflective targets, for example, white circular targets sometimes referred to as photogrammetry targets. In an embodiment, such targets are illuminated by light sources 1858A, 1858B shown in FIGS. 18A and 18B. In other embodiments, the targets 1832, 1834 are illuminated by ambient light sources or by other light sources separate from the camera assembly 1350. In an embodiment, the targets 1832, 1834 are themselves light sources, for example, LEDs. In an embodiment, the targets 1832, 1834 are a combination of photogrammetry targets and LEDs.

In a first instance, the projector 510 projects a first line of light 1810 onto the object 1801. In a second instance, the projector 510 projects a second line of light 1812 onto the object 1801. In an embodiment, in each of the first and second instances, the cameras 1853A, 1853B each image three common non-collinear targets, which might be 1832, 1834. These three points enable a processor in the system to place the 3D coordinates obtained from the first and second lines of light in a common frame of reference. This registration procedure is carried out repeatedly as the handheld scanner 500 is moved across the object 1801, thereby enabling the processor to determine 3D coordinates of the surface of the object 1801. In another embodiment, image information provided by physical targets is combined with image information provided by natural targets to register together 3D coordinates from line scans to obtain 3D coordinates over the surface of the object 1801.

Figure 18G:
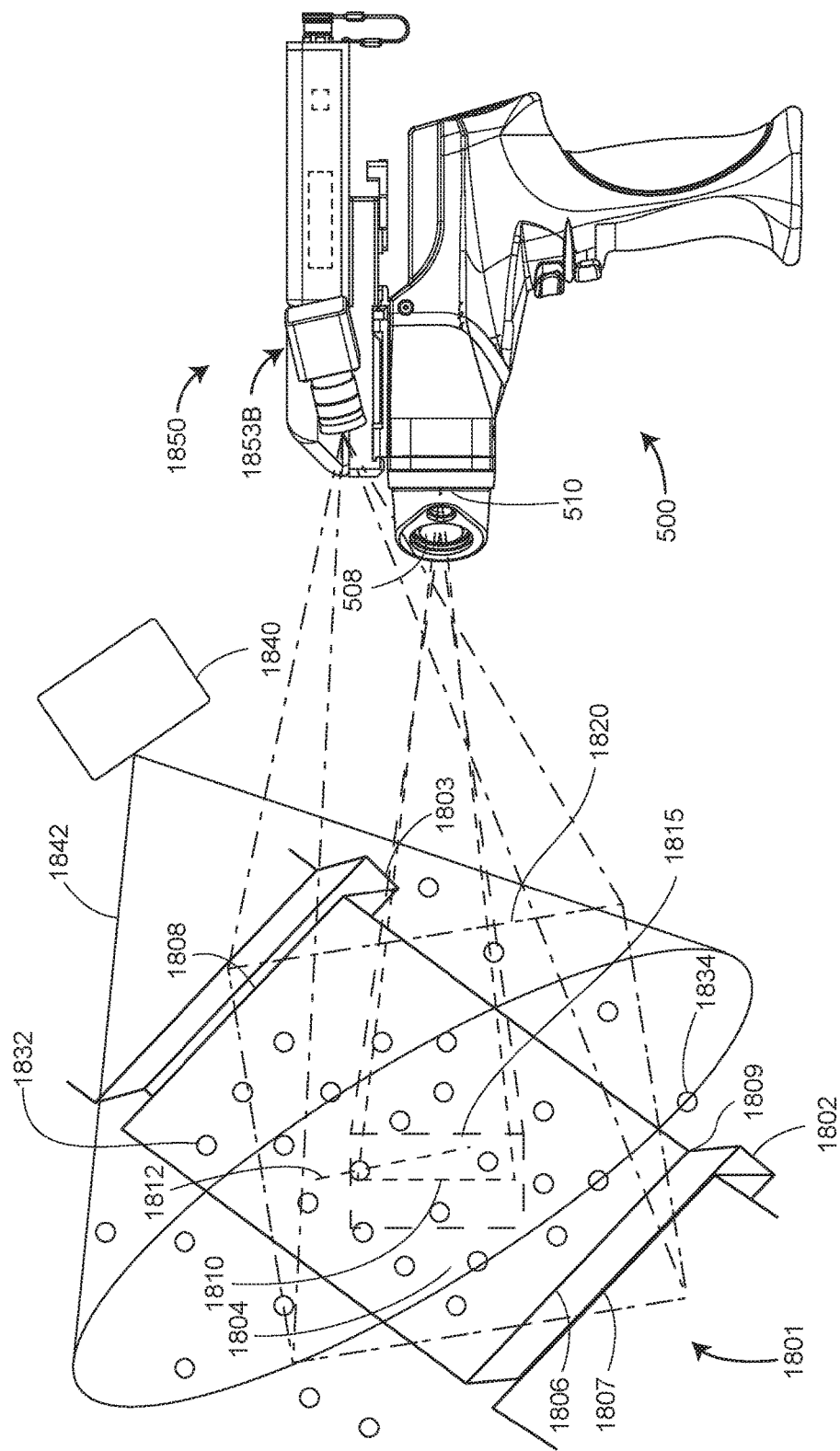

FIG. 18G illustrates a third method for using the cameras 1853A, 1853B to register multiple 3D coordinates obtained from line scans taken by an LLP scanner 500, wherein the registration is based on the matching of projected spots of light rather than physical targets or natural targets. An external projector 1840 separate from the scanner 500 and camera assembly 1350 projects spots of light 1832 onto the object and/or spots of light 1834 off the object but in the vicinity of the object. The cameras 1853A, 1853B image these spots of light in the same way they imaged the physical targets in FIG. 18F, and the processor determines 3D coordinates of the object surface in the same manner in each case.

Figure 18H:
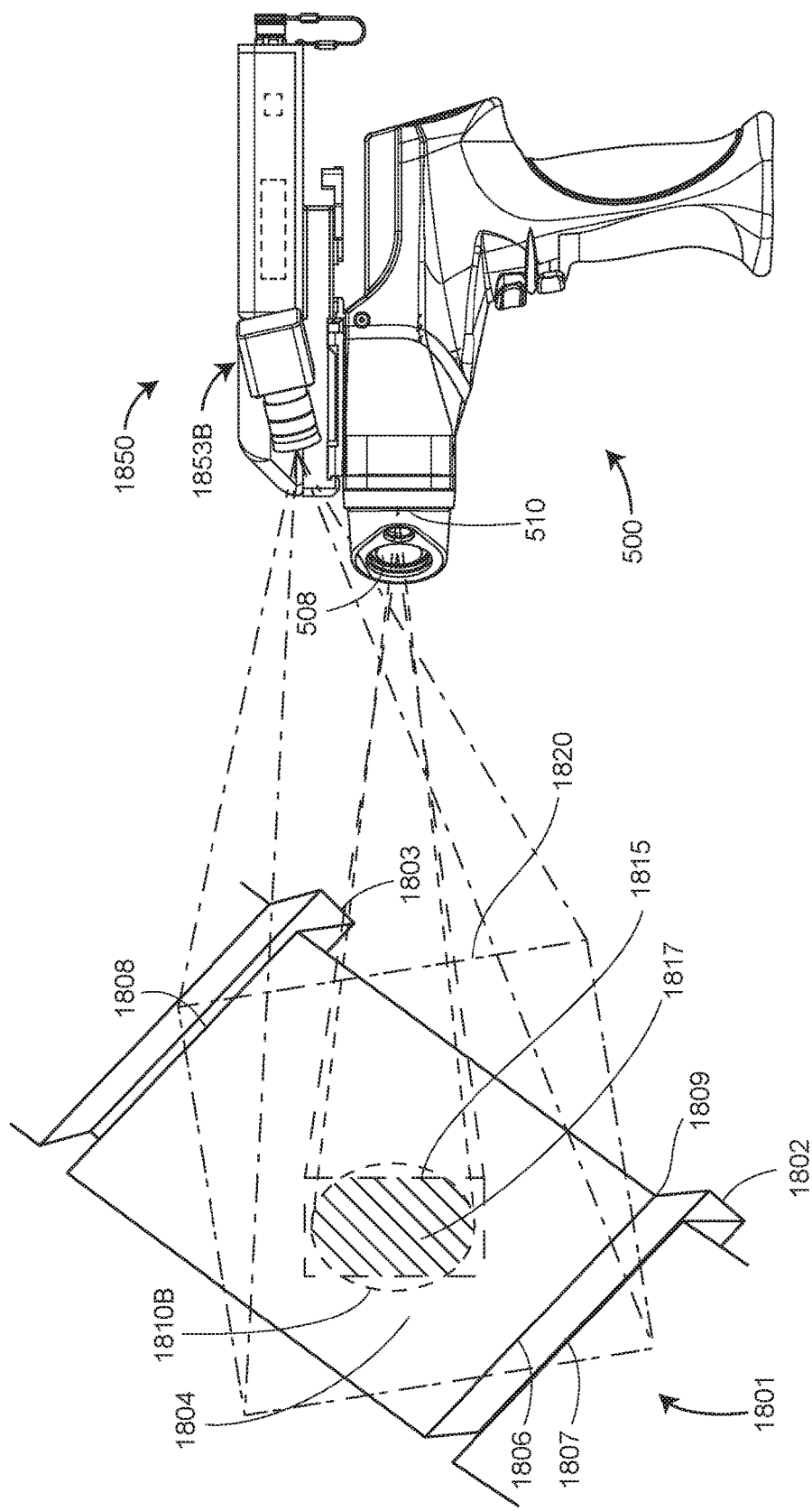
Figure 18I:
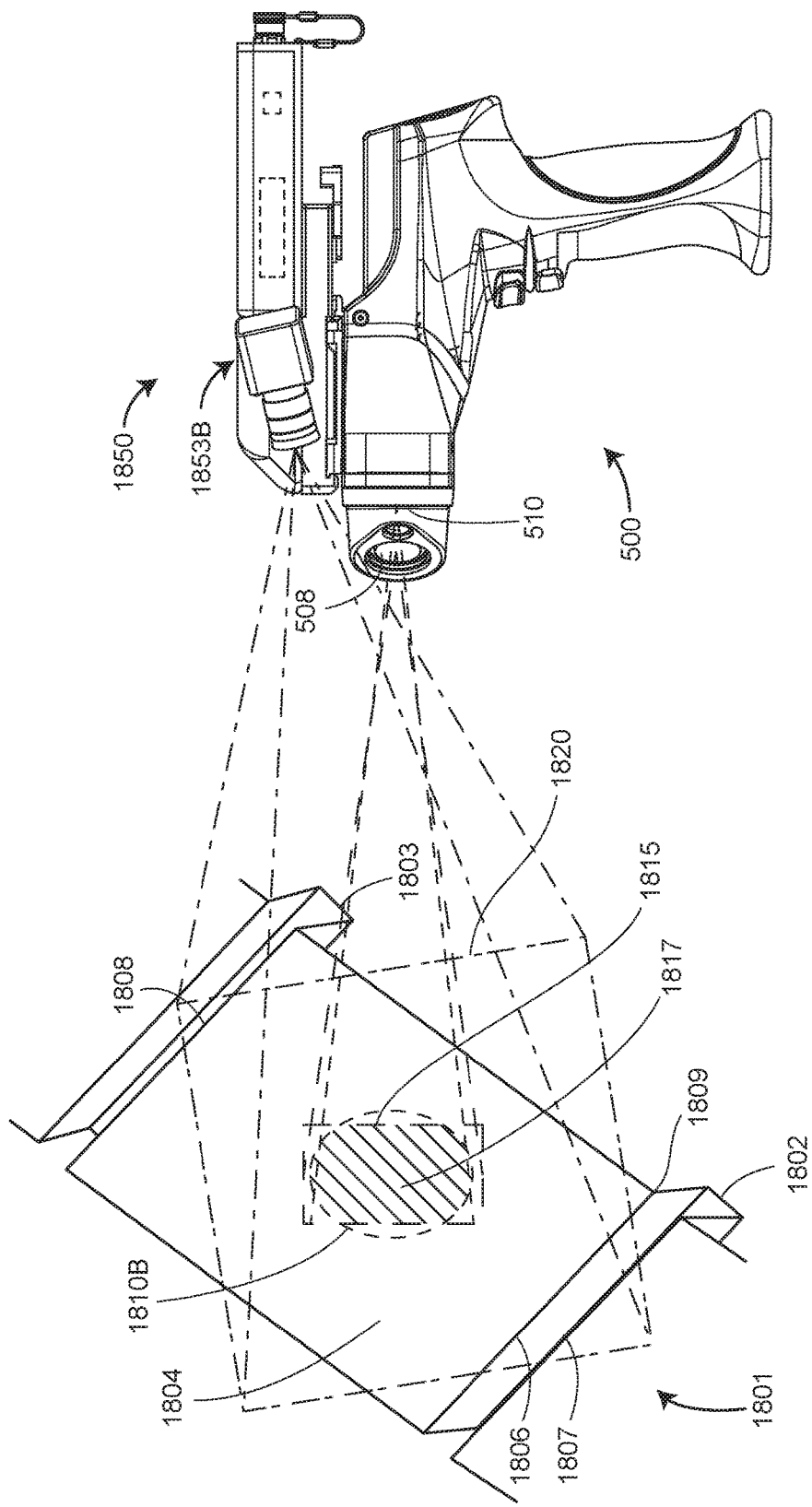

FIG. 18H illustrates a first method for using the cameras 1853A, 1853B to register multiple 3D coordinates obtained from area scans taken by an area scanner 500, wherein the registration is based on the matching of natural features. In a first instance, a first area of light 1810B is projected by the projector 510 onto an object 1801. The portion of the first area of light 1810B is viewed by the 2D image sensor (e.g., photosensitive array) of the camera 508 in a region 1815 of the object imaged by the camera 508. The overlap of the projected region of light 1810B and the imaged region 1815 is an overlap region 1817. In this overlap region 1817, a processor may determine 3D coordinates of the surface of the object 1801. These 3D coordinates are found in the frame of reference of the scanner 500.

In a second instance, a second area of light 1812B and the area imaged by the cameras 1853A, 1853B are offset from (as illustrated to the right of) the first area of light by the projector 510 onto the object 1801, thereby producing a second overlap region 1817B to the adjacent and offset from the first overlap region 1817. In some cases, there are enough common natural feature details within the first and second overlap regions to enable registration of the 3D coordinates in the frame of reference of the scanner 500 in the first and second instances to be put into a common frame of reference. However, if the object 1801 has relatively few features in the overlap regions 1817 and 1817B, register the first and second area scans based on scan data may not provide desired accuracy.

In an embodiment, the cameras 1853A, 1853B have a wider FOV than the camera 510, thereby enabling additional features such as 1806, 1807, and 1808 to improve the registration by matching of the 3D features as discussed herein above using the methods described with respect to FIGS. 18E, 18F, and 18G. If an object 1801 lacks distinct features, as in the region 1804, the registered 3D images may end up warping (e.g. curving in three-dimensional space). For example, the flat surface in the region 1804 may end up looking like a saddle. This effect is sometimes colloquially referred to as the "potato chip" or "potato crisp" effect.

Figure 18J:
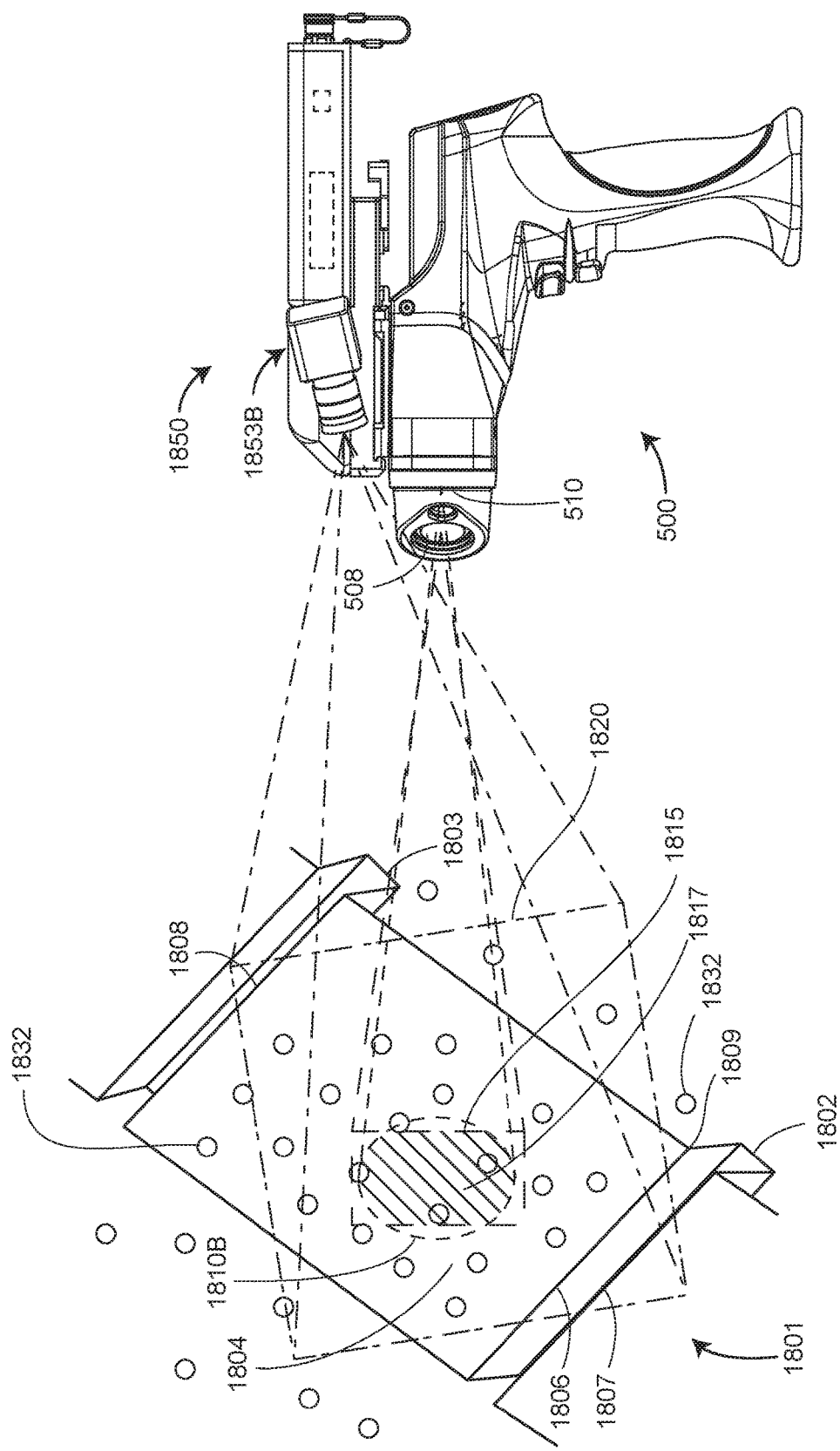

For scanned regions with few features, registration can be improved by providing targets on or off the object 1801. FIG. 18J illustrates a second method for using the cameras 1853A, 1853B to register multiple 3D coordinates obtained from area scans taken by an area scanner 500, wherein the registration is based on the matching of physical targets rather than natural targets. FIG. 18J is the same as FIG. 18H except that FIG. 18J further includes markers 1832 on the object 1801 and/or markers 1834 in the vicinity of the object but not on the object. By using the method described with reference to FIG. 18F, improved registration of the 3D coordinates obtained from the successive area scans may in many cases be obtained.

Figure 18K:
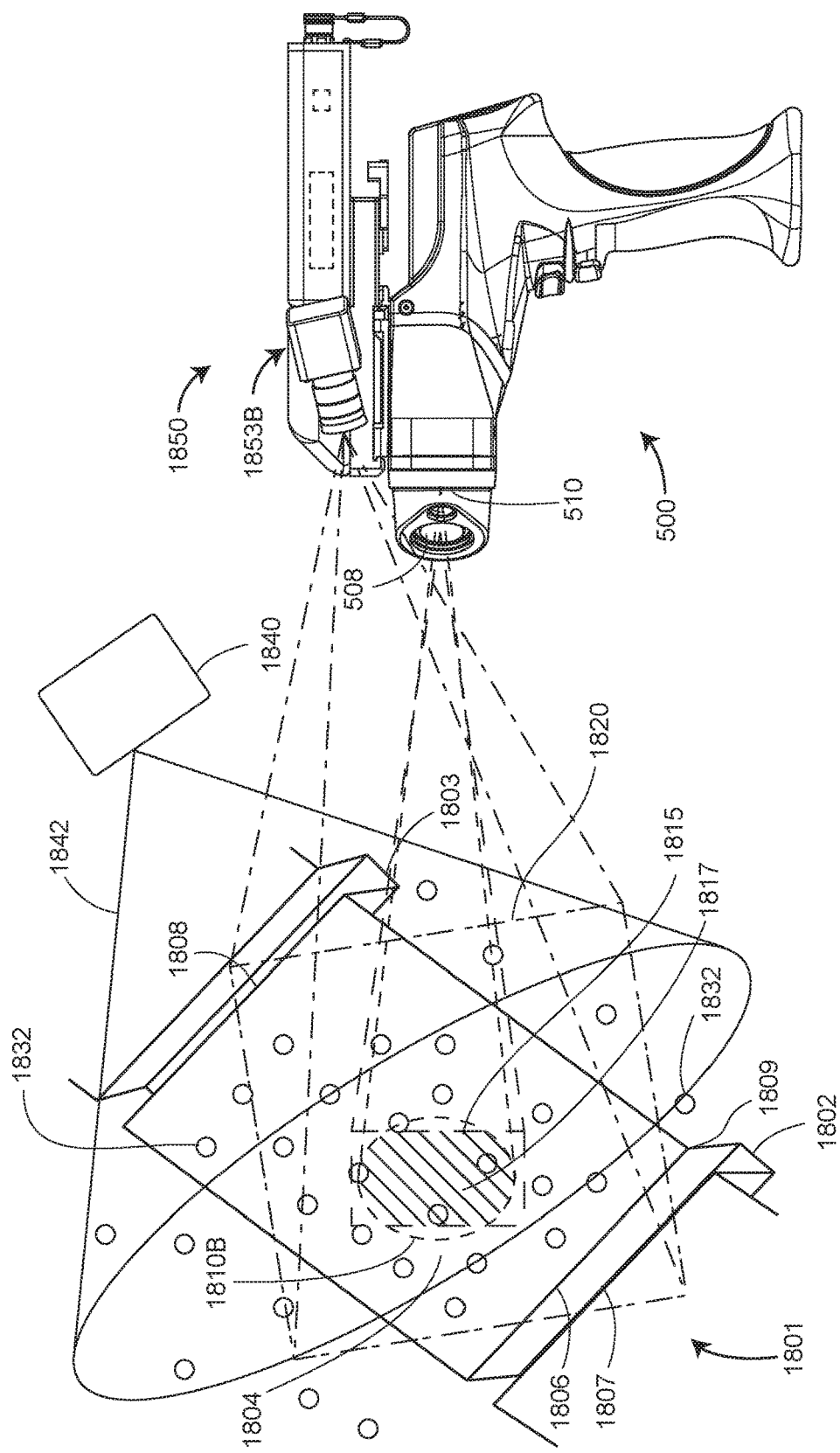

FIG. 18K illustrates a third method for using the cameras 1853A, 1853B to register multiple 3D coordinates obtained from area scans taken by an area scanner 500, wherein the registration is based on the matching of projected spots of light rather than physical targets or natural targets. An external projector 1840 separate from the scanner 500 and camera assembly 1350 projects spots of light 1832 onto the object and/or spots of light 1834 off the object but in the vicinity of the object. The cameras 1853A, 1853B image these spots of light in the same way they imaged the physical targets in FIG. 18J, and the processor determines 3D coordinates of the object surface in the same manner in each case.

As used herein, the term "mark" may be used to refer to any of the physical features used to assist in the registration of multiple sets of 3D coordinates obtained by the scanner 500 in combination with the camera assembly 1850. In the discussion herein above, four marks were described: (1) natural features of the object surface (or features on a stationary surface proximate the object); (2) LED markers (targets) on the object or proximate to the object; (3) reflective markers (targets) on the object or proximate the object; and (4) spots of light projected onto the object or proximate the object by an external projector not located on the scanner 500 or camera assembly 1350.

Much of the discussion herein above has described improvements in registration possible when, for each single determination of 3D coordinates of surface points by the scanner 500, three or more marks are viewed by the two cameras 1853A, 1853B on the camera assembly 1350, with any two successive scans having at least three common points. However, in some embodiments, registration is possible based on information obtained by a single camera on the camera assembly and by fewer than three marks viewed by the camera. For example, the projected light (line of light or area of light) from the projector 510 may also be viewed by the one or more cameras 1853A, 1853B and matched along with at least one mark in successive images, thereby providing much more registration information in some cases than the marks alone. Furthermore, it is also possible to process data so that registration is not based entirely on a matching of two 2D images obtained by one or more cameras on the camera assembly, but on a matching of multiple 2D images obtained by one or more cameras obtained on a large number of 2D images and on the corresponding large number of 3D images obtained by the scanner 500.

FIGS. 19A, 19B, 19C, and 19D are isometric, side, side, and front views, respectively, of a detachable six-DOF tracker target assembly 1900 coupled to a handheld triangulation scanner 500. FIG. 19E is an isometric view of the detachable six-DOF tracker target assembly configured for coupling to the handheld triangulation scanner. Coupling is made through the mechanical and electrical interface 426. The electrical interface 426 includes two parts, a first part 426A, which in this case is a scanner connector 426A, and a second part 426B, which in this case is a six-DOF tracker assembly connector 426B. The first part and the second part couple together to hold the scanner 500 is fixed position and orientation relative to the six-DOF tracker target assembly 1900.

In an embodiment, the six-DOF tracker target assembly 1900 further includes a display 1942. In an embodiment, the display 1942 shows 3D measurement data or 2D images. The display 1942 may further indicate annotation for the object or provide a menu in a user interface, for example, using the touch screen. In an embodiment, the six-DOF tracker target assembly further includes electronics 1944 that includes a battery and may include a wireless communication channel, including an antenna, and may further include a processor and memory.

The six-DOF tracker target assembly 1900 cooperates with a laser tracker 4010 to determine six degrees of freedom of the assembly 1900. The six degrees of freedom include three translational degrees of freedom (e.g., x, y, z), which the tracker determines as explained herein above with reference to FIG. 14B. The tracker also determines three orientational degrees of freedom (e.g., pitch, roll, and yaw angles) through cooperative action with the six-DOF tracker target assembly 1900. Such a six-DOF tracker target assembly may be one of a variety of types, for example, such as those described in the aforementioned patents '758, '983, '809, and patent application '525, all which are incorporated by reference herein above. By measuring the six degrees of freedom of the connected six-DOF accessory 1900 and scanner 500, the tracker can track the position and orientation of the scanner 500 relative to the object, thereby enabling relatively accurate registration of multiple line scans or area scans. In an embodiment, a probe tip 1915 is attached to a probe coupler 1920. The tracker determines the 3D coordinates of the probe tip 1915 based on the measured six degrees of freedom.

In an embodiment, the laser tracker 4010 cooperates with the six-DOF tracker target assembly 1900 and a processor to determine the six degrees of freedom of the six-DOF tracker target assembly 1900. In an embodiment, the laser tracker 4010 sends a beam of light to a six-DOF target 1930, which may include a retroreflector target that in an embodiment is a cube-corner retroreflector. A collection 1910 of multiple six-DOF targets 1930 may be provided to permit convenient viewing of the six-DOF targets from a wide range of angles. A first portion of the light returning from the retroreflector travels to a distance meter in the laser tracker 4010 to determine a distance from the tracker to the retroreflector and a second portion of the light travels to a tracker position detector that generates an electrical position signal indicating the position of the beam of light on the retroreflector. In one mode of operation, the position detector provides the electrical signal to a control system that includes motors to steer the beam of light to keep it centered on the retroreflector, thereby enabling tracking of the retroreflector as it is moved. In addition, as explained herein above, the tracker uses angular transducers such as angular encoders to provide two angles that specify the direction of the laser beam. With these two angles and the distance provided by the distance meter, the three translational degrees of freedom are obtained for the six-DOF tracker target assembly 1900. Signals from the six-DOF targets may be sent to an electrical unit 1940 for processing and synchronization of data.

As explained herein above, many methods are possible for determining the three orientational degrees of freedom, for example, as described in the patents '758, '983, '809, and patent application '525. These disclose methods that include (1) measuring the position of multiple light sources on a tracker six-DOF target with a camera on the laser tracker to determine the three orientational degrees of freedom; (2) measuring lines marked on a cube-corner retroreflector to determine the three orientational degrees of freedom; and (3) measuring light passing through an opening in a cube-corner retroreflector to determine pitch and yaw angles and measuring angle of inclination to determine roll angle. Other methods of measuring three orientational degrees of freedom are possible, and any method of measuring three orientational degrees of freedom may be used with the six-DOF tracker target assembly 1900.

A preliminary step in the methods described below is to obtain a common frame of reference for the scanner 500 and six-DOF tracker target assembly 1900. Such a preliminary step may be carried out at the manufacturer's factory or by the operator by performing procedures prescribed by the manufacturer. The common frame of reference can be obtained, for example, by viewing common features with the scanner 500 and camera assembly 1900, and then performing a least-squares optimization procedure to match the observed features. Such methods are well known in the art and are not discussed further.

In an embodiment, the six-DOF tracker target assembly 1900 further includes a tactile probe 1915, which connects to the collection of six-DOF targets 1910 through an interface unit 1920. The interface unit may provide convenient attaching and detaching of different tactile probes 1915. It may also provide electrical functionality to some types of probes such as a "touch probe" that takes a measurement as soon as the probe touches an object.

In an embodiment, the laser tracker 4010 further measures additional retroreflector targets in an environment, thereby establishing a frame of reference in the environment. The six-DOF assembly 1900 and scanner 500 cooperate with the laser tracker 4010 to determine the position of an object within the frame of reference of the environment. In an embodiment, in a further step, the tracker 4010 is moved to a new location where it re-measures some of the retroreflector targets to determine its position and orientation in the frame of reference of the environment, determined in an earlier step. From its new vantage point, the laser tracker 4010 may cooperate with the six-DOF assembly 4010 and scanner 500 to measure additional sides of the object not previously visible to scanner 500.

Figure 19A:
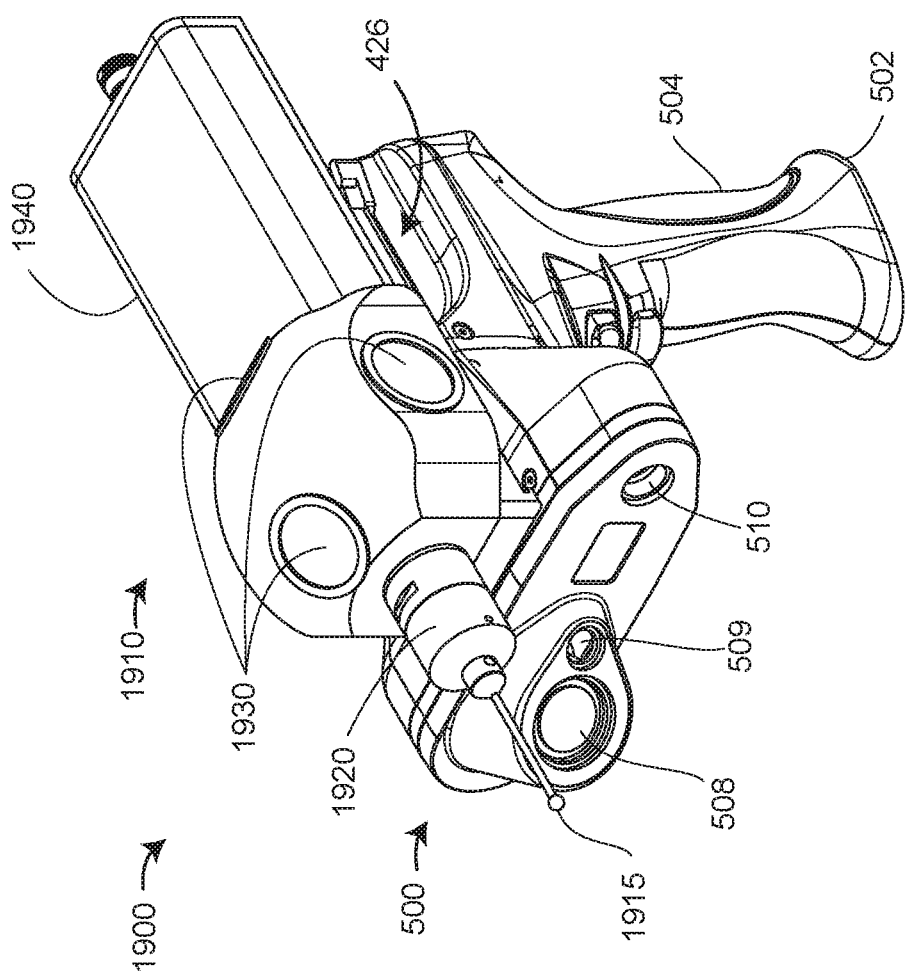
FIGS. 19A, 19B, 19C, 19D are isometric, side, side, and front views, respectively, of a detachable six-degree of freedom (DOF) tracker target assembly coupled to a handheld triangulation scanner.
Figure 19B:
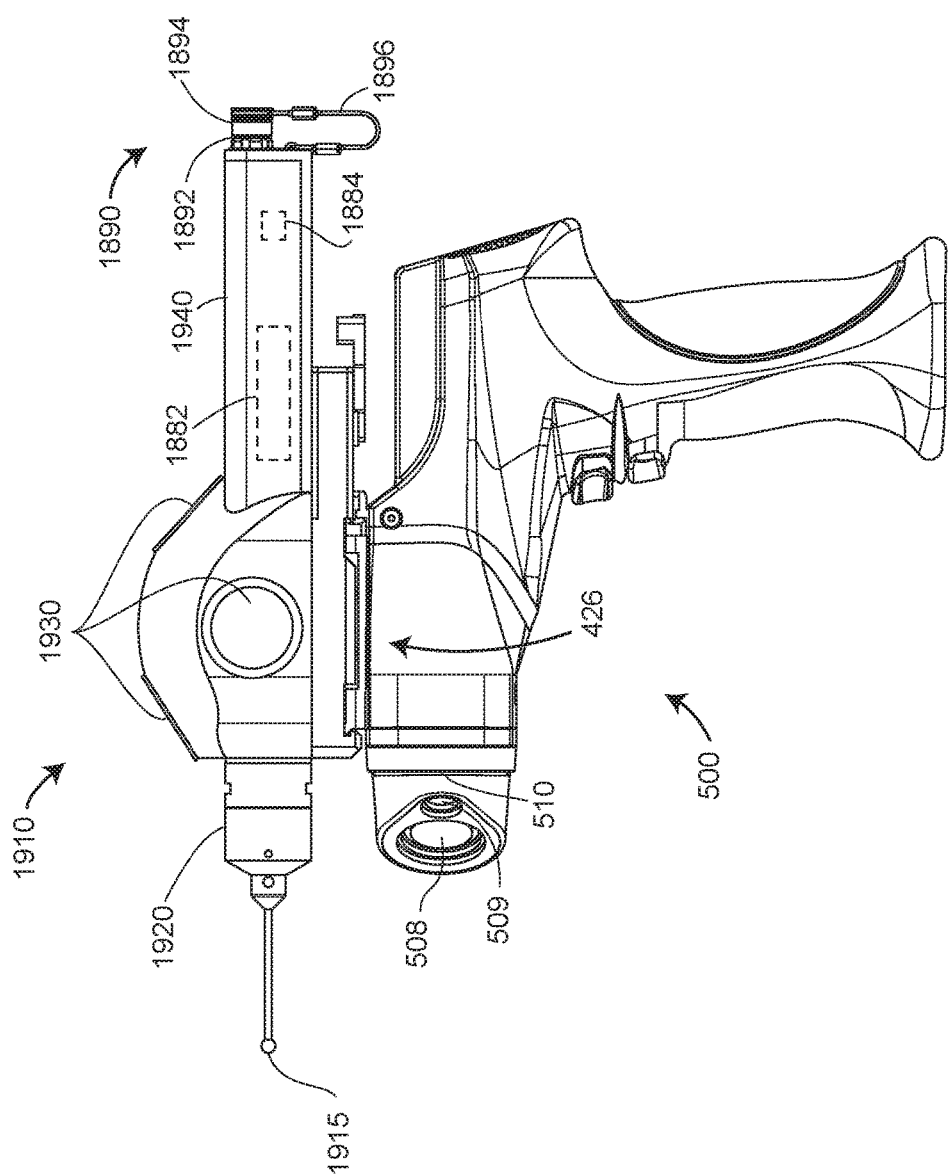
Figure 19C:
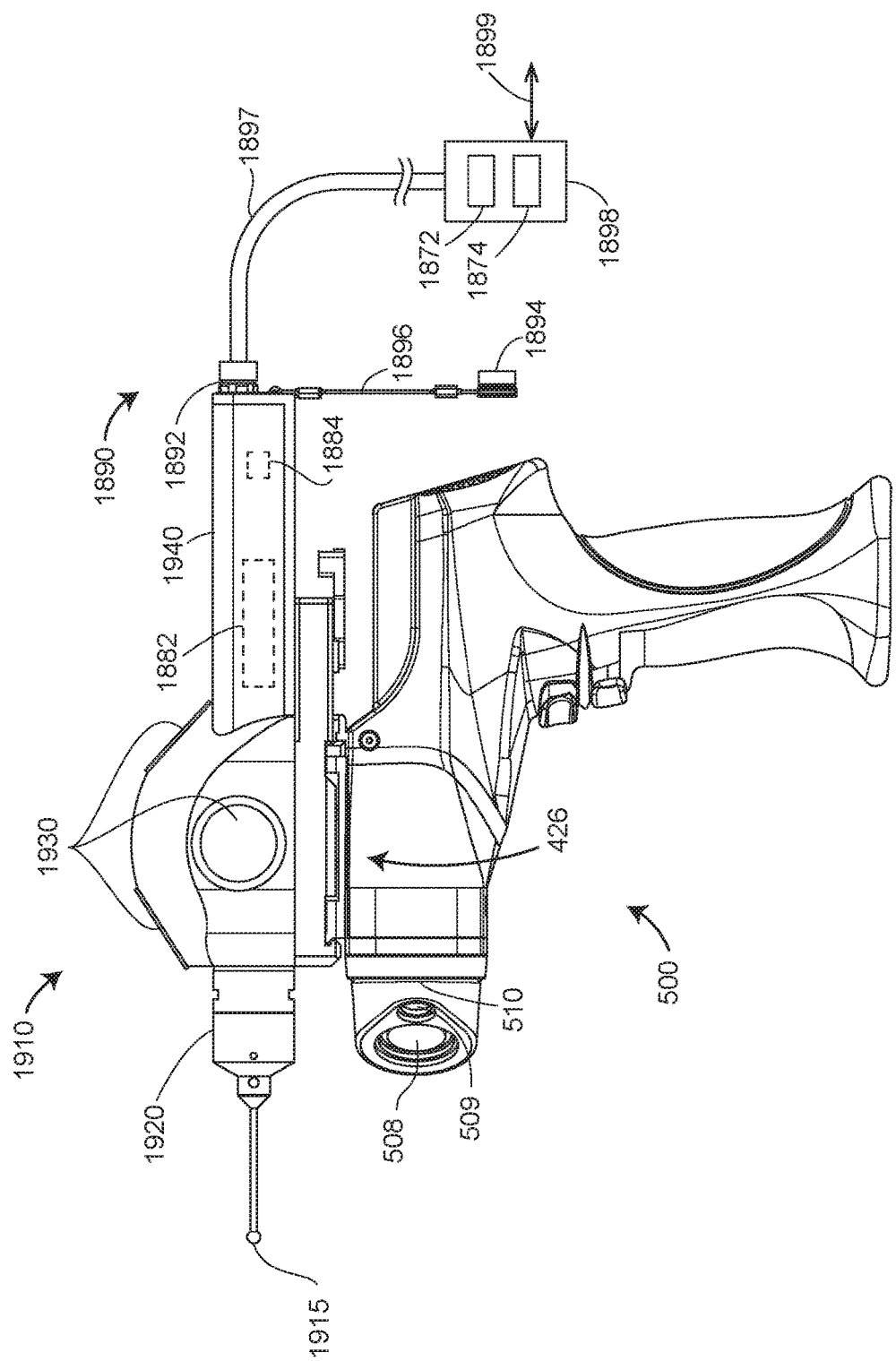
Figure 19D:
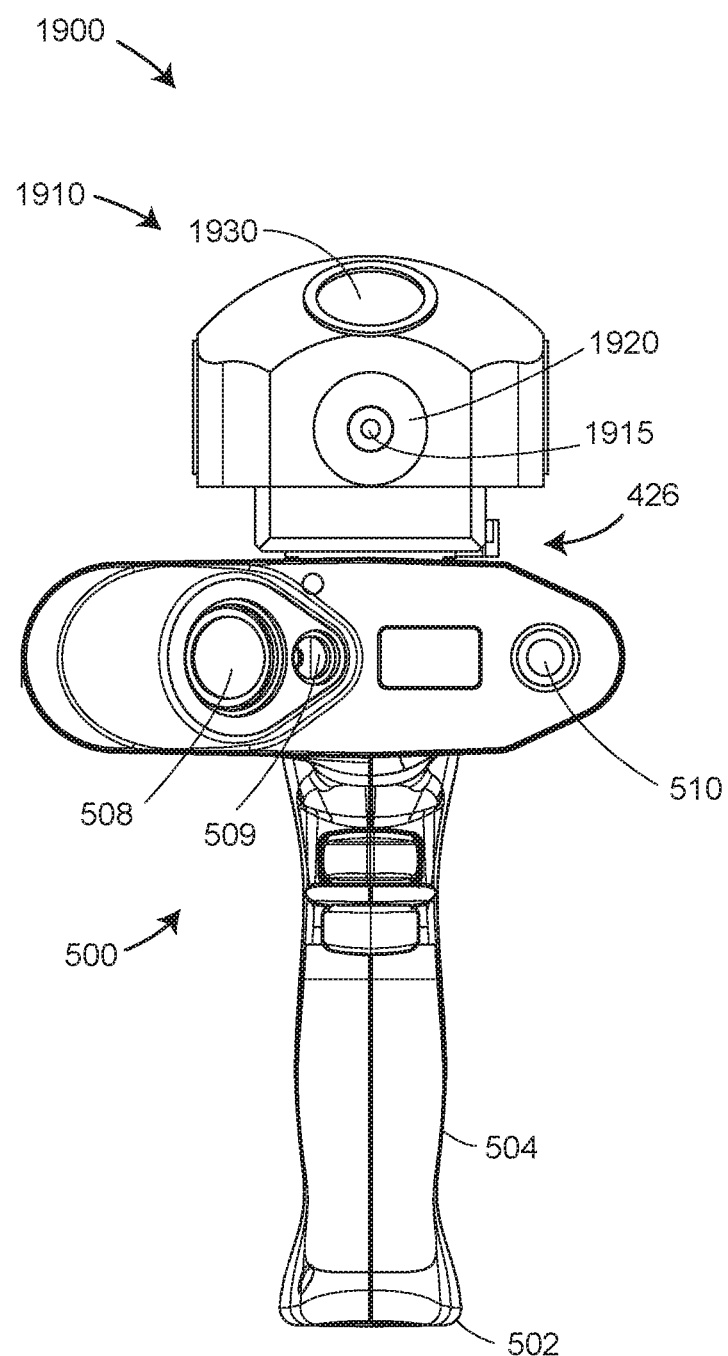
Figure 19E:
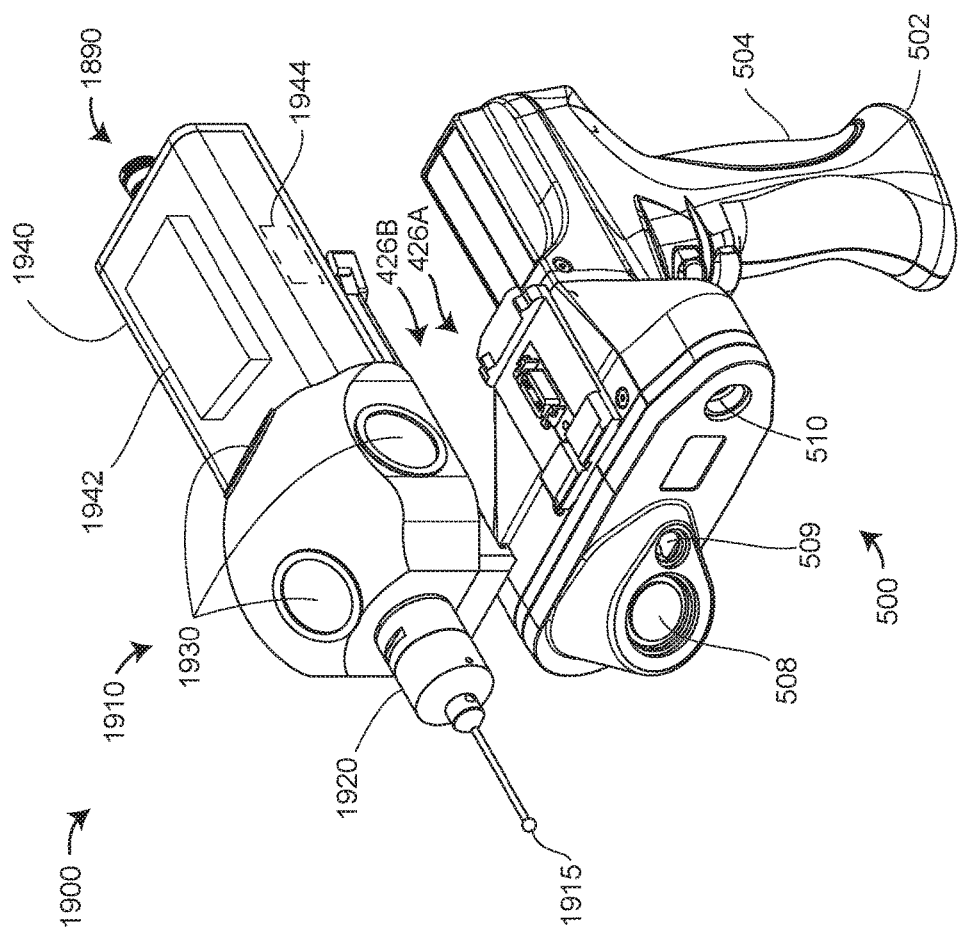
FIG. 19E is an isometric view of a detachable six-DOF tracker target assembly configured for coupling to a handheld triangulation scanner according to an embodiment.

Referring now to FIGS. 19B, 19C, in an embodiment, the combined scanner 500 and six-DOF assembly 1900 includes an electrical connector assembly 1890 having a connector 1892, protective cap 1894, and tether 1896. In an embodiment, the connector 1892 connects to a cable 1897 that attaches to an electronics unit 1898 having a power supply 1872 and a processor 1874. In an embodiment, the electronics unit 1898 connects to other components through an electrical cable 1899. In an embodiment, the electronics unit attaches to the laser tracker 4010. In an embodiment, the electrical signals traveling on the cable 1897 are synchronized among the tracker 4010, the six-DOF assembly 1900, and the scanner 500. In an embodiment, to obtain synchronization a time stamp is provided by the laser tracker 4010 and a time stamp is also provided by the assembly that includes the scanner 500 and the six-DOF assembly 1900.

In an embodiment, the electrical cable 1899 is an industrial real-time bus connected to and synchronized with other devices in an industrial automation network. In an embodiment, electronics in the electronics unit 1899 includes electronics to provide a time-stamp according to IEEE 1588. In an embodiment, the electrical line 1899 is a real-time bus, which might be EtherCAT, SERCOS III, PROFINET, POWERLINK, or EtherNet/IP, for example. Such a real-time bus may attach to dozens or hundreds of other devices in an automation network.

Figure 20:
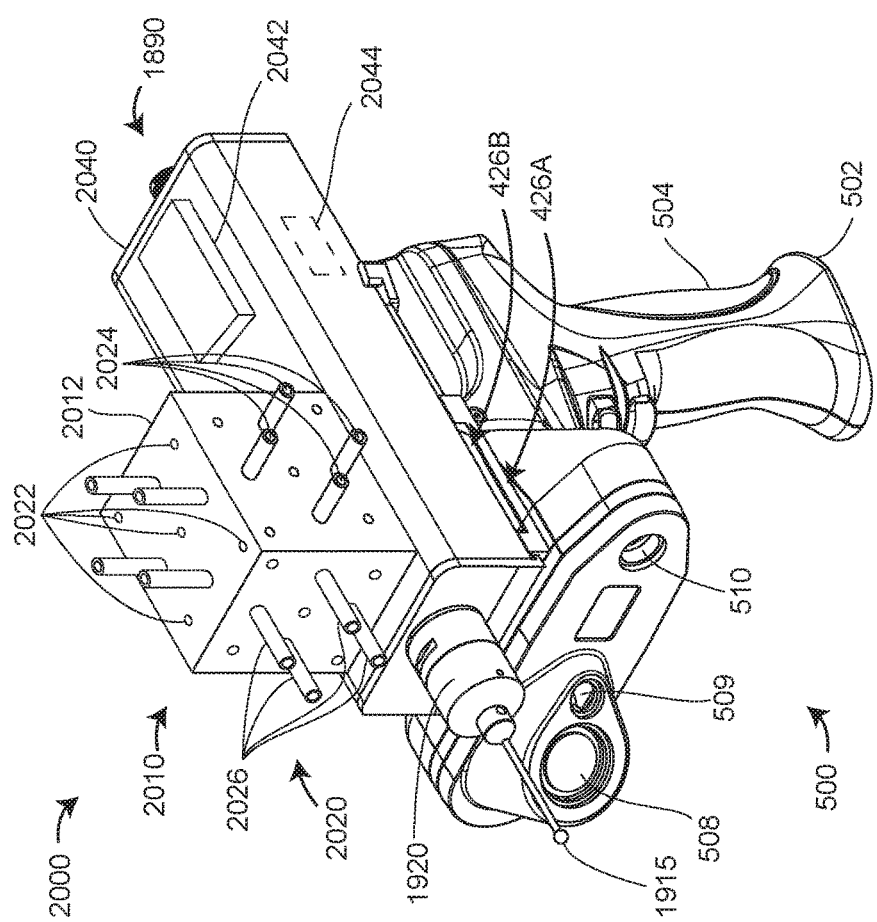
FIG. 20 is an isometric view of a detachable six-DOF target assembly coupled to a handheld triangulation scanner.

FIG. 20 is an isometric view of a detachable six-DOF target assembly 2000 coupled to a handheld triangulation scanner 500. The targets on the six-DOF target assembly 2000 may be measured with a camera bar, such as the camera bar 5110 of FIGS. 15-17. In an embodiment, the targets on the six-DOF target assembly may be measured with two or more cameras separately mounted in an environment, which is to say, not attached to a common bar. A camera bar includes two or more cameras spaced apart by a camera-bar baseline. Triangulation is applied to the images of the targets obtained by the two cameras to determine the six degrees of freedom of the six-DOF target assembly and scanner 500. Additional geometrical information such as camera-bar baseline and orientation of the cameras in the camera bar are used by a processor in the triangulation calculation.

In an embodiment, the six-DOF target assembly 2000 includes a collection of light points 2010, an electrical enclosure 2040, and a tactile probe 1915. In an embodiment, the collection of light points 2010 include some points 2022 mounted directly to the structure 2012 and other points of light 2024 mounted on pedestals 2026. In an embodiment, the points of light 2022, 2024 are LEDs. In another embodiment, the points of light 2022, 2024 are reflective spots. In an embodiment, the reflective spots are illuminated by an external source of light. In an embodiment, the points or light are positioned so as to be visible from a wide range of viewing angles relative to the scanner 500.

In an embodiment, the structure 2012 sits on an electrical enclosure 2040 that provides processing and synchronization of data. In an embodiment, the interface 426 includes a scanner connector 426A and an assembly connector 426B. The connectors 426A and 426B are configured to detachably couple the scanner 500 to the target assembly 2000. In an embodiment, a camera bar fixed in place, for example, on a tripod tracks the six degrees of freedom of the target assembly 2000 and scanner 500 while operator holds the scanner by the handle 504 and moves the target assembly 2000 and scanner 500 over an object. A processor receives data from the scanner 500 and target assembly 2000 to register multiple scans of data to obtain 3D coordinates of points on an object surface.

In an embodiment, the six-DOF target assembly includes a tactile probe 1915 which connects to the electrical enclosure 2040 through a probe interface 1920. The probe interface 1920 may provide touch probe or analog probe electronics. A scanner 500 may provide a lot of detailed information quickly, but may provide less information about edges or holes than might be desired. The tactile probe 1915 can be used by the operator to obtain this desired information.

In an embodiment, the six-DOF target assembly 2000 further includes a display 2042. In an embodiment, the display 2042 shows 3D measurement data or 2D images. The display 2042 may further indicate annotation for the object or provide a menu in a user interface, for example, using the touch screen. In an embodiment, the six-DOF tracker target assembly further includes electronics 2044 that includes a battery and may include a wireless communication channel, including an antenna, and may further include a processor and memory.

Figure 21A:
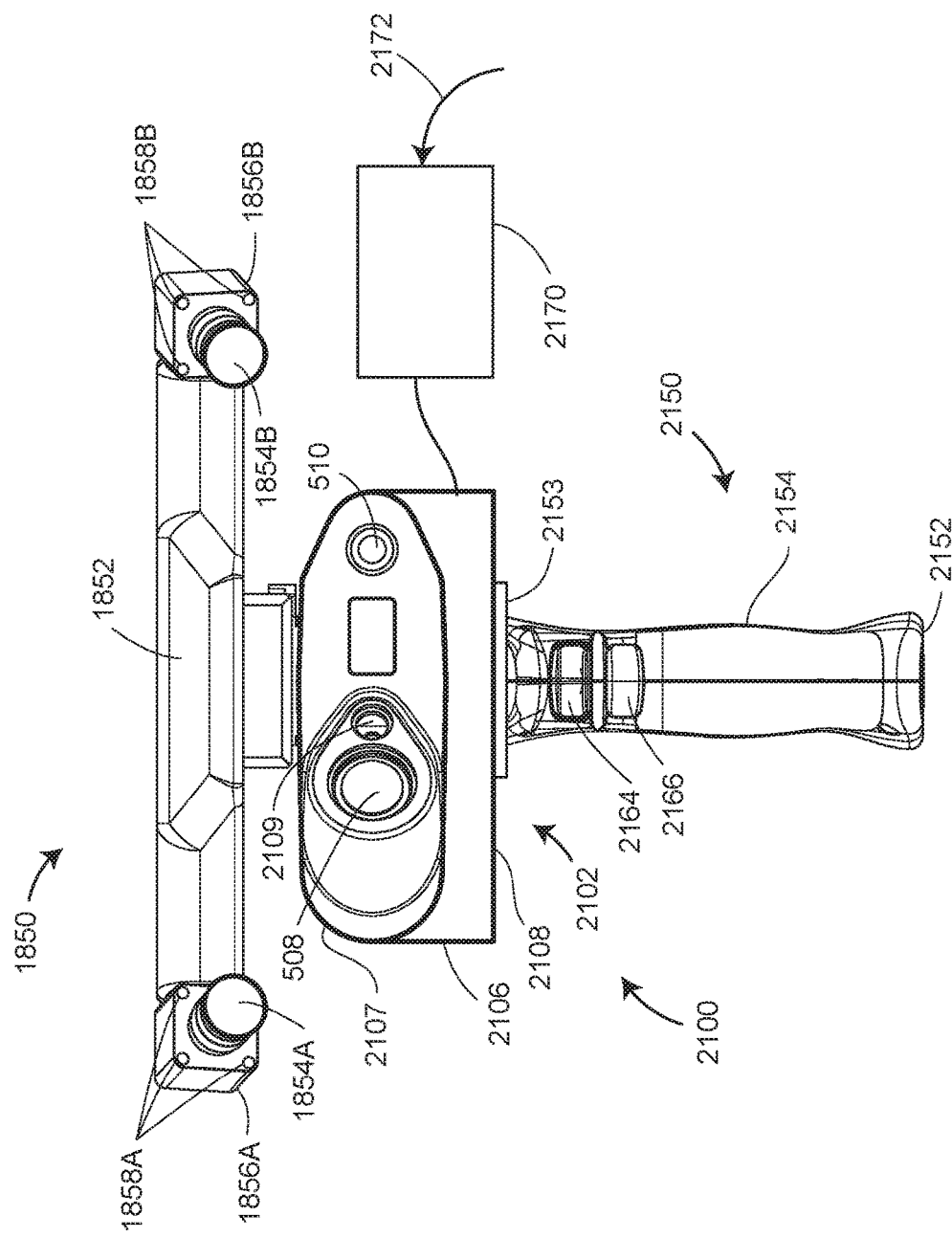

FIG. 21A shows a triangulation scanner having a removable handle and an attachable accessory, the attachable accessory configured to help determine position and orientation of the triangulation scanner in relation to an object. In an embodiment, a triangulation scanner 2100 includes a removable handle 2154 that may be removed and replaced by an operator through an attachment 2153, for example, with screws. Unlike the handle shown in FIG. 11A that includes electrical components, few if any electrical elements are included in the removable handle 2154. In an embodiment, electrical connections may be provided for the actuators (push buttons) 2164, 2166. In an embodiment, after the handle is removed, a scanner assembly 2102 includes electrical components moved into a portion 2106 beneath a portion 2107 that houses the camera 508 and projector 510. By providing a flat surface 2108 on the bottom of the lower portion 2106, the scanner 2102 and any other assemblies attached to it can be conveniently mounted on a robot end effector or next to a conveyor belt of an assembly line. In contrast to a handheld application, in which stability of the scanner cannot be assured, by mounting the scanner 2102 on a flat stable surface, it becomes possible to perform sequential scanning measurements that take longer but are more accurate. Such measurements, for example, sinusoidal phase shift methods, stability is desired between successive measurements.

In an embodiment a camera assembly 1850 is attached through a mechanical and electrical interface 426 to the scanner 2102. In other embodiments, the camera assembly 1850 in FIG. 21A is replaced with a six-DOF tracker target assembly 1910 as shown in FIG. 21C, with scanner 500 replaced by scanner 2100B. In another embodiment, the camera assembly 1850 in FIG. 21A is replaced with a six-DOF target assembly 2000, such as the six-DOF target assembly shown in FIG. 20. The triangulation scanner that includes projector 510 and camera 508 may be a laser line probe that projects a line of light or an area scanner that projects an area of light.

For the case in which the scanner 2100B is used on a manufacturing assembly line, a signal from a linear encoder tied to the assembly line may be sent to the scanner 2100B or to a processor in the system to synchronize scanner measurements to the assembly line movement. By this method, the accuracy of the dimensional scale measured by scanner can be assured. The electrical box 2170 may provide synchronization signals and other signals to and from the scanner 2100B and camera assembly 1850 (or other accessory). Alternatively, the electrical box may transfer time stamps, which might be synchronized through IEEE 1588 methods, or the electrical box may be attached to a real-time bus 2172 such as EtherCAT, SERCOS III, PROFINET, POWERLINK, or EtherNet/IP.

For the case in which the scanner is held stationary, for example on a robot end effector or next to a moving conveyor belt, the flat bottom triangulation scanner 2100B may be used. For the case in which a linear encoder provides the scanner 2100B with timing signals from an linear encoder, the scanner 2100B with no additional accessories as shown in FIG. 21B, provides a convenient configuration. For the case in which the scanner is mounted on a robot arm that provides only low accuracy information on its movements, the embodiment of FIG. 21C in which a six-DOF tracker target accessory 1900 is attached through an interface 426 provides a way to transfer the high accuracy of a six-DOF laser tracker measurement to the measurements made by the scanner 2100B in FIG. 21C.

In an embodiment, the scanner 2100B further includes a color camera 515, as illustrated in FIG. 21B. In an embodiment, a color image captured by the color camera is used to provide colors for the 3D coordinates of object points collected by the scanner 2100B.

Figure 22:
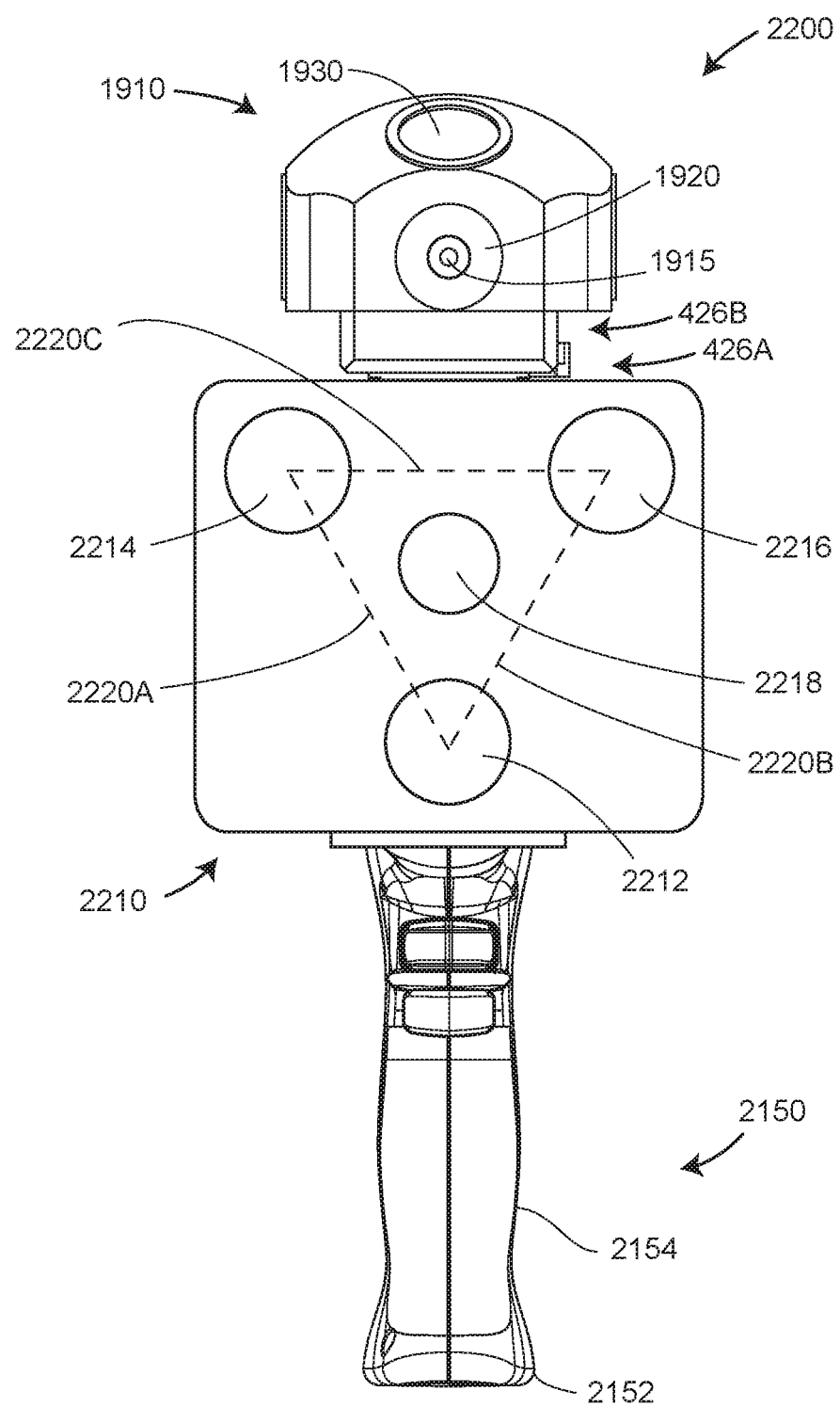
FIG. 22 shows a two-camera triangulation scanner detachably coupled to a six-DOF tracker target assembly.

FIG. 22 is a front view of a triangulation scanner 2210 that includes two cameras 2214, 2216 and a projector 2212 arranged in a triangle. In an embodiment, the scanner also includes a color camera 2218. The handle of the triangulation scanner 2210 may be a removable handle 2154 or a permanently attached handle 504. The triangulation scanner 2210 is configured for connection to an articulated arm CMM 100 or alternatively to an assembly selected from the group consisting of: (1) a six-DOF tracker target assembly 1910 as described in reference to FIGS. 19A-19E; (2) a camera assembly 1850 as described in reference to FIGS. 18A-18D; and (3) a six-DOF light point target assembly as described in reference to FIG. 20.

Two cameras (a first camera and a second camera) and a projector are arranged in a triangle as shown in FIG. 22. This arrangement has three sets of epipolar line constraints, a first set of constraints for the first camera and the second camera, a second set of constraints for the first camera and the projector, and a third set of constraints for the second camera and the projector. By solving these constraints simultaneously, it possible to obtain 3D coordinates of points on an object surface in a single-shot triangulation measurement, even using uncoded patterns of light. For example, it is possible to determine 3D coordinates of projected spots of light obtained from passing light through grating diffractive optical element (DOE), each spot of light indistinguishable from the others. This method is described more fully in U.S. Patent Application Publication No. 2014/0168379, the contents of which are incorporated by reference.

To perform the measurement with the triangulation scanner having two cameras and a projector arranged in a triangle as shown in FIG. 22, three separate triangulation measurements are made, one for the two cameras, one for the first camera and the projector, and one for the second camera and projector. Besides these calculations, additional calculations are performed to determine the correspondence between projected and imaged scanners spots based on epipolar constraints.

The color camera 2218 may be used to assist in registering multiple 3D scans obtained by the scanner 2210 by identifying common target features and adjusting the pose of the multiple 3D scans to obtain the best match, for example by using mathematical optimization methods such as least-squares methods.

Area scanners are also available that arrange the two cameras and projector in a line rather than in a triangle. Usually this arrangement is used as a way of eliminating many of the "shadows" that sometimes occur when a single scanner is used to view a 3D object. In one method, a single triangulation calculation is performed between the two cameras or between the projector and one of the cameras. In an embodiment, all three triangulation calculations are performed to improve accuracy. However, with the two cameras and the projector arranged in a straight line, it is desired to project a coded pattern from a handheld scanner to determine the correspondence between projected and imaged scanner spots since epipolar constraints may not be used to determine the correspondence directly.

Figure 23A:
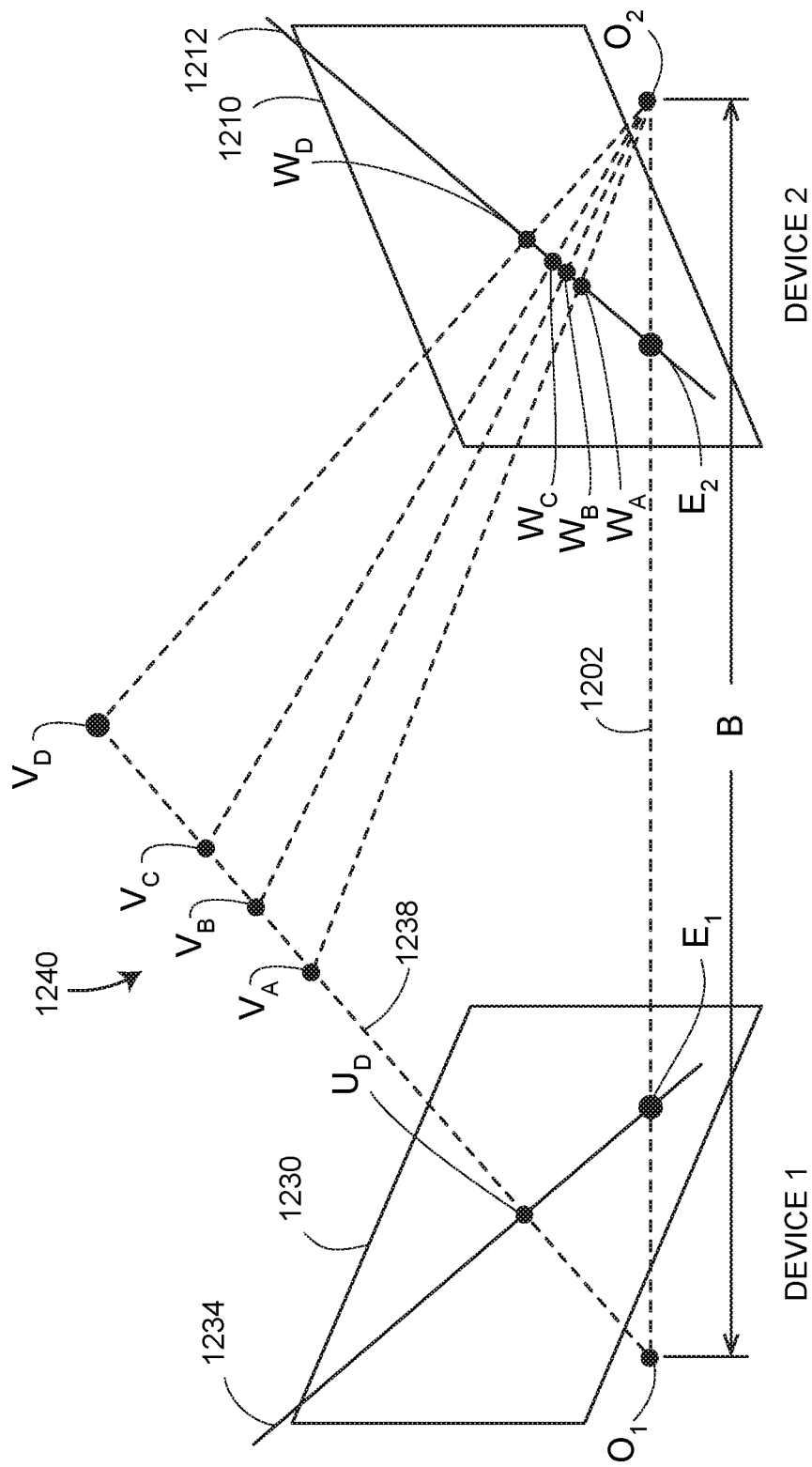
FIG. 23A illustrates the concept of epipolar constraints.

This triangular arrangement of the scanner 2210 of FIG. 22 provides additional information beyond that available for two cameras and a projector arranged in a straight line. The additional information may be understood in reference to FIG. 23A, which explains the concept of epipolar constraints, and FIG. 23B that explains how epipolar constraints are advantageously applied to the triangular arrangement of the 3D imager 2210. In FIG. 23A, a 3D triangulation instrument 1240 includes a Device 1 and a Device 2 on the left and right sides of FIG. 23A, respectively. Device 1 and Device 2 may be two cameras or Device 1 and Device 2 may be one camera and one projector. Each of the two devices, whether a camera or a projector, has a perspective center, $O_1$ and $O_2$, and a representative plane, 1230 or 1210. The perspective centers are separated by a baseline distance B, which is the length of the line 1202. The perspective centers $O_1$, $O_2$ are points through which rays of light may be considered to travel, either to or from a point on an object. These rays of light either emerge from an illuminated projector pattern or impinge on a photosensitive array. The illuminated projector pattern or image plane of the photosensitive array are moved to the other side of the perspective center as this placement is symmetrical and equivalent to the actual projector plane or image plane and simplifies the analysis described herein below. This placement of the reference planes 1230, 1210 is applied in FIG. 23A, which shows the reference planes 1230, 1210 between the object point and the perspective centers $O_1$, $O_2$.

In FIG. 23A, for the reference plane 1230 angled toward the perspective center $O_2$ and the reference plane 1210 angled toward the perspective center $O_1$, a line 1202 drawn between the perspective centers $O_1$ and $O_2$ crosses the planes 1230 and 1210 at the epipole points $E_1$, $E_2$, respectively. Consider a point $U_D$ on the plane 1230. If Device 1 is a camera, it is known that an object point that produces the point $U_D$ on the image lies on the line 1238. The object point might be, for example, one of the points $V_A$, $V_B$, $V_C$, or $V_D$. These four object points correspond to the points $W_A$, $W_B$, $W_C$, $W_D$, respectively, on the reference plane 1210 of Device 2. This is true whether Device 2 is a camera or a projector. It should also be appreciated that the four points lie on a straight line 1212 in the plane 1210. This line, which is the line of intersection of the reference plane 1210 with the plane of $O_1$-$O_2$-$U_D$, is referred to as the epipolar line 1212. It follows that any epipolar line on the reference plane 1210 passes through the epipole $E_2$. Just as there is an epipolar line on the reference plane of Device 2 for any point on the reference plane of Device 1, there is also an epipolar line 1234 on the reference plane of Device 1 for any point on the reference plane of Device 2.

Figure 23B:
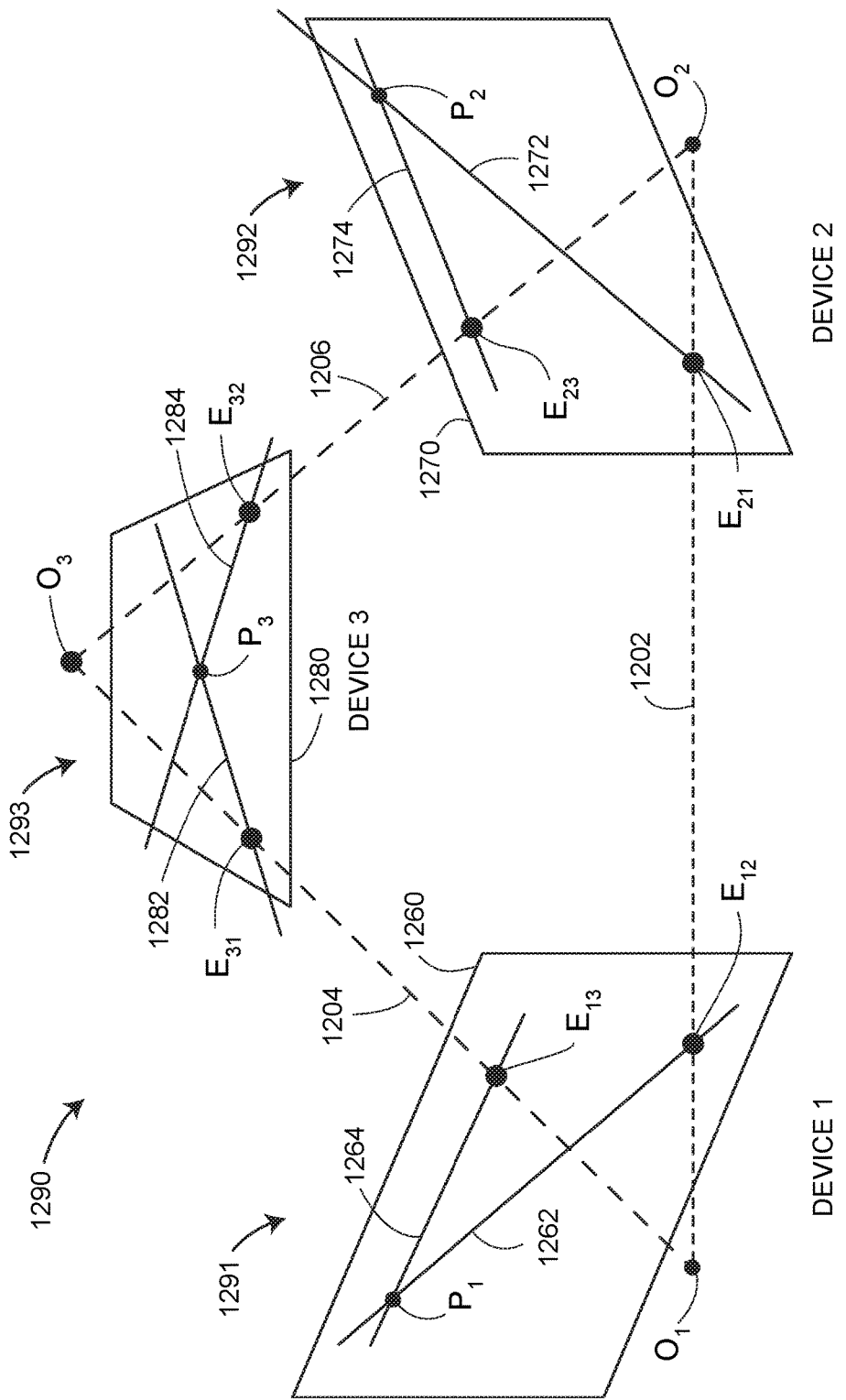
FIG. 23B illustrates the concept of epipolar lines for the case of two cameras and one projector placed in a triangular arrangement according to an embodiment.

FIG. 23B illustrates the epipolar relationships for a 3D imager 1290 corresponding to 3D imager 2210 of FIG. 22 in which two cameras and one projector are arranged in a triangular pattern. In general, the Device 1, Device 2, and Device 3 may be any combination of cameras and projectors as long as at least one of the devices is a camera. Each of the three devices 1291, 1292, 1293 has a perspective center $O_1$, $O_2$, $O_3$, respectively, and a reference plane 1260, 1270, and 1280, respectively. Each pair of devices has a pair of epipoles. Device 1 and Device 2 have epipoles $E_{12}$, $E_{21}$ on the planes 1260, 1270, respectively. Device 1 and Device 3 have epipoles $E_{13}$, $E_{31}$, respectively on the planes 1260, 1280, respectively. Device 2 and Device 3 have epipoles $E_{23}$, $E_{32}$ on the planes 1270, 1280, respectively. In other words, each reference plane includes two epipoles. The reference plane for Device 1 includes epipoles $E_{12}$ and $E_{13}$. The reference plane for Device 2 includes epipoles $E_{21}$ and $E_{23}$. The reference plane for Device 3 includes epipoles $E_{31}$ and $E_{32}$.

Consider the situation of FIG. 23B in which device 3 is a projector, Device 1 is a first camera, and Device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 1260 to obtain the epipolar line 1264. Intersect the plane $P_2$-$E_{21}$-$E_{12}$ to obtain the epipolar line 1262. If the image point $P_1$ has been determined consistently, the observed image point $P_1$ will lie on the intersection of the calculated epipolar lines 1262 and 1264.

To check the consistency of the image point $P_2$, intersect the plane $P_3$-$E_{32}$-$E_{23}$ with the reference plane 1270 to obtain the epipolar line 1274. Intersect the plane $P_1$-$E_{12}$-$E_{21}$ to obtain the epipolar line 1272. If the image point $P_2$ has been determined consistently, the observed image point $P_2$ will lie on the intersection of the calculated epipolar lines 1272 and 1274.

To check the consistency of the projection point $P_3$, intersect the plane $P_2$-$E_{23}$-$E_{32}$ with the reference plane 1280 to obtain the epipolar line 1284. Intersect the plane $P_1$-$E_{13}$-$E_{31}$ to obtain the epipolar line 1282. If the projection point $P_3$ has been determined consistently, the projection point $P_3$ will lie on the intersection of the calculated epipolar lines 1282 and 1284.

The redundancy of information provided by using a 3D imager 2210 having a triangular arrangement of projector and cameras may be used to reduce measurement time, to identify errors, and to automatically update compensation/calibration parameters.

In an embodiment, perspective centers of the cameras 2214, 2216 and the projector 2212 lie in a first plane of the 3D imager 2210. The cameras 2214, 2216, and the projector 2212 further have corresponding optical axes, each of the optical axes passing through the perspective center, each of the optical axes being generally along a direction perpendicular to the lens system of the camera or projector. In an embodiment, the first plane that includes the three perspective centers does not further contain the optical axes of the either camera 2214, 2216 or the optical axis of the projector 2212. In other words, the triangulation pattern of the scanner 2210 conforms to the illustration of FIG. 22 rather than placing the three perspective centers in a plane perpendicular to the plane of the front view of FIG. 22.

In an embodiment, there are three baseline distances 2220A, 2220B, and 2220C between pairs of the perspective centers of the two cameras 2214, 2216 and the projector 2212. Although a single baseline distance is sufficient to determine 3D coordinates of an object with the scanner 2210, it is advantageous to perform the calculation using all three baseline distances 2220A, 2220B, and 2220C.

In an embodiment, epipolar constraints, as described herein above with respect to FIG. 23B, are used to determine 3D coordinates of points on an object. Although it is not always necessary to use epipolar constraints in the determination of 3D distances, there are advantages in using the epipolar constraints as described herein above.

In an embodiment, 3D imager 2210 may include a display (not shown), which may be integrated with a touchscreen. Such a display may provide real-time or near real-time scanning information. It may also provide messages and enable a user to enter instructions through an user interface tied to the touchscreen. In a further embodiment, the 3D imager may include a replaceable battery, a controller, and a wireless communication system. In an embodiment, the color camera 2218 may further be used to attach colors to the 3D points obtained with the 3D imager 2210.

The scanner 2210 includes a detachable coupler 426A by which it attaches to a mating connector 426C on an AACMM 100 or on a connector 426B on an assembly such as the six-DOF tracker target assembly 1910, as shown in FIG. 22. It may alternatively attach to the camera assembly 1850 or the six-DOF light point target assembly 2000. The scanner 2210 may also have a removable handle that enables it to sit flat. This may be useful for example in an assembly line application such as an application involving a conveyor belt.

In accordance with an embodiment, a device for measuring three-dimensional (3D) coordinates of an object having a surface includes: a processor; a triangulation scanner including a projector, a scanner camera, and a scanner connector, the projector configured to project a scanner pattern onto the object surface, the scanner camera configured to form an image of the scanner pattern and to send an electrical scanner signal to the processor in response, there being a scanner baseline distance between the scanner camera and the projector, the scanner connector configured to detachably couple to a connector of an articulated arm coordinate measurement machine (AACMM); and a camera assembly including a first assembly camera and a camera assembly connector, the first assembly camera configured to form a first image of the object surface and to send a first electrical assembly signal to the processor in response, the camera assembly connector configured to detachably couple to the scanner connector, wherein the processor is configured to determine the 3D coordinates of the object surface whether the triangulation scanner is coupled to or uncoupled from the AACMM, the determining based at least in part on the scanner pattern, the first electrical scanner signal, and the scanner baseline distance. In a further embodiment, the device of is configured to determine the 3D coordinates of the object surface further based on the first electrical assembly signal when the camera assembly connector is coupled to the scanner connector. In accordance with a further embodiment, the camera assembly further includes a second assembly camera, the second assembly camera being configured to form a second image of the object surface and to send a second electrical assembly signal to the processor in response, there being an assembly baseline distance between the first assembly camera and the second assembly camera, the processor being configured to determine the 3D coordinates of the object surface further based on the second electrical assembly signal and the assembly baseline distance. In an embodiment, the triangulation scanner is a laser line probe, with the projector is configured to project a line of light. In an embodiment, the triangulation scanner is an area scanner, with the projector configured to project light to cover an area on the object surface. In an embodiment, the first assembly camera further includes a first assembly light source proximate the first assembly camera, the first assembly light source configured to illuminate a reflective marker on the object surface or proximate the object surface. In an embodiment, the device further comprises a battery. In an embodiment, the device further includes a color camera configured to produce a color image, the color camera configured to produce an electrical signal of the color image, the processor being configured to add color to the 3D coordinates of the object surface based at least in part on the electrical signal of the color image. In an embodiment, the device further includes a display, which may further include a touch screen.

In accordance with an embodiment, a method for measuring three-dimensional (3D) coordinates includes: providing an object, a processor, a triangulation scanner, a camera assembly, and a mark, the object having a surface, the triangulation scanner including a projector, a scanner camera, and a scanner connector, the camera assembly including a first assembly camera and a camera assembly connector, the camera assembly connector configured to detachably couple to the scanner connector, the mark being on the object or proximate the object; and connecting the scanner connector to the camera assembly connector. In a first instance of the embodiment, the embodiment includes: projecting with the projector a first light onto the object surface; forming with the scanner camera an image of the first light and sending a first electrical scan signal to the processor in response; forming with the first assembly camera a first image of the mark and sending a first electrical mark signal to the processor in response. In a second instance of the embodiment, the embodiment includes: projecting with the projector a second light onto the object surface; forming with the scanner camera an image of the second light and sending a second electrical scan signal to the processor in response; forming with the first assembly camera a second image of the mark and sending a second electrical mark signal in response. In addition, the embodiment further includes determining with the processor the 3D coordinates based at least in part on the first light, the second light, the first electrical scan signal, the second electrical scan signal, the first electrical mark signal, and the second electrical mark signal; and storing the 3D coordinates. In a further embodiment, the triangulation scanner is a laser line probe. In a further embodiment, the triangulation scanner is an area scanner. In a further embodiment, the mark is a natural feature of the object. In a further embodiment, the mark is a light emitting diode (LED) place on the object or in proximity to the object. In a further embodiment, the mark is a reflective target. In a further embodiment, the camera assembly further includes a light source. In a further embodiment, the mark is a reflective target illuminated by the light source on the camera assembly. A further embodiment includes providing an external projector, the external projector separate from the triangulation scanner and the camera assembly. In a further embodiment, the mark is a spot of light projected by the external projector. A further embodiment includes providing three marks. In a further embodiment, the first image includes the three marks and the second image includes the three marks. In a further embodiment, the camera assembly further includes a second assembly camera. In a further embodiment includes: in the first instance, forming with the second assembly camera a third image of the mark and sending a third electrical mark signal to the processor in response, and, in the second instance, forming with the second assembly camera a fourth image of the mark and sending a fourth electrical mark signal to the processor in response. In a further embodiment, the processor determines 3D coordinates further based on the third electrical mark signal and the fourth electrical mark signal.

In accordance with an embodiment, a system for measuring three-dimensional (3D) coordinates of an object surface includes: a processor; a target device including a triangulation scanner and a six degree-of-freedom (six-DOF) target assembly, the triangulation scanner including a projector, a scanner camera, and a scanner connector, the projector configured to project a scanner pattern onto the object surface, the scanner camera configured to form an image of the scanner pattern and to send an electrical scanner signal to the processor in response, the six-DOF target assembly including a collection of light points and an assembly connector configured to detachably couple to the scanner connector; a camera bar device including a first camera and a second camera separated by a camera-bar baseline distance, the first camera and the second camera fixed in space, the first camera configured to form a first light point image of the collection of light points and to send a first electrical light point signal to the processor in response, the second camera configured to form a second light point image of the collection of light points and to send a second electrical light point signal to the processor in response, wherein the processor is configured to determine the 3D coordinates of the object surface based at least in part on the scanner pattern, the electrical scanner signal, the first electrical light point signal, the second electrical light point signal, and the camera-bar baseline distance. In accordance with a further embodiment, the processor is further configured to determine the 3D coordinates of the object surface based at least in part on a scanner baseline distance between the scanner camera and the projector. In a further embodiment, the triangulation scanner is a laser line probe configured to project a line of light. In a further embodiment, the triangulation scanner is an area scanner configured to project light to cover an area on the object surface. In a further embodiment, the six-DOF target assembly further includes a tactile probe configured to measure 3D coordinates of points on the object surface. In a further embodiment, the scanner connector is further configured to detachably couple to a first connector of an articulated arm coordinate measurement machine (CMM). In a further embodiment, the scanner further comprises a battery. In a further embodiment, the system further comprises a color camera configured to produce a color image, the color camera configured to produce an electrical signal of the color image, the processor being configured to add color to the 3D coordinates of the object surface based at least in part on the electrical signal of the color image. In a further embodiment, the system further comprises a display, which may include a touch screen.

In an embodiment, a method for measuring three-dimensional (3D) coordinates of an object surface includes: providing a processor; providing a target device including a triangulation scanner and a six degree-of-freedom (six-DOF) target assembly, the triangulation scanner including a projector, a scanner camera, and a scanner connector, the six-DOF target assembly including a collection of light points and an assembly connector configured to detachably couple to the scanner connector; providing a camera bar device including a first camera and a second camera separated by a camera-bar baseline distance, the first camera and the second camera fixed in space; connecting the scanner connector to the assembly connector. In a first instance of the embodiment, the embodiment includes: projecting with the projector a first light onto the object surface; forming with the scanner camera an image of the first light and sending a first electrical scan signal to the processor in response; forming with the first camera a first light point image of the collection of light points and sending a first electrical light point signal to the processor in response; forming with the second camera a second light point image of the collection of light points and sending a second electrical light point signal to the processor in response; determining by the camera bar device in cooperation with the processor and the six-DOF target assembly first values for six degrees of freedom of the triangulation scanner; determining with the processor the 3D coordinates of the object surface based at least in part on the first light, the first electrical scan signal, the first electrical light point signal, and the second electrical light point signal; and storing the 3D coordinates of the object surface. In a further embodiment, in a second instance, the embodiment further includes: projecting with the projector a second light onto the object surface; forming with the scanner camera an image of the second light and sending a second electrical scan signal to the processor in response; forming with the first camera a third light point image of the collection of light points and sending a third electrical light point signal to the processor in response; forming with the second camera a fourth light point image of the collection of light points and sending a fourth electrical light point signal to the processor in response; and determining with the processor the 3D coordinates of the object surface further based on the second light, the second electrical scan signal, the third electrical light point signal, and the fourth electrical light point signal. In a further embodiment, the triangulation scanner is a laser line probe that projects a line of light. In a further embodiment, the triangulation scanner is an area scanner that projects light over an area. In a further embodiment, the processor is further configured to determine the 3D coordinates of the object surface based at least in part on a scanner baseline distance between the scanner camera and the projector. In a further embodiment, the assembly further includes a tactile probe.

In an embodiment, a method for measuring three-dimensional (3D) coordinates of a tactile probe includes: providing a processor; providing a target device including a triangulation scanner and a six degree-of-freedom (six-DOF) target assembly, the triangulation scanner including a scanner connector, the six-DOF target assembly including a collection of light points, the tactile probe, and an assembly connector configured to detachably coupled to the scanner connector; providing a camera bar device including a first camera and a second camera separated by a camera-bar baseline distance, the first camera and the second camera fixed in space; connecting the scanner connector to the assembly connector; forming with the first camera a first light point image of the collection of light points and sending a first electrical light point signal to the processor in response; forming with the second camera a second light point image of the collection of light points and sending a second electrical light point signal to the processor in response; and determining with the processor the 3D coordinates of the object surface based at least in part on first electrical light point signal, and the second electrical light point signal, and the car-bar baseline distance.

In an embodiment, a device for measuring three-dimensional (3D) coordinates of an object having a surface includes: a processor; a triangulation scanner including a projector, a scanner camera, and a scanner connector, the projector configured to project a scanner pattern onto the object surface, the scanner camera configured to form an image of the scanner pattern and to send an electrical scanner signal to the processor in response; and a six degree-of-freedom (six-DOF) tracker target assembly including a retroreflector and an assembly connector, the retroreflector configured to return light received from a laser tracker, the six-DOF tracker target assembly further configured to cooperate with the laser tracker and the processor to determine six degrees of freedom of the triangulation scanner, the assembly connector configured to detachably couple to the scanner connector, wherein the processor is configured to determine the 3D coordinates of the object surface based at least in part on the scanner pattern, the electrical scanner signal, and the six degrees of freedom of the triangulation scanner. In a further embodiment, the processor is further configured to determine the 3D coordinates of the object surface based at least in part on a scanner baseline distance between the scanner camera and the projector. In a further embodiment, the triangulation scanner is a laser line probe having a projector configured to project a line of light. In a further embodiment, the triangulation scanner is an area scanner having a projector configured to project a light to cover an area. In a further embodiment, the six-DOF tracker target assembly further includes a tactile probe configured to measure 3D coordinates of points on the object surface. In a further embodiment, each of the plurality of six-DOF tracker target assemblies are measurable from a different direction by the laser tracker. In a further embodiment, the scanner connector is further configured to detachably couple to a first connector of an articulated arm coordinate measurement machine (CMM).

In an embodiment, a method for measuring three-dimensional (3D) coordinates of an object surface includes: providing a processor, a triangulation scanner, and a six degree-of-freedom (six-DOF) tracker target assembly, the triangulation scanner including a projector, a scanner camera, and a scanner connector, the six-DOF tracker target assembly including a retroreflector and an assembly connector configured to detachably couple to the scanner connector; connecting the scanner connector to the assembly connector. In a first instance of the embodiment, the embodiment further includes: projecting with the projector a first light onto the object surface; forming with the scanner camera an image of the first light and sending a first electrical scan signal to the processor in response; determining by the laser tracker in cooperation with the processor and the six-DOF tracker target assembly a first set of values for six degrees of freedom of the triangulation scanner; determining with the processor the 3D coordinates of the object surface based at least in part on the first light, the first electrical scan signal, and the first values for six degrees of freedom of the triangulation scanner; and storing the 3D coordinates of the object surface. In a further embodiment, in a second instance, the embodiment further includes projecting with the projector a second light onto the object surface; forming with the scanner camera an image of the second light and sending a second electrical scan signal to the processor in response; determining by the laser tracker in cooperation with the processor a second set of values for six degrees of freedom of the triangulation scanner; determining with the processor additional 3D coordinates of the object surface based at least in part on the second light, the second electrical scan signal, and the second values for six degrees of freedom of the triangulation scanner, and storing the additional 3D coordinates of the object surface. In a further embodiment, the triangulation scanner is a laser line probe. In a further embodiment, the triangulation scanner is an area scanner. In a further embodiment, the processor is further configured to determine the 3D coordinates of the object surface based at least in part on a scanner baseline distance between the scanner camera and the projector. In a further embodiment, the assembly further includes a tactile probe. In a further embodiment, the method further includes: determining by the laser tracker in cooperation with the processor and the six-DOF tracker target assembly a third set of values for six degrees of freedom of the triangulation scanner; and determining by the processor the 3D coordinates of the tactile probe based at least in part on the third set of values. In a further embodiment, the method further includes sending a beam of light from the laser tracker to the retroreflector, receiving a portion of reflected light in a distance meter of the laser tracker, and determining a distance from the laser tracker to the retroreflector with the distance meter; and measuring with the tracker a first angle and a second angle of the beam of light. In a further embodiment, the first set of values is further based on the distance from the laser tracker to the retroreflector, the first angle, and the second angle.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A device for measuring three-dimensional (3D) coordinates of an object surface comprising:
   a processor; and
   a triangulation scanner including a projector, a scanner camera, a detachable handle, and a scanner connector, the projector configured to project a scanner pattern onto the object surface, the scanner camera configured to form an image of the scanner pattern and to send an electrical scanner signal to the processor in response, the scanner connector configured to detachably couple to a connector of an articulated arm coordinate measurement machine (AACMM), the processor being configured to determine the 3D coordinates of the object surface whether the triangulation scanner is coupled to or uncoupled from the AACMM, the determining based at least in part on the scanner pattern and on the electrical scanner signal, wherein the triangulation scanner is configured to sit flat on its bottom after removal of the detachable handle;
   wherein the scanner connector comprises:
   a body and a locking assembly coupled to the body, the locking assembly including a rotating handle that extends from a plate and is configured to move from a first position to a second position to secure the scanner connector.

2. The device of claim 1, further comprising a six degree-of-freedom (six-DOF) tracker target assembly including a retroreflector and an assembly connector, the retroreflector configured to return light received from a laser tracker, the six-DOF tracker target assembly further configured to cooperate with the laser tracker and the processor to determine six degrees of freedom of the triangulation scanner, the assembly connector configured to detachably couple to the scanner connector, the processor being configured to determine the 3D coordinates of the object surface further based on the determined six degrees of freedom of the triangulation scanner.

3. The device of claim 2, wherein the retroreflector includes a plurality of retroreflectors, each retroreflector being disposed on a different surface.

4. The device of claim 1, further comprising:
   a six degree-of-freedom (six-DOF) target assembly including a collection of light points and an assembly connector configured to detachably couple to the scanner connector,
   wherein the six-DOF target assembly is configured to cooperate with a camera bar device, the camera bar device including a first camera and a second camera separated by a camera-bar baseline distance, the first camera and the second camera fixed in space, the first camera configured to form a first light point image of the collection of light points and to send a first electrical light point signal to the processor in response, the second camera configured to form a second light point image of the collection of light points and to send a second electrical light point signal to the processor in response, and
   wherein the processor is configured to determine the 3D coordinates of the object surface further based on the first electrical light point signal, the second electrical light point signal, and the camera-bar baseline distance.

5. The device of claim 1, further comprising a camera assembly including a first assembly camera and a camera assembly connector, the first assembly camera configured to form a first image of the object surface and to send a first electrical assembly signal to the processor in response, the camera assembly connector configured to detachably couple to the scanner connector, the processor being configured to determine the 3D coordinates of the object surface further based on the first electrical assembly signal.

6. The device of claim 5, wherein the camera assembly further includes a second assembly camera, the second assembly camera configured to form a second image of the object surface and to send a second electrical assembly signal to the processor in response, there being an assembly baseline distance from the first assembly camera to the second assembly camera, the processor being configured to determine the 3D coordinates of the object surface further based on the second electrical assembly signal and the assembly baseline distance.

7. The device of claim 1, wherein the triangulation scanner is a laser line probe.

8. The device of claim 7, wherein the projector is configured to project a line of light.

9. The device of claim 1, wherein the triangulation scanner is an area scanner.

10. The device of claim 9, wherein the projector is configured to project light to cover an area on the object surface.

11. The device of claim 1, wherein the device is further configured to attach to a real-time bus selected from the group consisting of: EtherCAT, SERCOS III, PROFINET, POWERLINK, and EtherNet/IP.

12. The device of claim 1, wherein the device further comprises a battery.

13. The device of claim 1, wherein the triangulation scanner further comprises a color camera configured to produce a color image, the color camera configured to produce an electrical signal of the color image, the processor being configured to add color to the 3D coordinates of the object surface based at least in part on the electrical signal of the color image.

14. The device of claim 1, further comprising a display.

15. The device of claim 14, wherein the display includes a touch screen.

16. A device for measuring three-dimensional (3D) coordinates of an object surface comprising:
   a processor; and
   a triangulation scanner including a projector, a scanner camera, a detachable handle, and a scanner connector, the projector configured to project a scanner pattern onto the object surface, the scanner camera configured to form an image of the scanner pattern and to send an electrical scanner signal to the processor in response, the scanner connector configured to detachably couple to a connector of an articulated arm coordinate measurement machine (AACMM), the processor being configured to determine the 3D coordinates of the object surface whether the triangulation scanner is coupled to or uncoupled from the AACMM, the determining based at least in part on the scanner pattern and on the electrical scanner signal, wherein the triangulation scanner is configured to sit flat on its bottom after removal of the detachable handle;

wherein the scanner connector comprises:
   a body;
   a handle pin movably coupled to the body;
   a locking assembly coupled to the body, the locking assembly including a rotating handle that extends from a plate, the plate having a curved slot; and
   a translator pin movably coupled to the handle pin and disposed at least partially in the slot, wherein the handle pin moves from a first position to a second position in response to a rotation of the handle.

17. The device of claim 16, wherein body further includes a front lip, and the scanner connector further includes an electrical connector arranged between the handle pin and a front lip.

18. The device of claim 1, further comprising an electronics unit electrically coupled to the processor by a cable, the electronics unit having a power supply and a second processor.

19. The device of claim 18, wherein the electronics unit is coupled to a real-time bus configured to couple with one or more devices in an automation network.

20. The device of claim 1, further comprising an external projector arranged separate and apart from the triangulation scanner, the external projector configured to project spots of light onto the object surface.

* * * * *